United States Patent [19]

Turpin et al.

[11] Patent Number: 5,608,898
[45] Date of Patent: Mar. 4, 1997

[54] DEVELOPMENT SYSTEM WITH METHODS FOR MAINTAINING DATA INTEGRITY OF INFORMATION STORED AS A DATA RECORD IN A DATABASE WITH A COPY OF THE INFORMATION DISPLAYED ON A SCREEN DEVICE

[75] Inventors: William M. Turpin, Santa Cruz; Kevin L. Brown, Scotts Valley; Steven W. Bogrett, Campbell, all of Calif.

[73] Assignee: Borland International, Inc., Scotts Valley, Calif.

[21] Appl. No.: 975,302

[22] Filed: Nov. 12, 1992

Related U.S. Application Data

[63] Continuation-in-part of Ser. No. 606,537, Oct. 31, 1990, abandoned.

[51] Int. Cl.$^6$ ........................................... G06F 17/30
[52] U.S. Cl. .................... 395/619; 395/149; 395/617; 395/768; 364/DIG. 1; 364/282.1; 364/283.3; 364/283.4
[58] Field of Search .................. 364/419.14, 419.15; 395/600, 149, 144, 145, 146

[56] References Cited

U.S. PATENT DOCUMENTS

| | | | |
|---|---|---|---|
| 4,710,763 | 12/1987 | Franke et al. | 345/10 |
| 4,733,354 | 3/1988 | Potter et al. | 364/413.02 |
| 4,821,211 | 4/1989 | Torres | 395/156 |
| 4,831,580 | 5/1989 | Yamada | 395/133 |
| 4,866,634 | 9/1989 | Reboh et al. | 395/76 |
| 4,912,669 | 3/1990 | Iwamoto et al. | 364/419.17 |
| 4,956,773 | 9/1990 | Saito et al. | 395/159 |
| 4,982,344 | 1/1991 | Jordan | 395/157 |
| 4,984,180 | 1/1991 | Wada et al. | 395/161 |
| 5,008,810 | 4/1991 | Kessel et al. | 395/149 |
| 5,047,960 | 9/1991 | Sloan | 395/149 |
| 5,091,868 | 2/1992 | Pickens et al. | 395/148 |
| 5,179,652 | 1/1993 | Rozmanith et al. | 395/155 |
| 5,208,907 | 5/1993 | Shelton et al. | 395/149 |
| 5,293,615 | 3/1994 | Amada | 395/600 |
| 5,367,619 | 11/1994 | Dipaolo et al. | 395/149 |

FOREIGN PATENT DOCUMENTS

| | | | |
|---|---|---|---|
| 0211151 | 2/1987 | European Pat. Off. | G06F 15/20 |

OTHER PUBLICATIONS

"Paradox 3.5 Handbook," Third Edition, Oct. 1991, Bantam Books, pp. 1–4; 77–111 and 817–842.
"TM/1 Relational Spreadsheet Release 3.0," Sinper Corp., Warrenton, N.J., 1987, pp. 1-1-8-7.
Gehani, N., *High Level Form Definition in Office Information Systems*, The Computer Journal, vol. 26, No. 1, Feb. 1993, pp. 52–59.
Butterworth, M., *Forms Definition Methods*, 5th Annual Conference on Computers and Communication, Mar. 1986, pp. 708–712.

(List continued on next page.)

*Primary Examiner*—Paul V. Kulik
*Attorney, Agent, or Firm*—John A. Smart

[57] ABSTRACT

A development system having methods for maintaining data integrity of information stored as a data record in a database table with information displayed on a screen device is described. An exemplary method for maintaining data integrity, without continuous exclusive locking of a shared data record, includes the following steps. First, the system reads at least one field value from a database table, while the table is available to others (i.e., accessed with share access). This field value is displayed on screen to the user, whereupon the user may enter new information (i.e., new field value). In the event that the user has entered new information, the method performs the step of re-reading the field value from the database table. Accordingly, the method can determine whether the just-entered value differs from that stored in the database. In the event that the two differ, the method can update the database with the just-entered information displayed on screen or, alternatively, refresh the information displayed on screen with that which is now stored in the database table.

20 Claims, 59 Drawing Sheets

OTHER PUBLICATIONS

Shu, Nan C., *Visual Programming*, 1988; pp. 16–31, 142–147, 150–151, 202–209, 222–229, 234–237, 264–283.

Miyao, et al., *Visualized and Modeless Programming Environment for Form Manipulation Language*, 1989, pp. 99–104.

Smith, David N., *Visual Programming in the Interface Construction Set*, 1988, pp. 109–120.

DeMaria, Rusel & Fontane, George, *Working with dBase Mac*, 1988, pp. 94–134, 155–183.

Pezold, C., *Dynamic Data Exchange (DDE)—Chapter 17*, Programming Windows, Second Edition, Microsoft Press, 1990, pp. 809–840.

APPLICATION PROGRAM

| | |
|---|---|
| FORM TOOL (FORM CREATION) | ~ 301 |
| TREE TOOL (FORM CREATION) | ~ 302 |
| LINK TOOL (FORM CREATION) | ~ 303 |
| STACK TOOL (FORM CREATION) | ~ 304 |
| MEMORY MANAGER | ~ 305 |
| FORM EXECUTION (RUN TIME) | ~ 306 |
| TREE EXECUTION (RUN TIME) | ~ 307 |
| LINK MANAGER | ~ 308 |
| FILE I-O SUBSYSTEM | ~ 309 |
| WINDOWS INTERFACE | ~ 310 |

FORM IMAGE DATA FILE

400

```
BOF
IGNORE REMOTE
FORMNAMES
FIELDNAMES
FONTNAMES

FOR EACH FORM
    FORMSIZE

FOR EACH FORM OBJECT
        FORMFIELD, FORMTEXT,
        FORMPICTURE, OR FORMPATTERN
    FOR EACH FIELD
        FIELD TREE
        FIELDHELP
        FIELDEXPECT
        FIELDVALUE
    FOR EACH LINK
        DBASE_LINK
        DDE_LINK
        ACSII_LINK
EOF
```

*FIG. 4*

LIFE INSURANCE COMPANY

| PROPOSED INSURED | | | | |
|---|---|---|---|---|
| PRESENT ADDRESS | | CITY | STATE | ZIP CODE |
| SEX ☐ M ☐ F | BIRTHDATE | BIRTHPLACE | | RESIDENCE TELEPHONE |
| BENEFICIARY NAME | | | RELATIONSHIP TO INSURED | |
| BENEFICIARY ADDRESS | | | | |
| TOTAL ANNUAL PREMIUM | PREMIUM PAYMENT AMOUNT | ///// | | |
| ☐ INSURED DOES NOT MEET BASIC QUALIFICATIONS | | ☐ TEMPORARY INSURANCE NOT AVAILABLE | | |
| ☐ INSURED MAY BE SUBJECT TO SUBSTANDARD RATING | | ☐ POLICY MAY REQUIRE EXCLUSION RIDER | | |
| ☐ MEDICAL EXAM REQUIRED | | DEPOSIT REQUIRED | DEPOSIT RECEIVED | |

SIGNATURE >

*FIG. 9*

| HAVE YOU: | |
|---|---|
| IN THE PAST 12 MONTHS HAD ANY KNOWN OR SUSPECTED HEART ATTACK, STROKE, OR CANCER, OTHER THAN OF THE SKIN, OR BEEN TREATED BY ANY PHYSICIAN OR OTHER PRACTITIONER FOR ANY OF THESE CONDITIONS? | ☐ YES ☐ NO |
| WITHIN THE LAST 60 DAYS BEEN ADVISED BY ANY PHYSICIAN OR OTHER PRACTITIONER TO HAVE ANY DIAGNOSTIC TEST OR SURGERY NOT YET PERFORMED? | ☐ YES ☐ NO |
| HAVE YOU SMOKED CIGARETTES IN THE LAST 12 MONTHS? | ☐ YES ☐ NO |
| HAVE YOU USED TOBACCO IN ANY OTHER FORM IN THE LAST 12 MONTHS? | ☐ YES ☐ NO |
| WILL ANY EXISTING LIFE OR ANNUITY COVERAGE BE REPLACED, LAPSED OR SURRENDERED? | ☐ YES ☐ NO |
| DO YOU HAVE ANY OTHER APPLICATION PENDING FOR LIFE INSURANCE? | ☐ YES ☐ NO |
| ARE YOU IN THE RESERVES, NATIONAL GUARD, ON ACTIVE DUTY IN THE MILITARY, OR ENROLLED IN A COLLEGE MILITARY PROGRAM? | ☐ YES ☐ NO |
| HAVE YOU IN THE LAST THREE YEARS ENGAGED IN OR DO YOU PLAN TO ENGAGE IN ANY OF THE FOLLOWING ACTIVITIES? ☐ MOTORIZED VEHICLE RACING ☐ MOUNTAIN CLIMBING ☐ SCUBA DIVING | |

*FIG. 11*

| HEIGHT (INCHES) | WEIGHT | HAS YOUR WEIGHT CHANGED MORE THAN 10 POUNDS IN THE LAST YEAR? ☐YES ☐NO |
|---|---|---|
| ARE YOU AT THE PRESENT TAKING ANY MEDICATIONS? | | ☐YES ☐NO |
| ARE YOU PRESENTLY UNDER A DOCTOR'S CARE FOR ANY CONDITION? | | ☐YES ☐NO |
| HAVE YOU EVER HAD ANY OPERATION? | | ☐YES ☐NO |
| HAVE ANY OPERATIONS EVER BEEN ADVISED BUT NOT PERFORMED? | | ☐YES ☐NO |
| DO YOU HAVE ANY IMPAIRMENT OF SIGHT OR HEARING? | | ☐YES ☐NO |
| HAVE YOU HAD AN ELECTROCARDIOGRAM OR XRAY MADE IN THE LAST 5 YEARS? | | ☐YES ☐NO |
| HAS A PARENT OR SIBLING EVER HAD HEART DISEASE, HIGH BLOOD PRESSURE OR DIABETES? | | ☐YES ☐NO |
| REMARKS | | |

*(Rotated screen mockup)*

DECISIONFORM - LIFE.DF
FILE  EDIT  FORM  FIELD  TOOLS                                          HELP

LIFE INSURANCE APPLICATION (GOAL)

LIFE INSURANCE COMPANY

PROPOSED INSURED
JOHN SMITH

RESIDENCE ADDRESS         CITY           STATE   ZIP CODE
601 WEST SIXTH ST         AUSTIN         TX      78750

SEX ☒M ☐F  BIRTHDATE   BIRTHPLACE        RESIDENCE TELEPHONE
           6/12/56     MISSOURI, USA     (512) 343 8117

BENEFICIARY NAME                         RELATIONSHIP TO INSURED
NANCY                                    WIFE

BENEFICIARY ADDRESS
SAME

TOTAL ANNUAL PREMIUM   PREMIUM PAYMENT AMOUNT

PREMIUM CALCULATION (GOAL)

AMOUNT OF BASIC POLICY   POLICY KIND          AGE USED TO CALCULATE PREMIUM   ☐NON-SMOKER
$100,000.00                                   34

☐ PARTICIPATING          PAR POLICY DIVIDEND OPTION   ☐ PURCHASE PAID-UP ADDITIONS   BASIC PLAN PREMIUM
                         ☐ APPLIED TO PREMIUM         ☐ LEAVE ON DEPOSIT
                         ☐ PAID TO INSURED

UL PLANNED PREMIUM       ☐ PREMIUM WAIVER ON BASIC POLICY                             ADB PREMIUM
                         ACCIDENTIAL DEATH RIDER AMOUNT

DECISIONFORM - LIFE.DF

FILE  EDIT  FORM  FIELD  VIEW  TOOLS                                      HELP

LIFE INSURANCE APPLICATION (GOAL)

LIFE INSURANCE COMPANY

PROPOSED INSURED
JOHN SMITH

| PRESENT ADDRESS | | CITY | | STATE | ZIP CODE |
|---|---|---|---|---|---|
| 601 WEST SIXTH ST | | AUSTIN | | TX | 78750 |

| SEX | BIRTHDATE | BIRTHPLACE | RESIDENCE TELEPHONE |
|---|---|---|---|
| ☒M ☐F | 6/30/56 | MISSOURI, USA | (512) 343 8117 |

| BENEFICIARY NAME | RELATIONSHIP TO INSURED |
|---|---|
| NANCY | WIFE |

BENEFICIARY ADDRESS
SAME

| TOTAL ANNUAL PREMIUM | PREMIUM PAYMENT AMOUNT |
|---|---|
| | $150.00 |

☐ INSURED DOES NOT MEET BASIC QUALIFICATIONS     ☐ TEMPORARY INSURANCE NOT AVAILABLE

☐ INSURED MAY BE SUBJECT TO SUBSTANDARD RATING   ☐ POLICY MAY REQUIRE EXCLUSION RIDER

☐ MEDICAL EXAM REQUIRED      DEPOSIT REQUIRED      DEPOSIT RECEIVED

[ SAVE TO DATA BASE ]                    SIGNATURE >

*FIG. 16*

DECISIONFORM - LIFE.DF

FILE  EDIT  FORM  FIELD  TOOLS                                    HELP

PREMIUM CALCULATION (GOAL)

| AMOUNT OF BASIC POLICY $100,000.00 | POLICY KIND WL-89 | AGE USED TO CALCULATE PREMIUM 34 | ☒ NON-SMOKER |
|---|---|---|---|
| ☒ PARTICIPATING | PAR POLICY DIVIDEND OPTION ☒ APPLIED TO PREMIUM ☐ PAID TO INSURED | ☐ PURCHASE PAID-UP ADDITIONS ☐ LEAVE ON DEPOSIT | |
| UL PLANNED PREMIUM | | | |

| | BASIC PLAN PREMIUM | $1,210.00 |
|---|---|---|
| ☐ PREMIUM WAIVER ON BASIC POLICY | ADB PREMIUM | $74.00 |
| ACCIDENTIAL DEATH RIDER AMOUNT $100,000.00 | YRT PREMIUM | $185.00 |
| TERM INSURANCE RIDER AMOUNT $100,000.00 | | |
| ☒ PREMIUM WAIVER ON RIDERS | WAIVER PREMIUM | $90.00 |

| DATE OF FIRST ANNUITY PAYMENT | TOTAL ANNUAL PREMIUM | $1,559.00 |
|---|---|---|
| MODE OF PAYMENT ☐ ANNUALLY ☐ SEMI-ANNUALLY ☐ QUARTERLY ☒ MONTHLY | PREMIUM PAYMENT AMOUNT | $136.41 |

*FIG. 18*

| DECISIONFORM - LIFE.DF | |
|---|---|
| FILE EDIT FORM FIELD TOOLS | HELP |

PREMIUM CALCULATION (GOAL)

| AMOUNT OF BASIC POLICY | POLICY KIND | AGE USED TO CALCULATE PREMIUM | ☒ NON-SMOKER |
|---|---|---|---|
| $100,000.00 | WL-89 | 34 | |

☒ PARTICIPATING  PAR POLICY DIVIDEND OPTION  ☐ PURCHASE PAID-UP ADDITIONS
☐ UL PLANNED PREMIUM  ☒ APPLIED TO PREMIUM  ☐ LEAVE ON DEPOSIT
 ☐ PAID TO INSURED

| | |
|---|---|
| ☐ PREMIUM WAIVER ON BASIC POLICY | BASIC PLAN PREMIUM $1,210.00 |
| ACCIDENTIAL DEATH RIDER AMOUNT $100,000.00 | ADB PREMIUM $74.00 |
| TERM INSURANCE RIDER AMOUNT $100,000.00 | YRT PREMIUM $185.00 |
| ☒ PREMIUM WAIVER ON RIDERS | WAIVER PREMIUM $90.00 |
| DATE OF FIRST ANNUITY PAYMENT | TOTAL ANNUAL PREMIUM $1,559.00 |
| MODE OF PAYMENT ☐ ANNUALLY ☐ SEMI-ANNUALLY ☐ QUARTERLY ☒ MONTHLY | PREMIUM PAYMENT AMOUNT $136.41 |

FIG. 19

DECISIONFORM - LIFE.DF

FILE  EDIT  FORM  FIELD  VIEW  TOOLS                                    HELP

PREMIUM CALCULATION (GOAL)

| AMOUNT OF BASIC POLICY | POLICY KIND | AGE USED TO CALCULATE PREMIUM | ☒ NON-SMOKER |
|---|---|---|---|
| $100,000.00 | WL-89 | 34 | |

☒ PARTICIPATING   PAR POLICY DIVIDEND OPTION
☐ UL PLANNED PREMIUM   ☒ APPLIED TO PREMIUM   ☐ PURCHASE PAID-UP ADDITIONS
                       ☐ PAID TO INSURED      ☐ LEAVE ON DEPOSIT

| | | |
|---|---|---|
| ☐ PREMIUM WAIVER ON BASIC POLICY | BASIC PLAN PREMIUM | $1,210.00 |
| ACCIDENTIAL DEATH RIDER AMOUNT $100,000.00 | ADB PREMIUM | $74.00 |
| TERM INSURANCE RIDER AMOUNT $100,000.00 | YRT PREMIUM | $185.00 |
| ☒ PREMIUM WAIVER ON RIDERS | WAIVER PREMIUM | $90.00 |
| | TOTAL ANNUAL PREMIUM | $1,559.00 |
| DATE OF FIRST ANNUITY PAYMENT | | |
| MODE OF PAYMENT<br>ANNUALLY<br>SEMI-ANNUALLY<br>QUARTERLY<br>MONTHLY | PREMIUM PAYMENT AMOUNT | $136.41 |

FIG. 20

VALUES OF: MODE OF PAYMENT

☒ AUTOMATIC

NEW VALUE

[ _____ ]   [ INSERT ]

VALUES         [ DELETE ]

ANNUALLY
SEMI-ANNUALLY
QUARTERLY      [ OK ]
MONTHLY

[ CANCEL ]

FIELD PROTECTION       [ OK ]
☐ NO OVERRIDE
☐ NO TREE DISPLAY      [ CANCEL ]

*FIG. 22*

| LINK NAME | DATABASE FILE |
|---|---|
| LIFE | LIFE |

INDEX FILE
LIFE

☒ IN_EXACT LOOKUP

| FIELD NAME | READ LINK: | WRITE LINK: |
|---|---|---|
| NAME | >PROPOSED INSURED | <PROPOSED INSURED |
| ADDRESS | >RESIDENCE ADDRES | <RESIDENCE ADDRES |
| CITY | >CITY | <CITY |
| STATE | >STATE | <STATE |
| ZIP | >ZIP CODE | <ZIP CODE |
| BIRTHDATE | >BIRTHDATE | <BIRTHDATE |
| BIRTHPLACE | >BIRTHPLACE | <BIRTHPLACE |
| TELEPHONE | >RESIDENCE TELEPH | <RESIDENCE TELEPH |

[OK]  [CANCEL]

[CONNECT]  [DISCONNECT]

*FIG. 33*

| | |
|---|---|
| LINK NAME | DATABASE FILE |
| LIFE | LIFE |

INDEX FILE
LIFE

☒ INEXACT LOOKUP

| FIELD NAME | READ LINK: | WRITE LINK: |
|---|---|---|
| NAME | >PROPOSED INSURED | <PROPOSED INSURED |
| ADDRESS | >RESIDENCE ADDRES | <RESIDENCE ADDRES |
| CITY | >CITY | <CITY |
| STATE | >STATE | <STATE |
| ZIP | >ZIP CODE | <ZIP CODE |
| BIRTHDATE | >BIRTHDATE | <BIRTHDATE |
| BIRTHPLACE | >BIRTHPLACE | <BIRTHPLACE |
| TELEPHONE | >RESIDENCE TELEPH | <RESIDENCE TELEPH |

[OK]  [CANCEL]

[CONNECT]  [DISCONNECT]

CUSTOMERS (GOAL)

BILL TO:
COMPANY:
DEPT./ATTN:
STREET:
CITY:
STATE:         ZIP CODE:

SHIP TO:
COMPANY:
DEPT./ATTN:
STREET:
CITY:
STATE:         ZIP CODE:

CUSTOMER TYPE
☐ DISTRIBUTOR  ☐ DEALER  ☐ EDUCATOR  ☐ END USER

☐ TAX EXEMPT    TAX EXEMPT NO.

[ ENTER ]
[ DELETE ]  [ CLEAR ]     [ RETURN TO ORDER ENTRY ]
[ NEXT ]    [ PREVIOUS ]  [ TOP ]    [ BOTTOM ]

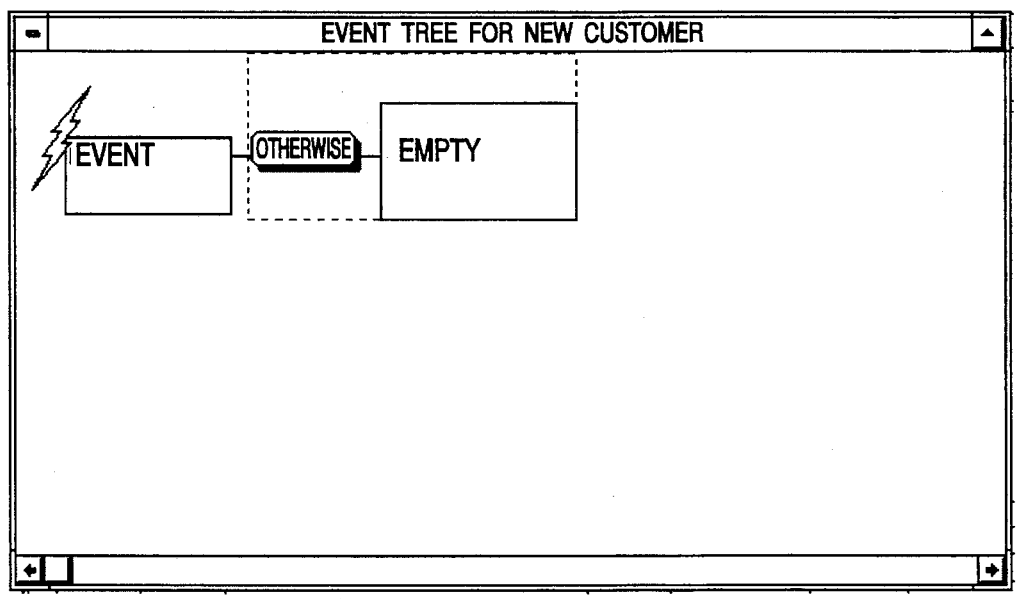
*FIG. 40A*
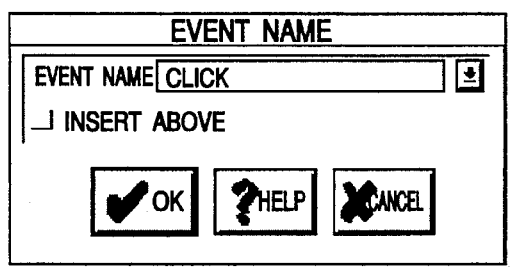
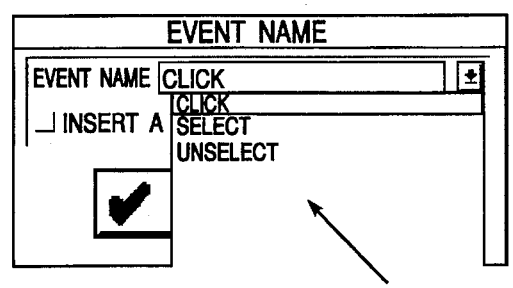
*FIG. 40B*
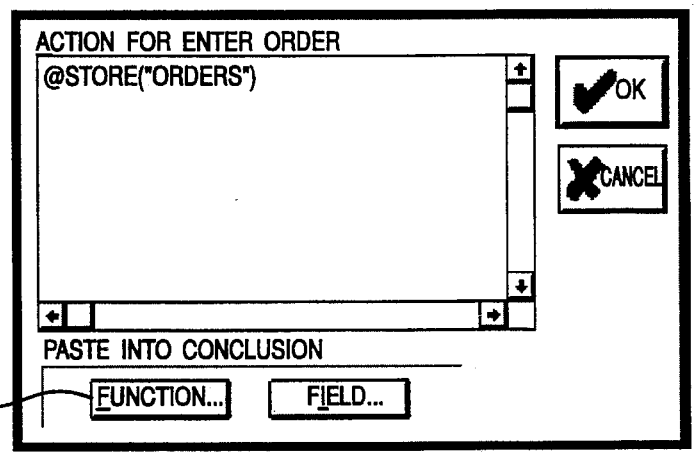
*FIG. 40C*

LOCATE INDEXES

950

| TABLE INDEX FIELD | LOCATE FIELD |
|---|---|
| BILL CO | BILL CO. |

OBJECTVISION FIELDS

<NOT CONNECTED>
AMOUNT
BILL CITY
BILL CO.
BILL DEPT.
BILL STATE
BILL STREET
BILL ZIP
BILL ZIP EXT.
CONTACT NAME

OPTIONS
☑ AUTO LOCATE
☐ INEXACT
☐ RESTRICTED RANGE

OK   HELP   CANCEL

LINK AUTOMATIC BUTTONS

AUTO BUTTONS

☐ TOP
☐ BOTTOM
☐ PREVIOUS
☐ NEXT
☐ PAGEUP
☐ PAGEDN
☐ CLEAR
☐ DELETE
☐ UPDATE
☐ INSERT
☐ STORE

AUTOMATICALLY CREATE BUTTONS ?

SELECT THE BUTTONS YOUR WISH TO CREATE FOR THIS LINK.

✓ OK

✗ CANCEL

? HELP

*FIG. 41H*

LOCATE INDEXES
1030

| TABLE INDEX FIELD | LOCATE FIELD |
|---|---|
| ORDER NUMBER | SALES ORDER |
| NO | |

OBJECTVISION FIELDS

- BILL STATE
- BILL STREET
- BILL ZIP
- BILL ZIP EXT.
- CONTACT NAME
- CUSTOMER TYPE
- DATE
- EXT.
- PHONE
- SALES ORDER

OPTIONS
- ☑ AUTO LOCATE
- ☐ INEXACT
- ☑ RESTRICTED RANGE

OK  HELP  CANCEL

*FIG. 42D*

PARADOX LINK CREATION

1050

LINK NAME: PARTS

| OV WRITE | DATABASE TABLE FIELD | OV READ |
|---|---|---|
| PART NO. | >*PART NO | >PART NO. |
| DESCRIPTION | >DESCRIPTION | >DESCRIPTION |
| PRICE | >PRICE | >PRICE |

PARADOX TABLE [ ] CONNECT
SECONDARY INDEX [ ] SEARCH...

CREATE TABLE...

OBJECTVISION FIELDS:
BILL DEPT.
BILL STATE
BILL ZIP
BILL ZIP EXT.
CONTACT NAME
CUSTOMER TYPE
DATE
DESCRIPTION
DISCOUNT
EXT.
ITEM NO.
PART NO.

[✓ OK] [? HELP] [✗ CANCEL] [OPTIONS...]

[DEFAULTS] [CLEAR ALL]

1060 LOCATE INDEXES

| TABLE INDEX FIELD | LOCATE FIELD |
|---|---|
| PART NO | PART NO. |

OBJECTVISION FIELDS
- <NOT CONNECTED>
- AMOUNT
- BILL CITY
- BILL CO.
- BILL DEPT.
- BILL STATE
- BILL STREET
- BILL ZIP
- BILL ZIP EXT.
- CONTACT NAME

OPTIONS
- ☑ AUTO LOCATE
- ☐ INEXACT
- ☐ RESTRICTED RANGE

[OK] [HELP] [CANCEL]

DEVELOPMENT SYSTEM WITH METHODS FOR MAINTAINING DATA INTEGRITY OF INFORMATION STORED AS A DATA RECORD IN A DATABASE WITH A COPY OF THE INFORMATION DISPLAYED ON A SCREEN DEVICE

The present application is a continuation-in-part application of application Ser. No. 07/606,537, filed Oct. 31, 1990, which was abandoned in favor of application Ser. No. 08/132,676, now allowed, the disclosure of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to system and methods for software development. More particularly, the invention relates to visual programming system and methods for the generation of standalone application software.

With the increasing popularity of the personal computer, the use of computer systems is permeating all aspects of everyday life. Running application software such as word processors and spreadsheets, for example, most workers can realize substantial productivity gains. And with the advent of graphical user interfaces (GUIs), such as Microsoft® Windows, computers have become more powerful, yet easier to operate.

While GUIs are easy for the users to use, they are by no means simple to program. Instead, the intuitive user interface belies an extremely complex system, one having hundreds of API (Application Programming Interface) calls. A simple "Hello World" Microsoft Windows program written in C, for example, requires a hundred or so lines of source code. Besides the sheer bulk of the API, however, the programmer faces an even greater challenge—that of understanding the intricacies of a message-driven environment. The task of developing application software for a GUI is a substantial undertaking.

Of particular interest to the present invention is application software used to gather and organize information, particularly information suitable for representation in forms. Forms to gather data are employed daily in almost every commercial activity, in schools, and in all levels of government activity. It is a rare occurrence that an individual's life is not frequently touched by many forms. In the past, forms have been prepared by many processes ranging from hand and typewriter printed forms to engraved and mass produced forms. Prior to the advent of pervasive computing facilities, forms were completed by hand or by a typewriter and were generally interpreted by an individual.

Today, there are many software packages which are capable of creating very fine printed forms. The recent proliferation of "Desk top publishing" software and of laser and inkjet printers has brought creation of good printed forms within the reach of individuals with high end personal computers as well as businesses.

Today, many electronic forms are completed by individuals using a keyboard and/or a mouse or other pointing device; the data thus gathered is possibly stored for later reference; and a report is printed for an immediate purpose.

In prior art systems known to me, to the extent that forms provide prompting of fields to be completed, the fields are presented in sequence without regard for the data entered in the course of completing the form. If a form is extensive, there may be prompting for information which is not relevant in the context of the answers which have been entered. This is wasteful of operator time since unnecessary information is often requested.

In the prior art, in order to avoid prompting for unnecessary information, a first limited form is presented for completion; the entries on that form are evaluated by an individual; and a decision is made to require completion of one or more additional forms. Since there is no automatic prompting for completion of additional forms which are dictated by answers on the completed form, the operator is unduly burdened with the decision process; and operator time is wasted.

Additionally, forms are often used to describe and organize a complex decision process or "business policy". As such, the form contains blanks for both the inputs and results of the decision process. However, the form itself it typically very poor at describing the decision process other than by including notes in the margins. For this reason, many forms are accompanied by an instruction sheet, or "policy manual", which the operator must read, interpret, and apply in the process of completing the form. This is wasteful of operator time, makes it harder to disseminate new decision processes, and results in many forms being completed incorrectly. This weakness of paper forms is not effectively addressed by current form software packages.

SUMMARY OF THE INVENTION

In accordance with the present invention, a system is provided for generating and using form data files which define: (a) a graphical image of a goal oriented form for display on a monitor; and (b) a graphical image of at least one decision tree comprised of branches and conclusions which are discretely associated with fields of the form and which define logical and/or mathematical operations which implement goal oriented prompting within a form and among forms of a set of forms.

Further, in accordance with the invention, a system for generating form data files defines: (c) reading and writing links between fields of the form and a variety of data sources and destinations; and (d) other forms which, with the subject form, comprise a related set or "stack" of forms.

For purpose of clarification, a "goal oriented" electronic form is one in which the prompts for answers generally flow through the form from left to right; and from top to bottom of the form; and the ongoing pattern of prompting is conditioned on answers provided to the form or on data obtained from referenced sources. Advantageously, as the answers to the field prompts are entered, fields which need not be answered are skipped, and fields on the same or a linked form are prompted in the desired sequence.

In the event that an individual completing a report, by choice, revisits a completed field and enters a new value in the field, the system automatically executes a prompting sequence consistent with that new value, and calculates new values for fields which are dependent on the value in the changed field. Advantageously, it is thus possible to try various "what-if" scenarios. This feature of the system is termed "truth maintenance" since only valid and necessary prompting is implemented; and all calculated results are consistent with the values in the completed fields of a form.

In accordance with the invention, the system provides a set of intuitive "creation" tools which readily permit creation of the above referenced form files. In an illustrative embodiment of the invention, form creation is divided into four natural selectively reentrant activities: an initial specification of the fields of a form to be created; specification of the tree branches and conclusions to implement the intended logical and mathematical relations of the form; specification of reading and writing links to selected data files; and specification of relations between forms to define a stack of related interdependent forms.

Advantageously, these activities can be performed in any desired order; and each activity can be reentered selectively to make additions and/or corrections in order to accommodate thoughts which occur in the course of form creation.

Furthermore, at any point in the process of form file creation, it is possible to selectively display: the current form; any selected part or all of the related tree structure; links to data sources and destinations; and the contents of a stack and the order of the contents in the stack.

In accordance with the invention, if during the course of creating a form, an expression assigned to a branch or conclusion references a form field which does not exist, the system automatically creates a new field which adopts the established name. Subsequently, a field may be placed on the form to hold that name; however, if no field is assigned on the form, the system automatically prompts for a value at the appropriate place during the completion of the form. The prompt for such a field presents a prompt window that requests selection of a value for the question that does not appear on the form; however, a value is required for that field since continued prompting in the form is dependent on the value selected.

In accordance with the invention, if during the course of creating a form, links are requested to a data base which does not exist, the system automatically creates a new data base with fields, which adopt the established names and characteristics of the fields contained in the form system.

In accordance with the invention, "help" information may be assigned to a field during form creation; and that help information is available to an operator during form completion.

In accordance with the invention, "run time" software is provided for operator completion, but not alteration, of previously created forms. The "run time" software permits an operator to selectively view the trees associated with a form being completed to provide an understanding of the logical and mathematical relations and processes embodied in the form. Advantageously, the graphical tree displays identify "active" and "inactive" tree branches in accordance with data gathered in the form prior to display of the tree.

Advantageously, the form system automatically reformats horizontal segments of a graphical display of a tree that covers two or more horizontal segments and two or more vertical screens in order to minimize the number of vertical screen displays required to show the entire horizontal segment.

Advantageously, the system may be used to both create and complete goal oriented forms to implement inquiries in any situation in which the relations and functions of the fields of a form can be described by a tree of branches and conclusions.

Although the forms provide goal oriented prompting, an operatorsmay choose to depart from the suggested order of form completion. In accordance with the invention, a "resume" function is provided which may be manually selected to return to goal oriented prompting for further answers required to complete a form.

During completion of a form, a field may require selection of a value from a defined set of values. The list of values, from which a selection is to be made, may be created manually during form creation; or may be derived from tree statements which: (a) are attached to the field and create answers which correspond to the selections in the list; (b) rely upon selection of a value from the list to complete evaluation of an expression; or (c) are established by a link to a database which provides values contained therein.

In the course of form creation, the display of fields which require selection of a value from a set of values, as a design choice, may be defined as "selection list" fields or "check box" fields.

In the case of a "selection list" field, a dialog window with a list of values is presented for selection of a value when the corresponding field is prompted for an answer. A selection is made by moving a cursor over the desired item and clicking the mouse or depressing the return key.

In the case of a "check box" field, each value of the list is displayed with a small box for placing a check mark. In accordance with the invention, the form system automatically generates a field object which contains a number of selection boxes equal to the number of possible selections. Advantageously, the system automatically arranges the display of the set of selection boxes to match the size and shape of the field on the form. If the allotted field space is too small to accommodate all of the check boxes and their name text, the field is automatically defaulted to a "selection list" field.

In accordance with the invention, keyboard entries are checked against "field characteristics" which are assigned to a field during form creation. If a keyboard entry for a field is not consistent with the assigned characteristic, the entered value is rejected and an error message advises the operator of a problem. Such characteristics can be assigned to a field by standard "picture" specifications. Alternatively, requirements for the form of a field input can be established by local form rules which are implemented by decision trees attached to the field. As an option, upon the occurrence of an error in input format, the field in error can be cleared and the prompt returned to that field to continue form completion.

In accordance with an aspect of the invention fields of a form may be designated as "protected" or "unprotected" at the time a form is created. Values cannot be entered manually in a "protected" field since only the values calculated for the field are considered valid. Even though a value may be automatically calculated for an "unprotected" field, a value may be entered into the field manually to handle exceptional conditions. Fields with this characteristic are termed override fields. Advantageously, in accordance with the invention, the system clearly marks or flags both the display and printing of fields which contain over ride values.

BRIEF DESCRIPTION OF THE DRAWINGS

FIG. 3 is a general view of the major elements of the goal oriented form software;

FIG. 4 is a general view of a form image data file;

FIG. 9 is the first form in a set of four forms for an application for life insurance example;

FIG. 11 is the third form in a set of four forms for an application for life-insurance example;

FIG. 12 is the fourth form in a set of four forms for an application for life insurance example;

FIG. 13 illustrates a window with a "goal" life insurance application for completion or modification;

FIG. 14 illustrates the display of a second form for prompting of values necessary for completion of a goal form;

FIG. 16 illustrates the indication that a value for a field on a form has been overridden by a user;

FIG. 18 illustrates the automatic arrangement of check boxes in a vertical region;

FIG. 19 illustrates the automatic arrangement of check boxes in a horizontal region;

FIG. 20 illustrates the automatic presentation of a selection list when insufficient space is provided in a region for check boxes;

FIG. 21 is a dialog box for automatically or non-automatically specifying values expected for a field;

FIG. 22 is a dialog box for specifying field protection;

FIG. 33 is a dialog box for establishing links between fields in the form system and fields in related database(s);

FIG. 34 is a dialog box for selecting the option to create a new database file when there is no established file.

FIG. 36A is a screen bitmap illustrating an Order Application, with an order entry form illustrated;

FIGS. 38A–B are screen bitmaps illustrating the creation of a complex value tree of the present invention;

FIGS. 40A–E are screen bitmaps illustrating a method of the present invention for creating event trees;

FIGS. 41A–I are screen bitmaps illustrating a method of the present invention for visually linking fields to external databases;

FIGS. 42A–F are screen bitmaps illustrating a method of the present invention for connecting table object columns to external databases;

Figure 1:
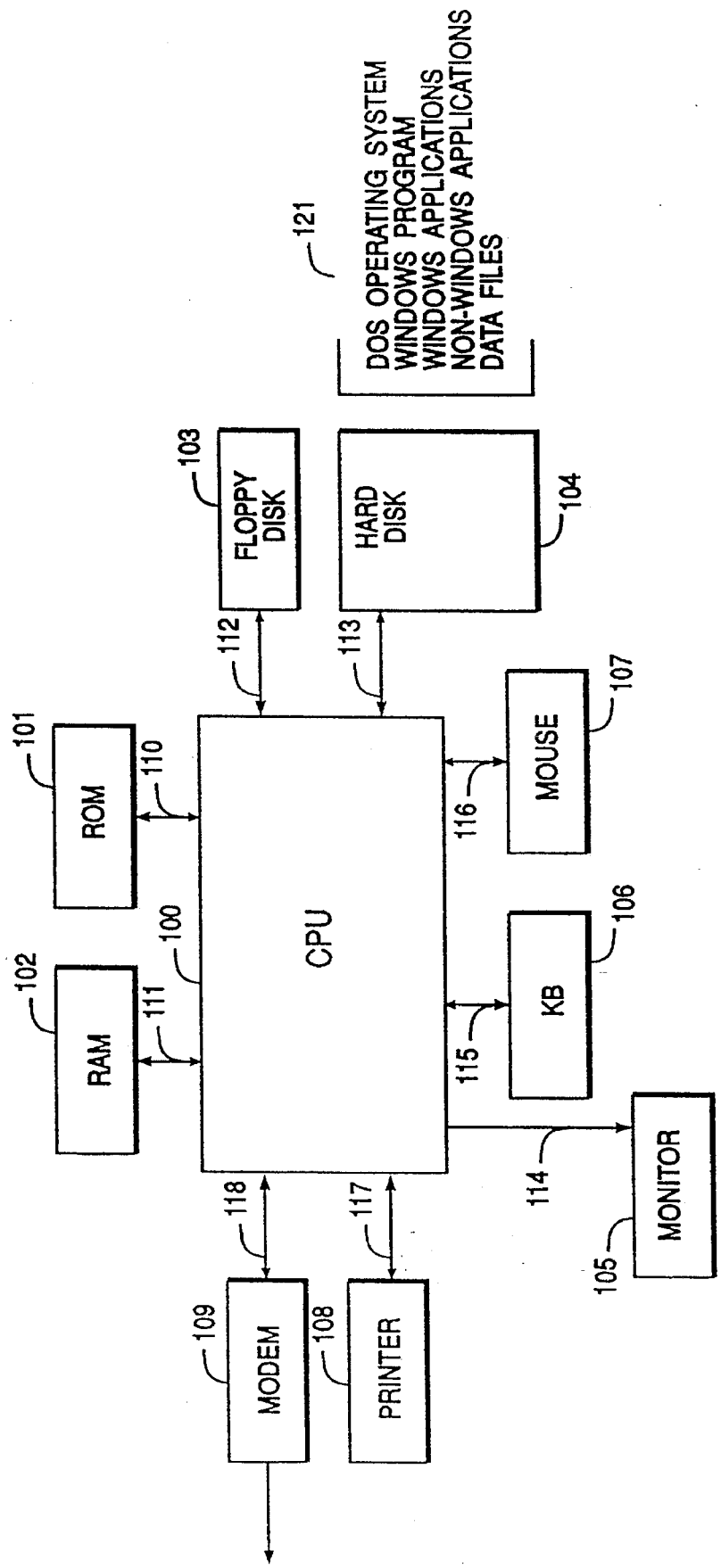
FIG. 1 is a block diagram of a personal computer

GLOSSARY active form: The form currently being completed or edited; it appears in front of all other forms in the application.

active window: The window the user is currently working in; the one that always appears in front of any others and has a title bar highlighted with a different color or intensity.

argument: Specific information required by an @function. Most @functions require at least one argument.

block selection: In the Form Tool, lets the user select multiple objects in order to perform editing operations, assign or revise properties, or reposition the selected fields as a group of objects.

branch: A series of related calculation-logic segments or steps that lead to a tree's conclusion.

branch node: A segment of calculation logic (simple or complex) that selects a node below it by evaluating its associated field value. The name of the tree's evaluated field appears inside the branch node.

button: An object of the system that can be used to initiate an action. Buttons can be automatically created by the system when a link is first created.

calculated field: A field that uses underlying decision logic to produce its value. A calculated field is indicated by a solid outline with an inner dotted line when it is selected.

calculation logic: An expression, operation, or constant in a field's tree that computes its value.

cell: An individual container for a value in a column of a table object.

choose: To execute or carry out a command, or to activate a command button.

circular logic: When a conclusion expression refers to its associated field, it re-prompts the user for the field value. Circular logic is used to prompt the user when all other conclusions in the tree are inappropriate.

Clipboard: A temporary holding place for objects or forms. After you cut or copy something in the system, it is placed here. The user can open another system application and paste the Clipboard contents into it.

column: An object similar to a field, except it contains multiple values. Only one value in a column is current at a time. A column is not an independent object—it is an aspect of a system table object.

complex branch node: An individual segment of calculation logic that requires evaluation of one or more trees from other fields. A complex branch node is indicated with a flow chart symbol to remind the user of other, underlying logic.

concatenation: The joining of two or more text strings into a single text string.

conclusion: The segment or step of calculation logic that is evaluated to determine the resulting value of a field's tree. The conclusion expression is located in the end node for a logical path in a field's tree.

conclusion node: The ending segment of calculation logic that provides a value to the field. A conclusion node is indicated by an inverted triangle placed to the left of the conclusion expression.

condition: The segment or step of calculation logic that is evaluated to determine what node is selected next.

currency: The formatting of monetary figures which includes the symbol corresponding to the country of issue. In Windows, the currency formatting is set in the Control Panel using the International application.

current row: Only one row in a table object can be the active, or current, row. When a row is active, the values in the row can be edited. The current row is indicated by the row pointer, a right-pointing triangle next to the left border of the table object.

DateTimeNumber: An argument that is a number in the range −36,522 (Jan. 1, 1800) to 73,050 (Dec. 31, 2099). The decimal portion of DateTimeNumber represents the time from 12:00 noon to 11:59:59 p.m. and is computed as a fraction of a 24-hour day.

DDE (Dynamic Data Exchange): The Windows protocol for dynamically transferring data between Windows applications. DDE links require both the Windows application and its document file.

decision logic: A process defined as a series of small steps, or nodes. Decision logic is graphically represented for each field's tree.

decision path: The segments of calculation logic used to determine a field value. This path is indicated with a bold line when a field's tree is displayed using Field!Show Tree.

default value: A calculated field value that can be overridden by the user. In the Order application, the Date field has a default value defined by the @TODAY function.

default properties: Object characteristics that define the display format and appearance of the next object created. These characteristics remain in effect until changed.

Dynamic Data Exchange: See DDE.

Edit status: The status of the active form in the Form Tool. [Edit] appears in the form's title bar to indicate that it receives the actions the user performs.

empty node: Appears when a field has no value tree or event tree, or a branch node has no nodes under it. If an empty node is evaluated, an error value is returned.

event: An event is something the user does during a system session. For example, opening an application, selecting a form, entering a value, or clicking a button. Events can happen to an application, a form, or an object.

event tree: A graphical representation of the logic and instructions used to recognize an event and initiate an action.

expressions: One uses expressions to create complex mathematical, logical, string, or @formula operations for evaluating complex value combinations. For example, one might use expressions to multiply a series of numbers or get data from external data files.

external file: An ASCII or database file used in a link. The file can be created from within the system or in another application. Although a system form can be saved with a single set of values, most applications benefit from linking to external files that contain multiple values.

field: A uniquely named object that contains a value either entered by a user, calculated, or delivered by a link. A field that is not put on any form automatically appears on the Scratchpad form.

field sequence: The order of user movement between the fields on a form. The field sequence is determined by the physical ordering of the fields from left to right and top to bottom. The relative position of the field's bottom right corner determines whether it is before or after another field.

font: A typestyle used for a field label, field value, or a text object.

form: A uniquely named object that contains a collection of other objects, analogous to a paper form. A form is the primary interface between your system applications and users.

form completion: When a user fills in a system application's field values. After a form is completed, the status indicator in the title bar reads [Complete].

Form Tool: The window where the application designer can create and edit forms and their objects (fields, tables, buttons, text, rounded and filled rectangles, lines, and graphics).

@function: Performs calculations and operations within a field's calculation logic. Built-in system @functions are compatible with electronic spreadsheets and typically require at least one argument, or function-specific information.

Goal form: The top form in the application's stack of forms. The Goal form appears when a user first opens the system application. When another form is selected by the user (interrupting guided completion), it becomes the Goal form.

graphic: A Windows Paintbrush (.BMP) or Windows metafile (.WMF) image. A graphic is placed on a form in the system using the Objects!Graphics command.

guided completion: When a user presses Enter, only a field requiring user input is selected next. If a user interrupts this method of selection by selecting some other field, guided completion can be restarted with File!Resume.

handles: In the Form Tool, small black squares in the corners of a selected object or at the ends of a selected line. The user can select and reposition handles to change the object's shape or length.

index fields: A single field or multiple fields in a database table that lets a database program or the system locate records quickly. Generally, only unique values—such as telephone numbers—are used for indexes. When multiple fields in a database table are index fields, the records are sorted more than once.

label: An object name, such as a field name, a table name, or a column name. In the Form Tool, a label string can be changed using the Properties!Name/Text command and the label font can be changed using the Label Font command.

Also, a constant string value that does not need to be enclosed in double quotation marks.

label prefix: A single quotation mark (') used as the first character of an expression to force that expression to be evaluated as a label.

links: The part of a system application used to read from and write to ASCII, Paradox, dBASE-compatible, and Btrieve data files. Additionally, read and write links can be created for Dynamic Data Exchange (DDE) files. Links are created with the Tools, Links dialog box or using @functions.

Links Tool: The system dialog boxes where you can create, modify, or delete links to external data files.

literal characters: In a picture string, any number, letter or punctuation character that is not a match (# ? & @ !) or reserved (* [ ] { } ,) character. To use a match or reserved character as a literal character in a picture string, precede it with a semicolon.

load statement: The area in the Windows system file WIN.INI where the user can instruct Windows to load the system whenever Windows is first loaded.

Locate field: The most important link option. The locate field is the system field that triggers a link to deliver values from a connected data source.

logical expressions: A segment or step of calculation logic that evaluates as either 1 (true) or 0 (false). Logical expressions are typically used with @functions in conditional statements.

match characters: In a picture string, the unique characters you use to define a kind of pattern for the value users type into a field. The match characters are

(digit only)
  ? (letter only)
  & (letter only, convert to uppercase)
  @ (any character)
  ! (any character, convert letters to uppercase)

maximize: To enlarge the active window so it occupies the entire Windows desktop by clicking the Maximize button or choosing the Control!Maximize command.

minimize: To reduce the active window to an icon on the desktop by clicking the Minimize button or choosing the Control!Minimize command When an application is minimized, it is still loaded in memory.

multiple selection: In the Form Tool, highlighting several objects so subsequent actions are carried out on them all at once.

nesting level: In a value or event tree, the number of positions away from the root node. Branches that are the same distance from the root node are at the same nesting level.

In an @function or expression, parentheses enclose operations to be performed independently, and the contents of the innermost set of parentheses are always evaluated first. For example, in the expression @INT(@MOD(@NOW, 7)), the @NOW function is nested inside the @MOD function and is evaluated first to provide the single argument required by @MOD.

node: An individual segment or step of calculation logic that is used to evaluate a field value. A node can be an empty node, a simple or complex branch node, a root node, or a conclusion node.

object: Any element you can place on a form, such as a table object, a field, text, filled or rounded rectangles, a line or a graphic. Objects can be assigned different properties, or attributes.

operators: Used to express a relationship (logical, mathematical, or string) between two or more values. The result of an expression depends on the order in which the operations are performed.

override: Calculated fields that are unprotected let a user enter a new value. After a users overrides a calculated value, the field displays a dot pattern. The calculated value can be restored using Field!Calculate paste: The Form Tool action of transferring data from the Clipboard to the active window. Or, transferring list items to an expression using the Paste Function or Paste Field buttons in a value tree or an event tree.

picture: A pattern the user specifies to control values that users type into a field during data entry.

picture string: The pattern of literal, match, and special characters the user types into the Field Type!Picture!Picture String dialog box to define a template or pattern for a field value entered by the user. For example, you could type a telephone number or Social Security Number pattern users would have to follow.

points: A typographers measure of font size, roughly equal to 1/72 of an inch. The default Label Font is 8-point Helvetica, and the default value font is 12-point Courier.

precedence: The order in which operations are evaluated in an expression. Certain operators are always evaluated after others, unless nested.

properties: These are the attributes of objects that are defined in the Form Tool. For example, properties can include object names, display attributes, data formats, font characteristics, borders, protection, help text, value trees, and event trees.

property inspection: In the Form Tool, the user can inspect the properties for an object, a form, or a stack, by clicking it with the right mouse button. An inspector lists all properties for the selected object, and lets the user modify the settings.

protection: A field property the user assign with Properties!Protection to keep users from changing the field value or viewing a tree.

reserved characters: In a picture string, the unique characters the user must precede with a semicolon when he or she wants them to appear as literals in the field value. The reserved characters are * [ ] { } ,.

restricted range: This link option specifies that only those records that exactly match an entered value are delivered to the form.

root node: The first (leftmost) segment of calculation logic in a value or event tree. The root node of a value tree can be either a branch node or a conclusion node.

row pointer: A right-pointing triangle that indicates the current or active row in a table object. The row pointer displays to the left of the first column in a table object run statement: The area in the Windows system file WIN.INI where you can instruct Windows to load and then run the system whenever Windows is first loaded.

Scratchpad form: The form the system automatically creates to display any field not on a form, when the user is required to enter a value in that field.

select: To position the pointer on an item and highlight that item. The highlighted item will receive the next action that the system performs.

selected field: A selected field can be indicated with a solid line, a solid line with an inner dotted line, or a solid line with a dot pattern over the field. Everything a user types appears in this area on the form. In the Form Tool, a selected field object is surrounded with a dashed line and has small black squares on its corners (for a field) or on its ends (for a line).

simple branch node: An individual segment of calculation logic that is not dependent on trees from other fields.

stack: The set of forms in the system application, as displayed in the Stack Tool. The Goal form is the top form in the stack.

Stack Tool: The window that displays the order of forms in the user's application and lets you add, copy, paste, delete, or rearrange forms.

status: The application title bar displays the form name and the state, or condition of the form: [Goal], [Complete], [Prompt], or [Edit].

syntax: The acceptable format for defining expressions or @functions in the system. For example, all expressions must begin with one of the following characters:

```
0 1 2 3 4 5 6 7 8 9 . + - ( @
``` table object: An object that contains multiple values, organized in n columns by n rows, where n is one or more.

Title bar: The highlighted horizontal bar at the top of a window. The title bar contains the name of the active application, form, or tool. Form title bars also contain the status of the form: [Goal], [Prompt], [Complete], or [Edit].

values: The data contained in fields. A user can type values, select them from a list, or check them; a system application can calculate values or read them from an external data file.

value trees: A graphical representation of the logic and instructions used to evaluate a value and calculate a value.

DETAILED DESCRIPTION

The illustrative embodiment of the invention is disclosed as an application program running under Microsoft Windows graphical environment program on an IBM compatible PC.

Notwithstanding, disclosure of the invention in this particular environment, the principles of the invention can be implemented as a program which includes an integral interface facility; or in the context of other interface environments.

Although the graphical images and protocols employed by the form system are generally driven by the Windows environment, the system includes menu features which are not present in or contemplated by Windows. The general features, functions and protocol of Windows are described later herein with the introduction of the opening window of FIG. 5.

FIG. 1 is a very general block diagram of an IBM compatible personal computer (PC) which supports the Microsoft Windows graphical environment, and, in turn, Windows supports the form system which is described herein.

The central processing unit (CPU) 100 typically employs a processor of the Intel™ family of microprocessors. The read only memory (ROM) 101 contains the basic input output system code (BIOS) for addressing and controlling floppy disk 103, hard disk 104 and printer 108. Random access memory (RAM) 102 is the working memory for CPU 100. In a typical Windows installation, RAM of two megabytes or more is employed.

Monitor 105 of FIG. 1 provides a visual display; keyboard (KB) 106 and mouse 107 provide for manual input to any process running on the PC. Printer 108 creates hard copy images of output of the PC; and modem 109 provides communication between the PC of FIG. 1 and other computers.

In FIG. 1, hard disk 104 is illustrated as containing a body of program and data information 121. Included in this body of information is a disk operating system (DOS), the Windows graphical environment system software; user application programs which operate under the Windows environment; user application programs which do not employ the Windows environment facilities; and data files of all sorts.

Figure 2:
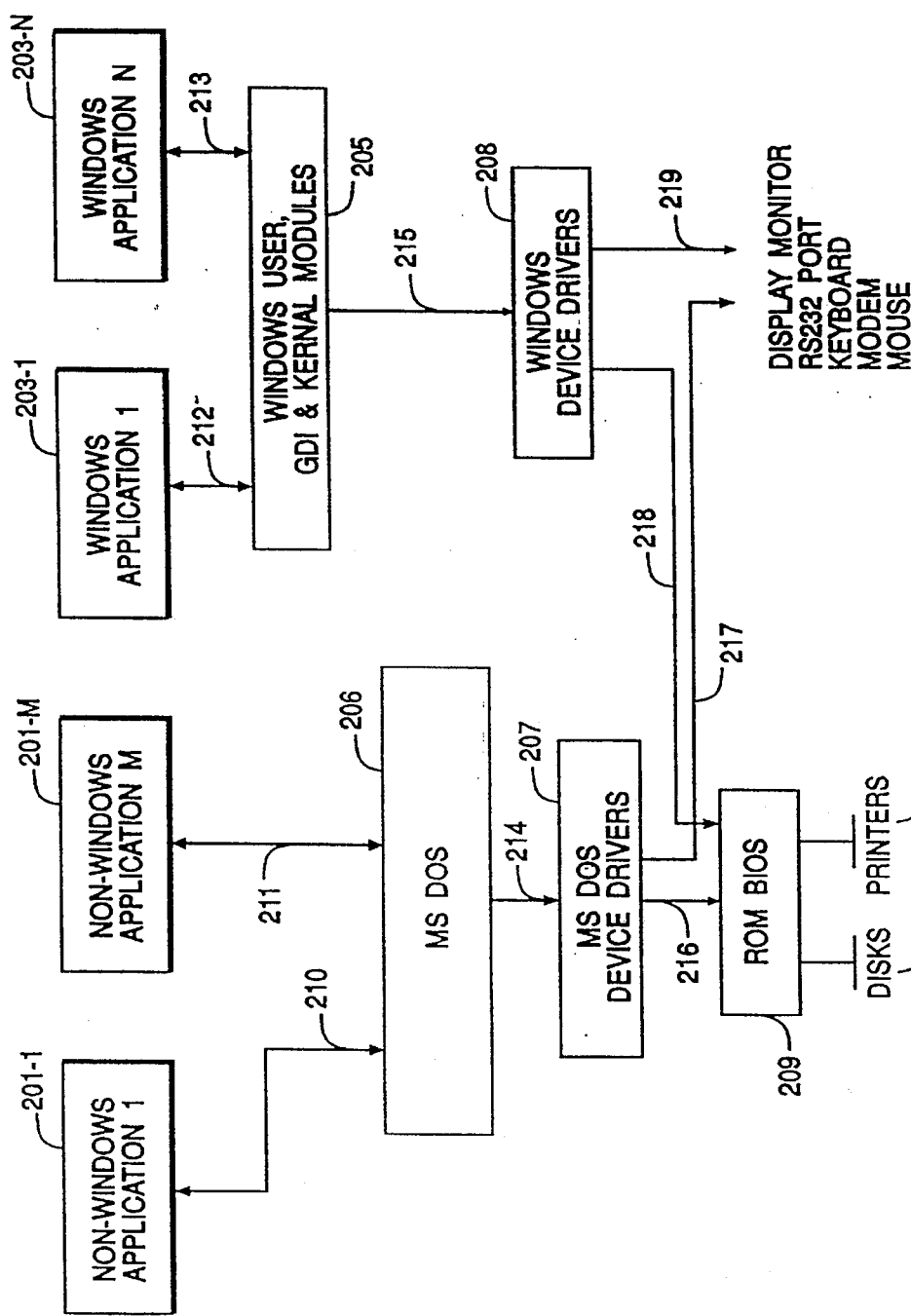
FIG. 2 is an overview of software employed in the personal computer of FIG. 1.

FIG. 2 illustrates, in a general way, the interaction and flow of information between the illustrated software entities.

Non-Windows application programs 201-1 through 201-M are served by the CPU 100 operating under Microsoft Corporation MS DOS system 206. Programs and data flow between Non-Windows applications 201-1 through 201-M and MS DOS 206 via paths labeled e.g., 210, 211. Paths 210, 211 are symbolic paths and are not intended to represent physical paths.

The MS DOS operating system 206 employs MS DOS software device drivers to control the disks 221 and printers 222 through the facilities of ROM BIOS 209. MS DOS device drivers also control system communication with the display monitor, an RS232 port, a keyboard, a modem and a mouse.

Windows application programs 203-1 through 203-N are served by Windows graphical environment software 205. The windows software comprises: User, graphical device interface (GDI) and Kernel modules. Symbolic communication paths 212 and 213 pass function calls to Windows software 205 and responses to the respective Windows application software.

Windows device drivers 208 are the counterpart of MS DOS device drivers 207 and serve the same functions.

In FIG. 3, box 300 represents the major software modules of the form system. In accordance with the invention the form system comprises two modes of operation, namely "form creation" and "run time" form completion. Form creation comprises four phases:

(1) Definition of: a form image for all forms of an application, names of fields of the form or forms, and field characteristics;

(2) Definition of the forms of a related set, i.e., a "stack" of forms and the assigned order of the forms in the set. When a form set is opened for completion, the defined order establishes which form of a set is the initial "goal" form, and the order in which the other forms of the set are presented for completion;

(3) Definition of decision tree structures comprising branches and conclusions which are assigned to the fields of the forms which comprise a related stack of forms; and (4) Definition of reading and writing links between fields of a form and extrinsic data sources and destinations.

The four tool modules, 301 through 304 serve in the implementation of phases 1 through 4 referenced above herein. Tool modules 301 through 304 are not available in the run time form completion mode of operation.

Memory manager module 305 manages the assignment of memory space. This module performs common functions for the other modules relating to the allocation and deallocation of portions of memory to contain data structures. It does this by allocating large portions of memory from Windows and dividing these into smaller portions as needed by the other modules. The memory manager also maintains a list of names used for forms, fields, system functions, and links (called a symbol table) so that the portion of memory associated with these items can be located and referenced by its name.

Form execution module 306 and tree execution module 307 serve in implementation of the goal oriented form completion mode of operation. These modules are also available for use in conjunction with tools 301 through 304 during form creation.

Link manager module 308 implements reading and writing communication with the extrinsic data sources and destinations defined during form creation.

File I-O subsystem-module 309, among other functions, controls the transfer and the form of data as it is moved between the hard disk and the RAM main memory of the PC.

Windows interface module 310 provides communication between the form system and the Windows graphical environment software.

FIG. 4 represents the major divisions of the "form image data file" which is generated during form creation and is maintained in disk memory.

The form image data file shown in FIG. 4 represents a file format in which my graphical image data file for documents are saved on disk; its structure and operation will now be described in detail. The file is a binary file and can be considered to be a sequence of variable length chunks of data called records. Each record begins with a 2-byte ID data byte followed by 4 bytes which define the length of the remainder of the record. The last record of a file is an EOF (End-of-File) record.

Information is preferably stored as follows. Character data, numeric data, or other single-byte data are in ASCII format. Multiple-byte data, on the other hand, is stored in little-endian form, i.e., the least significant byte comes first. This is the natural byte order for little-endian machines like those based on the Intel 8088 architecture and its descendants. Implementation of the form system on big-endian machines, like those based on the Motorola 68000 and its offspring, require a byte swap on all multiple-byte data.

Environment specific information is stored in a Form Picture (FORMPICTURE) record. Because an implementation can ignore records that it does not recognize (e.g., u2PictureFormat described below), picture definitions for multiple environments can coexist, i.e., a file can contain both a Macintosh and a MS Windows version of a picture and as a result be run on either system.

DATA ELEMENT NAMING

In a preferred embodiment, a convention is adopted whereby the name of each data element implies its format on disk. For example, the name u2DummyData, as identified by its prefix "u2", is a 2 byte unsigned integer with the least significant byte first. If a name has no prefix (i.e., has an initial capital), it is a complex structure or sequence defined elsewhere. Other exemplary prefixes are defined in the following table:

TABLE 1

Name Prefix Definitions

| Prefix | Meaning |
| --- | --- |
| u1 | 1 byte unsigned integer |
| u2 | 2 byte little endian unsigned integer |
| u4 | 4 byte little endian unsigned integer |
| sv | variable length string (u2 length of string followed by string w/o null termination) |
| dv | variable length data (see separate definition) |
| ov | variable length object code (see separate definition) |

GENERAL DATA FILE FORMAT

In an exemplary embodiment, every record may be organized as follows:

TABLE 2

Record Organization

| Name | Comments |
| --- | --- |
| u2RecordType | Record type |
| u4RecordLength | Length of data portion |
| <data portion of record> | Actual data |

For simplification, the 6 header bytes (record type and length shown above) will not be repeated below when describing individual records.

Preferably, records of a graphical image data file are ordered. Some of the records may not be present (depending on the needs of the user's application), however. An exemplary order of records may be defined as follows:

Table 3: Order of Records

BOF
IGNORE_REMOTE
FORMNAMES
FIELDNAMES
FONTNAMES
for each form
FORMSIZE
for each field, text, picture, or pattern
FORMFIELD, FORMTEXT, FORMPICTURE, or FORMPATTERN
for each field
FIELDTREE
FIELDHELP
FIELDEXPECT
FIELDVALUE
for each dbase link
DBASE_LINK
for each DDE link
DDE_LINK
for each ASCII link
ASCII_LINK
EOF

RECORD DEFINITIONS

Each record will now be described. The Beginning-of File (BOF) record (type=1) includes an application identifier (u2ApplicationId) and a version identifier (u2Version). The BOF record is typically the first record in every graphical image data file. Following the BOF record is the Ignore Remote (IGNORE_REMOTE) record (type=2). It includes a Ignore Remote Requests (u1IgnoreRemoteRequests flag which stores one of the following values: 1=ignore remote requests, or 0=do not ignore remote requests. When enabled, the flag causes the application to ignore remote requests for data (such as an application request through Microsoft Windows DDE).

Next, the Form Names (FORMNAMES) record (type=3) stores Number of Forms (u2NumberOfForms), which specifies a count of the number of Form Name (svFormName) which follow. A form's position in this list of names is its ID, beginning at 1, for use elsewhere in this file. In a like manner, Field Names (FIELDNAMES) record (type=4) stores stores Number of Fields (u2NumberOfFields), which specifies a count of the number of Field Name (svFieldName) which follow. Here, a field's position in this list of names is its ID, beginning at 1, for use elsewhere in this file.

Font information is maintained in the Font Names (FONTNAMES) record (type=5). The record comprises a list storing a Number of Fonts (u2NumberOfFonts); this is followed by Font Name (svFontName), Font Size (u2FontSize), and Attribute Mask (ulAttributeMask) for each font. For the latter, exemplary values include FONT_UNDERLINE (0x04), FONT-ITALIC (0x02), FONT_BOLD (0x01). A font's position in this list is its ID, beginning at 1, for use elsewhere in this file.

The size of a form is specified by the Form Size (FORMSIZE) record (type=6). It includes a Form Id (u2FormId) established in FORMNAMES, a horizontal size (u2xSize) typically in units of ¼ character width, and a vertical size (u2ySize) typically in units of ⅛ character height.

A field item on the form identified in the last FORMSIZE record is defined by a Form Field (FORMFIELD) record (type=7). It includes a Field ID (u2FieldId) which is established in FIELDNAMES; a horizontal location (u2xLoc) in units of ¼ character width; a vertical location (u2yLoc) in units of ⅛ character height; a horizontal size (u2xSize) in units of ¼ character width; a vertical size (u2ySize) in units of ⅛ character height; and finally a Property List (PropertyList) for the field item (last property is always end of page (EOP)).

A text item on the form identified in the last FORMSIZE record is defined by a Form Text (FORMTEXT) record (type=8). It stores ASCII text (svText), a horizontal location (u2xLoc) in units of ¼ character width; a vertical location (u2yLoc) in units of ⅛ character height; a horizontal size (u2xSize) in units of ¼ character width; a vertical size (u2ySize) in units of ⅛ character height; and finally a Property List (PropertyList) for the field item (last property is always EOP (end of page)).

A picture item on the form is defined by Form Picture (FORMPICTURE) record (type=9). It includes a horizontal location (u2xLoc) in units of ¼ character width; a vertical location (u2yLoc) in units of ⅛ character height; a horizontal size (u2xSize) in units of ¼ character width; and a vertical size (u2ySize) in units of ⅛ character height.

The record includes a Picture Definition (PictureDefinition) storing the picture in one or more picture formats. In this manner, each implementation may pick the first picture format it recognizes. An exemplary Picture Definition includes Picture Format (u2PictureFormat), 0x01 representing a MS Windows BitMap file; Length (u4Length), number of bytes that follow; File Name (svFileName), a file containing a picture; Picture Format (u2PictureFormat), where 0x02 represents a MS Windows Metafile; Length (u4Length), showing the number of bytes that follow, File Name (svFileName), the name of file containing the picture; Map Mode (u2MapMode); Picture Format (u2PictureFormat); Length (u4Length), number of bytes that follow; Bytes to Skip (<bytes to skip>); and again a Picture Format (u2PictureFormat), where 0x00 indicates end of picture formats. It concludes with a Property List (PropertyList) for the field item (last property is always end of page (EOP)).

A pattern item on a form is defined by a Form Pattern (FORMPATTERN) record (type=10). It includes a horizontal location (u2xLoc) in units of ¼ character width; a vertical location (u2yLoc) in units of ⅛ character height; a horizontal size (u2xSize) in units of ¼ character width; a vertical size (u2ySize) in units of ⅛ character height; and a Pattern (u1Pattern). Exemplary values for the latter include 0=horizontal lines, 1=vertical lines, 2=diagonal lines, top-left to lower-right, 3=diagonal lines, lower-left to top-right, 4=horizontal and vertical lines (cross), 5=diagonal lines in both directions (diagonal cross), 6=0% black (white), 7=6% black, 8=13% black, 9=19% black, 10=25% black, 11=50% black, 12=75% black, and 13=100% black. The last property is always End of Page (EOP).

The decision tree for a field is defined by a Field Tree (FIELDTREE) record (type=11). The best way to describe the order of the nodes in the file is with metacode for writing them. To save a tree to disk one would just parse the top node of the tree to SaveNode() as follows:

```
function SaveNode ( Node )
    if ( Node )
    {
        SaveNode ( Node.FirstChild )
        SaveNode ( Node.NextSibling )
        WriteNodeToFile ( Node )
    }
```

In general, the FIELDTREE record stores a Field ID (u2FieldId), which associates the tree with a specific field, and a "Tree" structure. The Tree, in turn, stores one or more of a Branch Node, a Conclusion Node, a Null Node, and an End-of-Tree marker. Each of these will be further explained.

The general format of the Branch node is that of a Node Definition, Condition, and Field ID, arranged as follows:

Branch Node u1NodeDef ovCondition u2FieldId

The Node Definition is an identifier indicating a Node Type (i.e., End of Tree, Branch, Conclusion, or Null) and includes bit flags for specifying whether the node has at least one sibling and whether the node has at least one child. In an exemplary embodiment, such an indentifer may be constructed from a single byte (8-bit) identifier as follows:

TABLE 4

| | u1NodeDef identifer | |
|---|---|---|
| Bits | Mask | Meaning |
| 7 | 0x80 | flag: node has a sibling |
| 6 | 0x40 | flag: node has children |
| 5–4 | 0x30 | Reserved (must be zero) |
| 3–0 | 0x0F | Node type: 0 = End of tree<br>1 = Branch<br>2 = Conclusion<br>3 = Null |

As shown, following the Node Definition is a Condition (ovCondition) and a Field ID (u2FieldId) for the node. In this manner, the Tree may include a specific condition (e.g., in byte code format) responsive to a particular field (referenced through the Field ID, which identifies a particular field established in FIELDNAMES).

In a manner similar to the layout of the Branch Node, a Conclusion node may be defined by storing a Node Definition, Condition, and Conclusion, arranged as follows:

Conclusion Node u1NodeDef ovCondition ovConclusion

The Node Def. and Condition function in a manner similar to that described for the Branch node. The Conclusion node adds a Conclusion (ovConclusion) whereby a conclusion may be asserted (when the conclusion is reached). For instance, a conclusion may be asserted, upon meeting one or more appropriate prerequisites (conditions), that an item ordered by a customer should have sales tax of 6% added.

In addition to Branch and Conclusion Nodes, the FIELD-TREE record may include Null and End-of-Tree nodes. The Null node may be constructed as:

Null Node u1NodeDef
ovCondition

Thus, the node may test for a general condition, that is, it need not be associated with any particular field. The End-of-Tree node, on the other hand, simply serves to mark the end of the Tree for that FIELDTREE record. It includes just an identifier:

End-of-Tree Node u1NodeDef

As shown above (in Table 4), the u1NodeDef identifier has its three lower bits set to 0.

Help text for a field is defined by Field Help (FIELD-HELP) record (type=12). It includes field ID (u2FieldId) established in FIELDNAMES. This is followed by the specific help text (svHelpText) stored for the field. In a preferred embodiment, the text is stored in ASCII format.

The list of expected values to be used in a list-box or check-box prompt for a field is defined by Field Expect (FIELDEXPECT) record (type=18). The record first includes Field ID (u2FieldId) established in FIELDNAMES. Next the record includes a count or Number of Values (u2NumberOfValues), followed by one or more Value (dvValue) items.

A specific value for a field is maintained by a Field Value (FIELDVALUE) record (type=13). It includes Field ID (u2FieldId) established in FIELDNAMES, and Value Source (u1ValueSource), and dvValue (value). The Value Source is a selected one of 0=User (user input or override), 1=Circular (user input for circular tree), 2=Link (external link), and 3=Tree (decision tree).

As the system may link one or more fields to external data sources, records are provided for defining and maintaining links. A link to a dBASE table, for instance, is maintained by a DBASE_LINK (dbase link) record (type=19). It includes Link Name (svLinkName), a file name for the dBASE file (svDbaseName) of interest, and an index (svIndex) file name of index file for that table. The type of link desired is specified as Inexact (u1Inexact) member, where 0=Exact and 1=Inexact. The record also specifies a number of triplets (u2NumberOfTriplets) that follow. Each triplet includes a dBASE Field Name (svDbaseFieldName), a Read Field ID (u2ReadFieldId) established in FIELDNAMES, and a Write Field ID (u2WriteFieldId) established in FIELDNAME.

In a similar manner, a links to a Paradox table may be described by a Paradox Link (PDOX_LINK) record (type=20). It includes Link Name (svLinkName), Table Name (svTabName) of the Paradox table, and any index (svIndex) name for a secondary index field. Exactness or closeness for the link is specified by a Closest (u1Closest) member, where 0=Not closest and 1=Closest. Like the dBASE Link record, the record specifies a number of triplets (u2NumberOfTriplets) that follow. Each triplet includes a Table Field Name (svTableFieldName), a Read Field ID (u2ReadFieldId) established in FIELDNAMES, and a Write Field ID (u2WriteFieldId) established in FIELDNAME.

A DDE (Windows Dynamic Data Exchange) link is described by DDE link (DDE_LINK) record (type=15). It includes a Server Application (svServerApp) name and a Link Topic (svLinkTopic). This is followed by one or more Remote Item/Field ID data pairs. The number of such pairs is indicated by a Number of Imports (u2NumberOfImports), which is positioned before any of the pairs. Each data pair itself includes a Remote Item (svRemoteItem) and a Field ID (u2FieldId) established in FIELDNAMES.

An ASCII link is described by an ASCII link (ASCII_LINK) record (type=16). It includes File Name (svFileName) indicating the disk file name of the ASCII file of interest. This is followed by an Access Type (u1AccessType), which specifies one of Read (0), Write (1), and Append (2) access. This is followed by one or more Field IDs. The number of such pairs is indicated by a Number of Field Names (u2NumberOfFieldNames), which is positioned before any of the stored Field IDs.

Each file is terminated by an End-of-File record. The End-of-File (EOF) record (type=17) simply indicates the end of the disk file and is, thus, preferably positioned as the last record in the file. It has no particular data associated with it.

PROPERTY DEFINITIONS

Property definitions are stored in a fashion which resembles the above-described series of records. Specifically, the definitions are represented by property records, each of which includes an identifier specifying a particular property type. The length of data in a property record may be implied by its type, instead of being specifically declared. Since there are fewer types of property records (than the above-described general records), the property type may be specified by a single byte.

The first three property types essentially serve as flags and, thus, have no particular data stored along with them. The No Title (NOTITLE) property record (type=1), for instance, tells the system to not display a title. No Override (NOOVERRIDE) property record (type=2) instructs the system to not allow the user to override fields. The No Tree Show (NOTREESHOW) property record (type=3) prevents the system from displaying the tree to an end user.

Property records may also store data within one or more fields. A Border Mask (BORDERMASK.) property record (type=4) directs the display of different borders. It includes a Border Mask field (ulBorderMask) which stores an bit mask specifying one or more of BORDER_BOTTOM (bit 3), BORDER_TOP (bit 2), BORDER_RIGHT (bit 1), BORDER_LEFT (bit 0). The default is to display all borders (i.e., bits 0–3 toggles high).

Text alignment information is stored in the Alignment (ALIGNMENT) record (type=5). An Alignment (ulAlignment) field tells how to align text (e.g., left, right, centered, or justified). The default is left alignment.

The system provides several formats for specifying properties of display. The format is specified by including a property record having type equal to the desired format. For instance, a General Format is indicated by storing a FORMAT_GENERAL record (type=7); it represents a default format. In a like fashion, a Fixed Format is indicated by storing a FORMAT_FIXED record (type=8), a Business Format by storing a FORMAT_BUSINESS record (type=

10), and a Currency Format by storing a FORMAT_CURRENCY record (type=11).

As a date format may be selected from many possible formats, the Format Date (FORMAT_DATE) record (type=12) indicates the desired date format by storing in a Date Format (ulDateFormat) field one of mm/dd/yy (0), mmmm d, yyyy (1), d-mmm-yy (2), d-mmm (3), mmm-yy (4), hh:mm AM/PM (5), hh:mm:ss AM/PM (6), hh:mm (7), hh:mm:ss (8), or mm/dd/yy hh:mm (9).

Other formats which may be stored as property record types include FORMAT_LISTBOX (type=13), FORMAT_CHECKBOX (type=14), FORMAT_CHECKIF (type=15), FORMAT_BUTTON (type=16), FONT (type=17), and FORMAT_SCROLLING (type=18). Each, whose meaning is fairly self-evident, functions as a flag for its namesake type. Next, FORMAT_PICTURE (type=19) includes a Picture definition string (svPictureString). Like the general records, the property records are terminated by an End-of-Properties (EOP) record (type=6) which simply indicates the end of properties; it has no data associated with it.

VARIABLE LENGTH DATA: TEXT, NUMERIC, LOGICAL, AND ERROR DATA

Actual data for objects, such as found in Branch and Conclusion object, is packaged as a variable-length value preceded by a data type (byte) identifier. Text and numeric values are in "sv" format. Logical and error values, on the other hand, may be represented by a single byte flag. In an exemplary embodiment, a data object may be constructed as follows:

TABLE 5

Data Types

| Name | | Comments |
|---|---|---|
| Number: | ulDataType | 0x1A = number |
| | svNumber | the number in ASCII |
| Text: | ulDataType | 0x1B = text |
| | svText | the string |
| Logical: | ulDataType | 0x1C = logical |
| | ulLogicalValue | 0 = No (false) |
| | | 1 = Yes (true) |
| Error: | ulDataType | 0x1d = error |
| | ulErrorValue | 1 = #DIV/0! (obsolete) |
| | | 2 = #Ref! (obsolete) |
| | | 3 = #Value! (obsolete) |
| | | 4 = NA |
| | | 5 = #NAME? (obsolete) |
| | | 6 = #NUM! (obsolete) |
| | | 7 = #NULL! (obsolete) |
| | | 8 = ERR |

OBJECT CODE (CONCLUSIONS AND CONDITIONS)

Conclusions and Conditions must specify operations to be performed by the system (e.g., testing a value, computing a new value, and the like). These operations are represented by object code, which is a sequence of tokens in Reverse Polish order. Some tokens, such as OP_PLUS, are one-bytes tokens; others, such as OPERAND_NAME, have fixed-length information that follows; still others, such as OPERAND_TEXT, are followed by variable length data. The data (operand) tokens themselves are the same as data objects defined in the section Variable Length Data above.

TABLE 6

Tokens

| Name | Comments |
|---|---|
| u2CodeLength | number of bytes that follow |
| | one or more of the following (in Reverse Polish) |
| u1TokenType | 0x01 = OP_NEGATION |
| | 0x02 = OP_PERCENT |
| | 0x03 = OP_EXPONENTIATION |
| | 0x04 = OP_MULTIPLY |
| | 0x05 = OP_DIVIDE |
| | 0x06 = OP_PLUS |
| | 0x07 = OP_MINUS |
| | 0x08 = OP_AMPERSAND |
| | 0x09 = OP_EQUAL |
| | 0x0A = OP_LESS |
| | 0x0B = OP_GREATER |
| | 0x0C = OP_LESSEQUAL |
| | 0x0D = OP_GREATEREQUAL |
| | 0x0E = OP_NOTEQUAL |
| | 0x0F = OP_POSITIVE |
| | 0x14 = CONTROL_EQUAL |
| | 0x15 = CONTROL_PARENS |
| | 0x16 = CONTROL_END_OF_LINE |
| u1TokenType | 0x17 = CONTROL_FUNCTION |
| u2FunctionId | from Table 5 |
| u1ArgumentCount | number of arguments |
| u1TokenType | 0x18 = OPERAND_NAME |
| u2FieldId | established in FIELDNAMES |
| u1TokenType | 0x19 = OPERAND_REFERENCE |
| u2FileId | established in FIELDNAMES |
| dvData | 0x1A = OPERAND_NUMBER |
| | 0x1B = OPERAND_TEXT |
| | 0x1C = OPERAND_LOGICAL |
| | 0x1D = OPERAND_ERROR |
| | (see Variable Length Data) |

So-called "at" (@) functions, such as those popularized by electronic spreadsheets, may be attached to selected fields, as desired. Internally, they are represented by the following ID's:

TABLE 7

Function ID's

| <<ID>> | <<Func.>> | | |
|---|---|---|---|
| 0x01 | @INT | | |
| 0x02 | @DATE | 0x30 | @REPEAT |
| 0x03 | @DATEVALUE | 0x31 | @RIGHT |
| 0x04 | @DAY | 0x2C | @ABS |
| 0x05 | @HOUR | 0x2D | @MOD |
| 0x06 | @MINUTE | 0x2E | @AND |
| 0x07 | @MONTH | 0x2F | @IF |
| 0x08 | @NOW | 0x30 | @NOT |
| 0x09 | @SECOND | 0x31 | @OR |
| 0x0A | @TIME | 0x32 | @UPPER |
| 0x0B | @TIMEVALUE | 0x33 | @LOWER |
| 0x0C | @WEEKDAY | 0x34 | @NULL |
| 0x0D | @YEAR | 0x35 | @MESSAGE |
| 0x0E | @ROUND | 0x36 | @ERR |
| 0x0F | @TYPE | 0x37 | @NA |
| 0x10 | @SUM | 0x38 | @PXOPEN |
| 0x11 | @MAX | 0x39 | @CLOSE |
| 0x12 | @MIN | 0x3A | @TOP |
| 0x22 | @CHAR | 0x3B | @BOTTOM |
| 0x23 | @CODE | 0x3C | @PREVIOUS |
| 0x24 | @EXACT | 0x3D | @NEXT |
| 0x25 | @FIND | 0x3E | @CLEAR |
| 0x26 | @LEFT | 0x3F | @DELETE |
| 0x27 | @LENGTH | 0x40 | UPDATE |
| 0x28 | @MID | 0x41 | INSERT |

TABLE 7-continued

| Function ID's | | | |
|---|---|---|---|
| <<ID>> | <<Func.>> | | |
| 0x29 | @REPLACE | 0x42 | @STORE |
| | | 0x43 | @ASCIIOPEN |
| | | 0x44 | @DDEOPEN |

Employing the foregoing exemplary records and format, the following limits are imposed. Forms, Fields, Fonts, Font size, Nodes in a tree are each limited to no more than 65,535 (i.e., $2^{16}$). X position is limited to 16,383 characters, and Y position is limited to 8,191 characters. Those skilled in the art will appreciate that the limits may be extended by simply increasing the number of respective bytes allocated (e.g., from two bytes to four bytes) as needed.

File I-O Subsystem module 309 transfers a form image data file between main memory and the hard disk for storage and retrieval in the course of creation and completion of the form defined by the file. The image file stored in main memory and the corresponding image file stored in a hard disk contain the same data; however, the file in main memory is a binary representation of the image data, and the file in hard disk is an ASCII representation of the numerical and text portions of the image data. File I-O Subsystem module 309 makes the conversions during transfer of an image file.

At the time that a form image data file is transferred to main memory for editing or completion, the form system analyzes the data therein and constructs a symbol table, a set of memory structures which correspond to each record in the data file (forms, form objects, fields, tree objects, and links), and "linked lists" which represent dependencies between the various form system components. The symbol table is a list of all names used in the form and the memory location of the records of that list.

The linked list is required to determine the proper order for goal oriented prompting through the collection of forms. The linked list represents the data dependencies which are inherent in the decision tree definitions contained within the data file. These dependencies must be comprehended by the tree execution module when performing calculations or when determining the next field value to prompt for.

Three types of dependencies must be maintained for proper execution by the tree evaluation module:

(1) The use of a field as a branch condition within a decision tree. The value of the field must be determined before a branch can be selected.

(2) The use of a field within a formula that specifies the condition under which a branch should be taken. The value of the field must be determined before the condition can be evaluated.

(3) The use of a field within a formula that specifies the conclusion value at a terminal branch of a decision tree. The value of the field must be determined before the conclusion can be evaluated.

All three types of dependencies are constantly maintained in memory using linked lists and are updated as required when additions or modifications are made to decision trees via the tree tool module.

FIGS. 5 through 8 illustrate various window presentations and pull down menu commands which may be encountered in the use of the form system.

Figure 5:
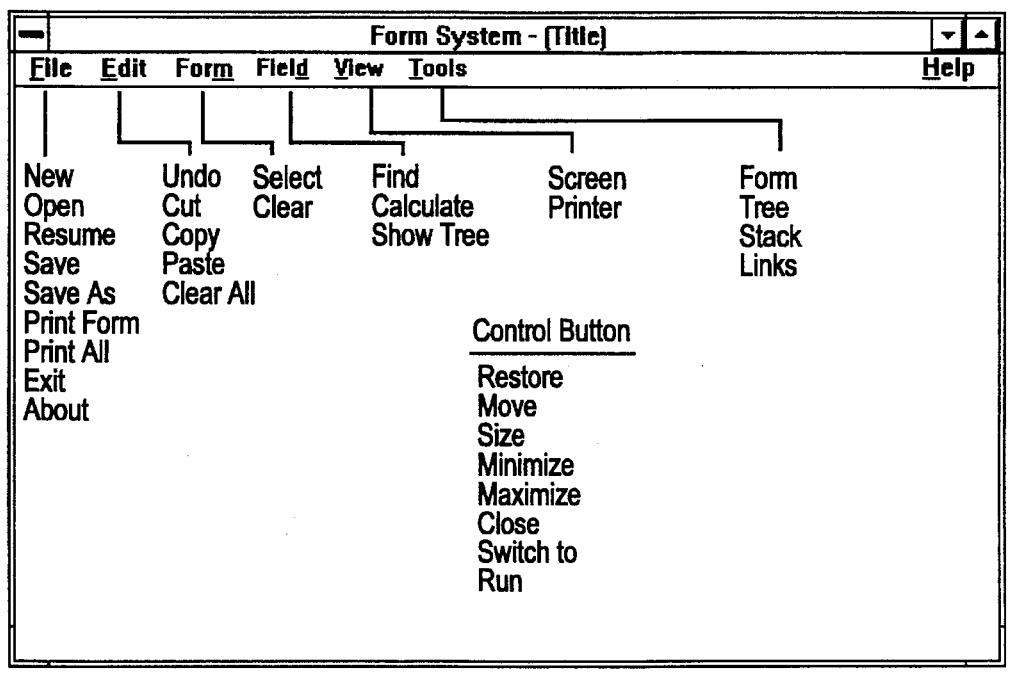
FIG. 5 illustrates an opening window of the form system application program and the menu commands available.

FIG. 5 is an opening window which is displayed prior to selection of a form application. The menu items shown in the main body of FIG. 5 are displayed on a mutually exclusive basis when the corresponding menu items, File, Edit, etc. are selected. Since this is the first window described herein, the features which are derived directly from the Microsoft Windows environment are provided as background to the later description of the form system.

In the terms of Windows, software, such as the form system software, is called an application program. The term application as used in Windows must be distinguished from forms by which an individual makes an "application" e.g., for credit approval. With the Windows definition of the term "application" in mind, the Windows environment provides for two general types of windows, namely, "application" windows which contain currently running application software and "document" windows which appear with application software that can display two or more windows simultaneously.

Document windows share the application window's menu bar. Commands that affect an application window affect the document as well. Document windows have their own title bar unless their physical size is maximized to fill the screen. In the latter case the document window and the application window share a title bar.

FIG. 5 illustrates the opening window of the form system application program. The small rectangle in the upper left corner of the window of FIG. 5 represents the window control menu box which is found on all windows of the Windows environment. The pull down menu for the control menu box of FIG. 5 is shown under that heading in the working area of the window. The menu for the control menu box and the main menu items are shown for purposes of discussion only. These menus are displayed only after a main menu command has been selected.

The control menu commands permit an individual to: size, move, maximize, minimize and close windows; and to switch to Windows Task List from a keyboard or by use of a mouse.

The horizontal area to the right of the control menu box in FIG. 5 is the title bar which designates an application program e.g., Form System as shown in FIG. 5; and the title of the current active files under the named application program. The down and up arrows on the right side of the title bar are employed respectively to decrease and increase the size of the window.

The pull down menu commands for the opening window, as described below herein, are tailored to the form system. When a pull down menu is displayed, the commands which are then available for execution are presented in a bold black type style; and the commands which are not available for execution are displayed in a readable, but somewhat obscured print style.

Referring again to FIG. 5, and additionally to FIGS. 6–8, an exemplary menu system will now be described. The menu system includes a plurality of main menu commands, each having additional choices or (submenu) commands. Each main menu command will be described in turn.

The File menu includes New, Open, Resume, Save, Save As, Print Form, Print All, Exit and About commands. New closes any open application and prepares for a new application. Open loads an application into memory from a list of applications currently on the disk. Resume resumes goal oriented prompting in the goal form after an interruption. Save copies or saves the work to the file of the current name to the system storage (disk). Save As saves the work under a new named file. Print Form prints the current form and contents. Print All prints all of the forms of a stack. Exit closes any application and returns the user to WINDOWS. About displays information about the form system.

The Edit menu includes Undo, Cut, Copy, Paste, and Clear All commands. Undo undoes the last change. Cut cuts (copy with erase of source) a designated entity and saves it on the clipboard for subsequent use. Copy copies (without erase of source) a designated entity to a clipboard for subsequent use by the paste command. Paste pastes an entity from a clipboard to a designated location. Clear All clears data from all forms of a stack.

The Form menu includes Select and Clear commands. Select displays a list of forms for selection. Upon selection by a user, a form is loaded into the system. Clear clears data from the current form only.

The Field menu includes Find, Calculate, and Show Tree commands. Find prompts the user for name of a field to find. Calculate requests calculation of a field. Show tree displays the tree for the field.

The View menu includes Screen and Printer commands. Screen presents a display view in screen format. Printer presents a display view in the printer format.

The Tools menu includes Form, Tree, Stack and Link commands for invoking the respective tools. Form selects the Form tool and loads the Form Tool Operations as the main menu, as shown in FIG. 6. Tree selects the Tree tool and loads the Tree Tool Operations as the main menu as shown in FIG. 7. Stack selects the Stack tool and loads the Stack Tool Operations as the main menu as shown in FIG. 8. Link selects the Link tool, which employs dialogue windows to create and/or edit links.

Figure 6:
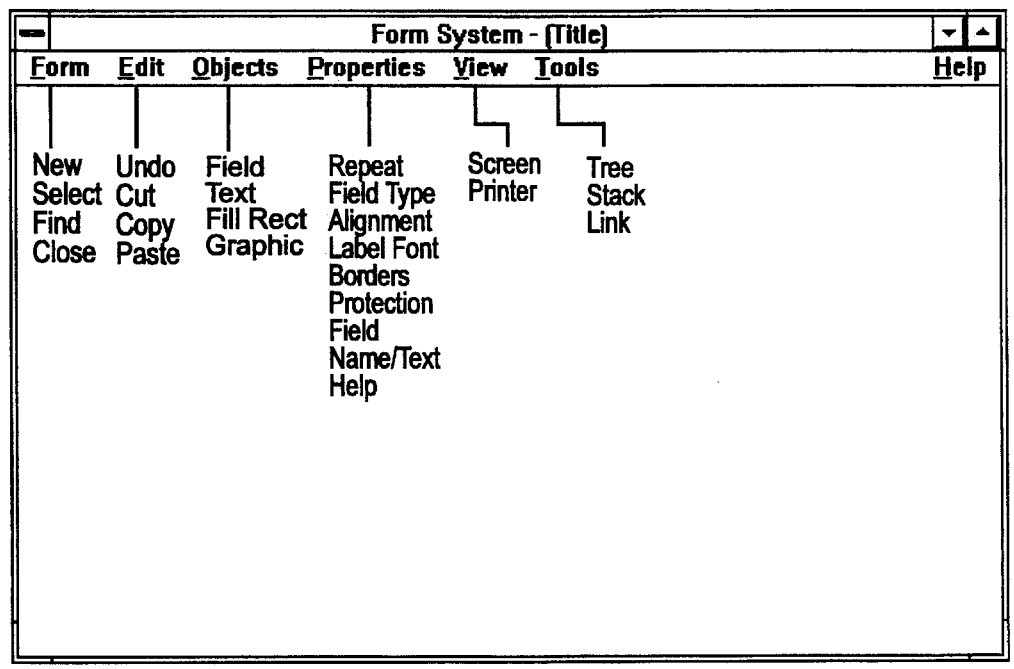
FIG. 6 illustrates a Form Tool window and the menu commands available.

As shown in FIG. 6, the Form Tool window includes operations of Form, Edit, Objects, Properties, Alignment, Font, Borders, Fill Pattern, Line Width, Protection, Field, Name/Text, Help, View, and Tools. The submenu commands of each will be described next.

The Form menu includes New, Select, Find, and Close Tool commands. New closes any open form any prepares for a new form. Select chooses or selects a form from list of available forms. Find locates or finds a form with a defined field name. Finally, Close Tool closes the form tool and returns to completion mode.

The Edit menu includes Undo, Cut, Copy and Paste commands. Undo undoes the last change. Cut cuts a designated entity and saves it on the clipboard for subsequent use by paste command. Copy copies a designated entity to a clipboard for subsequent use by the paste command. Paste pastes an entity from a clipboard to a designated location.

The Objects menu includes Field, Text, Fill Rectangle, Rounded Rectangle, Line and Graphic commands. Field creates a field object, places the field on the form, and sets the size of the field. Text creates a text object, places the object on the form, and sets the size of the object. Fill Rectangle creates a filled rectangle object, places the object on the form, selects a hatch pattern, and sets the size of the object. Rounded Rectangle creates a rounded rectangle object, places the object on the form, selects a hatch pattern, and sets the size of the object. Line creates a line object and places the line on the form. Graphic creates a graphic object, places the object on the form, specifies the graphic image, and sets the size of the object.

The Properties menu includes Repeat and Field Type commands. Field type, in turn, further includes General, Fixed, Percent, Financial, Currency, Date/Time, Scrolling, True/False, Button, Picture, Selection List, and Check Box selections. Repeat repeats the last selected property. Field Type presents the user the following choices: General, text and numerical; Fixed, numerical with set decimal places; Percent, numerical only with % display; Financial, numerical with comma separators; Currency, numerical with currency symbols; Date/Time, displays date and time (serial number of date and time since Jan. 1, 1900); Scrolling scrolls through field; True/False, for field values Yes or No (the field is displayed with YES and NO check boxes); Button, for fields which default to NO but can be momentarily set to YES; Picture, defines permitted format of entry; Selection List, for fields with one of several values from a list which is not displayed in the field; and Check Box, for fields with one of several values which are displayed as check boxes in the field (if the field display size is too small to accommodate the boxes, a selection list is displayed when the field is prompted).

The Alignment menu includes Left, Right, Center and Justified commands. Left alignment is the default for newly created fields; field values and text objects are displayed at the left edge of the object's display area. Right alignment causes field values and text objects to be displayed at the right edge of the object's display area. Center is chosen to display field values and text objects centered in the object's display area. Justified aligns multi-line field values and text objects flush against the object's left and right margins.

The Borders menu consists of Outline, Left, Right, Top and Bottom. Outline is the default for newly created fields and places lines on all sides of field; Left places a vertical line at the left edge of an object; Right places a vertical line at the right edge of an object; Top places a horizontal line at the top edge of an object; and Bottom places a horizontal line at the bottom edge of object.

Other selections include the following. In the Font menu, the user may select a font type and font size from a list. The Fill Pattern option selects a different fill pattern for a selected filled rectangle or a rounded rectangle. The Line Width option selects a different line width for object borders or for lines. The Protection menu consists of No override, and No tree display. No override means the user cannot enter value in a calculated field; and No tree display means the Tree is not displayed. The Field menu replaces the selected field object with a new field object. The Name/Text menu edits the field name. The Help menu attaches Help to selected field. The View menu consists of Screen and Printer. Screen displays screen view; and Printer displays forms as they will appear when printed. The Tools menu lists Tree, Stack, and Link, whereby the user may readily switch to the desired tool.

Figure 7:
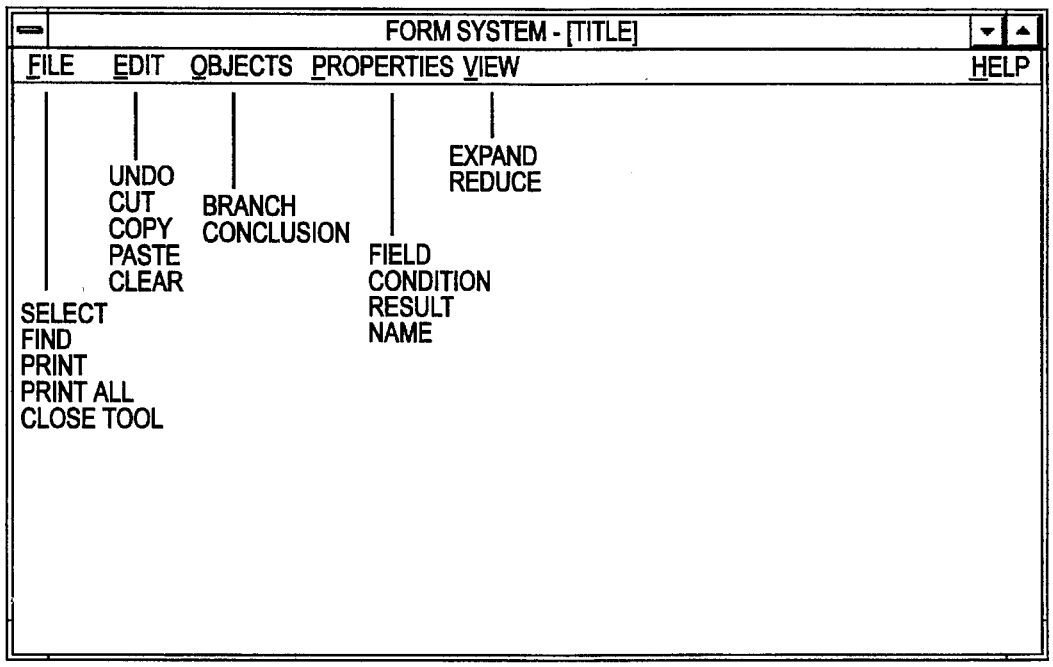
FIG. 7 illustrates a Tree Tool window and the menu commands available.

As shown in FIG. 7, the Tree Tool main menu includes Tree, Edit, Objects, Properties, and View commands. Each invokes additional subcommands, which will now be described in further detail.

Tree includes Select, Find, Print, Print all, and Close commands. Select chooses or selects a tree from a list of trees. Find locates or finds a tree containing an identified field in a branch, condition, or conclusion. Print prints the current tree. Print all prints all trees. Close tool closes the Tree tool.

Edit includes Undo, Cut, Copy and Paste commands. Undo undoes the last change. Cut cuts a designated entity and saves on clipboard for subsequent use by paste command. Copy copies a designated entity to a clipboard for subsequent use by the paste command. Paste pastes an entity from a clipboard to a designated location.

Objects includes Branch and Conclusion commands. Branch inserts a branch object at the same level as the highlighted object (in parallel). Conclusion inserts a conclusion at the same level as the highlighted object.

Properties includes Field, Condition, Conclusion and Name commands. Field instructs the system to employ a new field or another existing field to replace the field in the current branch object. Condition changes the condition for the current object selected. Conclusion allows the user to edit the expression of a conclusion object. Name allows the user to edit name for branch object.

Finally, View includes Expand and Reduce commands. Expand expands the displayed view to maximum size. Reduce, on the other hand, reduces the displayed view. This give the user flexible control over how the interface is displayed.

Figure 8:
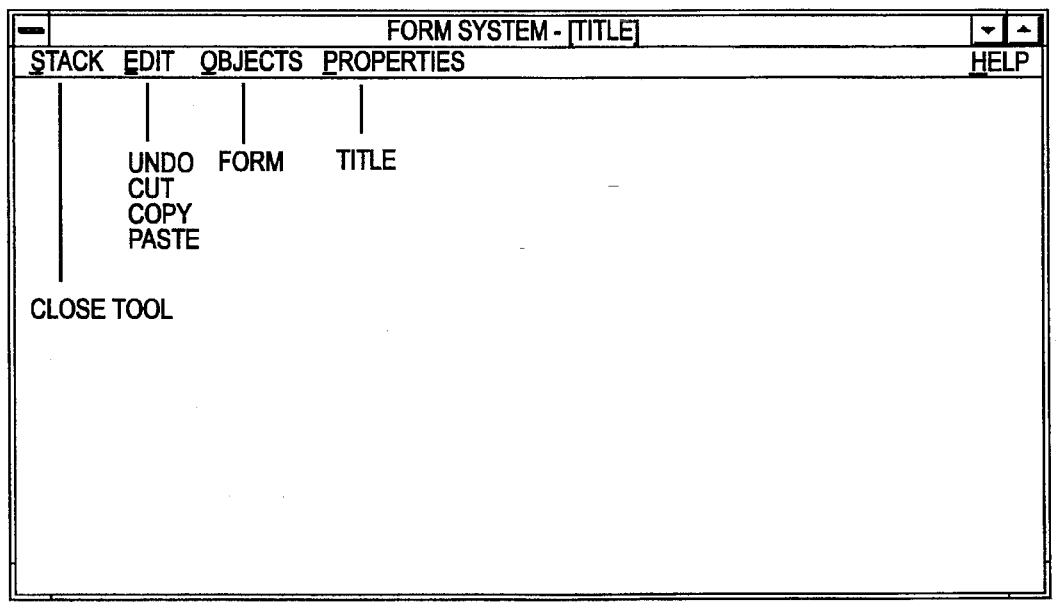
FIG. 8 illustrates a Stack Tool window and the menu commands available.
Figure 10:
FIG. 10 is the four forms for an application for life insurance example.

As shown in FIG. 8, the Stack Tool window includes Stack, Edit, Objects and Properties commands, each having additional subcommands. Stack menu includes a Close command, for closing the stack tool. The Edit includes Undo, Cut, Copy, Paste and Clear All commands. Undo undoes the last change; Cut cuts a designated entity and saves on clipboard for subsequent use by paste comment; Copy copies a designated entity to a clipboard for subsequent use by the paste command; Paste pastes an entity from a clipboard to a designated location in the stack; and Clear All clears data from all forms of a stack. Objects includes Form, which adds a new form to the stack. Finally, Properties includes Title, which edits the title of the highlighted form.

MODES OF OPERATION

As indicated earlier herein, the form system has two modes of operation, namely, form creation and run time form completion. In the following discussion, a description of form creation follows a description of run time form completion. This order of presentation is adopted because the description of a previously created form provides valuable insights into the goal oriented forms, and to the decision trees, links and form stack relations embodied therein.

FORM COMPLETION

For purposes of illustration, a set of four forms for making application for life insurance are displayed in FIGS. 9 through 12. The data file containing the life insurance forms is entitled Life.DF.

When form completion proceeds during a "run time" session of the form system, a subset of menu commands are available to the user. For example, none of the Tools (Forms, Tree, Stack and Link) are available.

Figure 13:
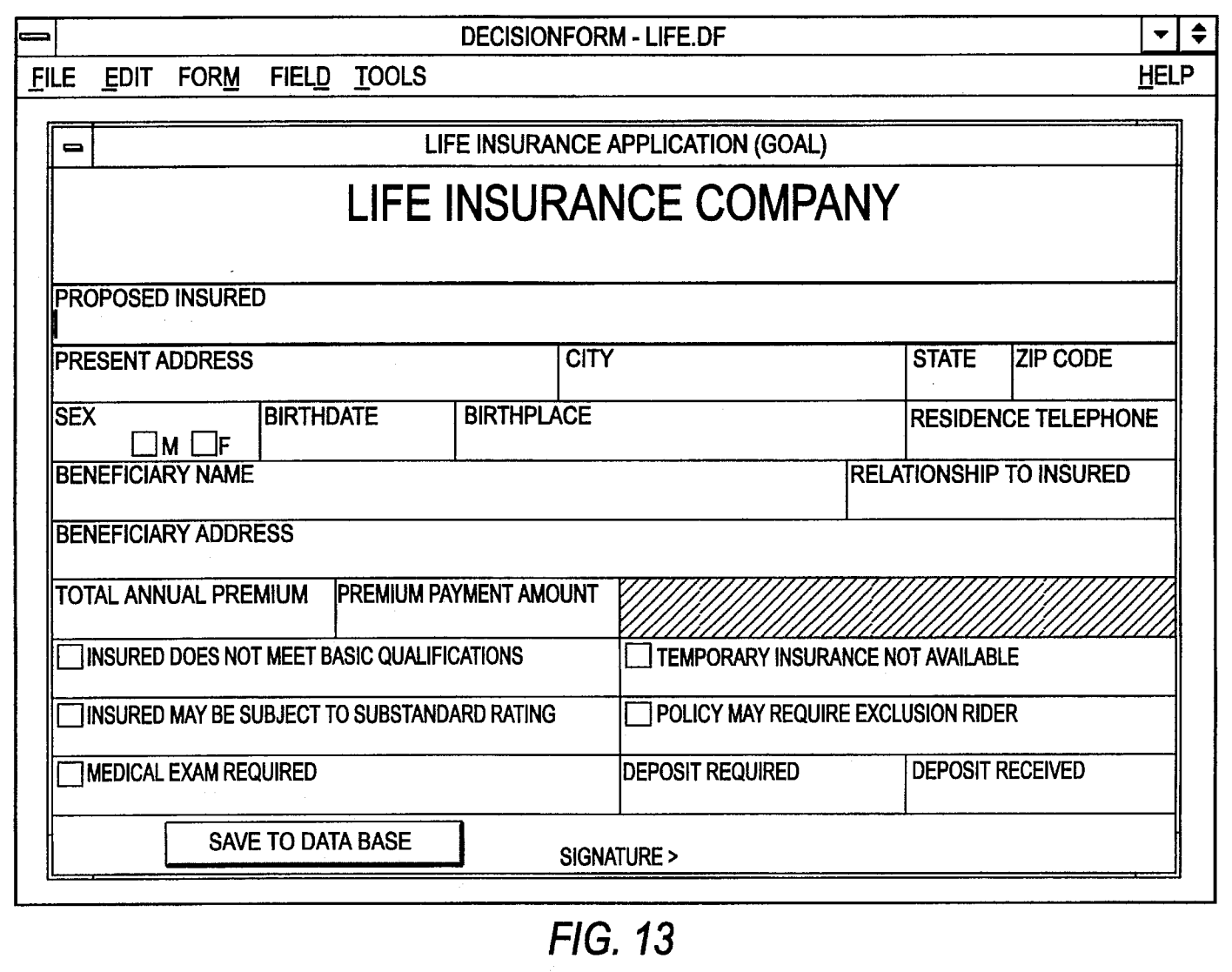

In FIG. 5, an operator selects the "Open" command from the "File" menu. In response to this command, the form system provides a list of form files, including Life.DF, which are available for selection. A selection is made by highlighting the file to be selected and either clicking the mouse or striking the RETURN (or ENTER) key on the keyboard. Following selection of a form file e.g., Life. DF a screen essentially as shown in FIG. 13 is presented to an operator for completion. The form shown in the window of FIG. 13 is also shown in FIG. 9.

When a goal form, e.g., the Life Insurance Application form is presented as shown in FIG. 13, the first field to be completed, Proposed Insured is outlined in a heavy line and a large "I" shaped cursor is presented in that field. Information input to a prompted field may comprise: typed information followed by depression of the RETURN key of the keyboard; or may comprise selection by use of a mouse or by use of the ARROW and RETURN keys of the keyboard.

In order to implement goal oriented prompting, the system first determines which form is the goal form. When an application is initially loaded into memory, the top form of the stack is selected as the goal form. Later, an operator can use the "Select" command on the "Form" menu to select another form to become the goal form.

Once a goal form has been selected, the form system selects the first field without a value on that form as the goal field. It does this by searching down the linked list of field objects on the form until it finds a field that does not currently have a value.

Once a goal field has been selected, the system next determines which field, if any, is dependent on the goal field. This is done by looking at any decision trees which are associated with the field to determine which field in the decision tree is next needed to complete the tree. This is done by starting at the base of the tree and following all selected branches of the tree until the system detects either a branch node that does not have a value, a condition expression that does not have a value, or a conclusion expression that does not have a value. This field, if any, becomes the dependent field which the form system must prompt for next.

Once the system has determined which field to prompt for, the system next locates any form that contains this field. Starting at the top of the stack, the form system looks at each form in turn to find which form closest to the top of the stack contains that field. The form system then moves that form to the top of the stack so that the user can enter a value. If the field is not found on any form, the system prompts for the field on a special "scratchpad" form.

Once the form containing the dependent field has been moved to the top of the stack, the system then positions the cursor on the dependent field and prompts the operator to enter a value for that field.

In the Life Insurance Application example shown in FIGS. 9 through 12, the system automatically prompts for fields contained on the Premium Calculation, Declarations, and Medical Information forms, as necessary, to complete the Life Insurance application form. FIG. 14 shows the display after the Premium Calculation form has been automatically moved to the top of the stack to prompt for "Amount of basic policy". This was done because the system determined that "Amount of basic policy" was the next dependent field necessary to calculate a value for the "Total Annual Premium" field on the Life Insurance Application form, which was the goal form. Since the Premium Calculation form was moved to the top of the stack temporarily due to the goal oriented prompting, it is identified a as prompt form by displaying the word "prompt" after the title of the form as shown in FIG. 14. This form will also be automatically removed from the display once the operator enters values for the dependent fields on it.

Rather than provide values for dependent fields, an operator can use the "Close" command on a prompt form's control menu to close the form at any time. When the operator does this, the system moves to the next field on the current goal form and proceeds with the goal oriented prompting for its dependent fields, if any.

An operator can also cause the system to pursue goal oriented prompting for any field of his or her choice by first selecting the field, then using the "Calculate" command on the "Field" menu. This causes the system to make the selected field the goal field for purposes of goal oriented prompting.

After a user has entered a value for a field, whether or not a prompted field, the system must propagate that value throughout any forms and decision trees associated with that field. Because it maintains at all times the logical and/or mathematical relationships between fields on forms, the feature is appropriately called "truth maintenance". The actual implementation of truth maintenance is based on the linked list structures that are created as a form image data file which is transferred to main memory. The first step of this process is to remove the previous value, if any, of the field before the user typed a new entry. Once the previous value has been removed from the field, this change is propagated to any fields which are dependent upon that field to remove all prior dependent values. The second step is to place the newly entered value into the field; and to propagate the changes to all dependent fields. The system then looks and determines which forms, if any, contain the field and displays the new value on each of those forms. If the goal form, which the system selected in its goal oriented prompting, now has a value for the field which was originally the goal field, or if the operator did not enter a value for the prompted field but rather answered a value for a different field, or if the operator pressed the Tab Key, then the goal form is advanced to the next field and the goal oriented prompting sequence starts over again for that field.

The form system also maintains any dependencies related to external sources of data that have been linked to the forms. When the value of a field that is used as an index for a database is modified, the system automatically locates the appropriate record and updates the values of any fields linked to the database. Similarly, when the value of a field that is exported to another application is modified, the system automatically notifies the other application of the change.

In the Life Insurance Application example shown in FIG. 13, when the operator enters the applicant's name, the system automatically looks in a database file for information about the applicant. If information about the applicant is found in the database file, the applicant's address, date of birth, etc. is retrieved from the file and the system automatically slips over these fields. If no information about the applicant is found in the database file, the system prompts the operator for this information.

Upon entry of a value for any field, the system automatically prompts for entry into the next field according to the goal sequence defined above. As values are entered into the prompted fields, automatic prompting may continue on the initial goal form to completion of that form; or dependent on the values entered in certain fields, prompting may digress to a subsidiary form of the stack. In any event, form fields which receive their data from linked data sources or by calculation are not visited by the prompting cursor.

If the cursor is manually moved to a field which receives data from a linked source or by calculation, the outline of the field is a distinctive dotted border to advise that the operator is not expected to provide an answer. In the illustrative Life Insurance Application form of FIG. 13, the fields: "Proposed insured", "Beneficiary name", "Beneficiary address", etc. are all fields for which the operator is prompted for an answer. On the other hand, the fields: "Total Annual premium", "Premium payment amount"; and "Deposit required" are fields which receive their values by calculations.

Figure 15:
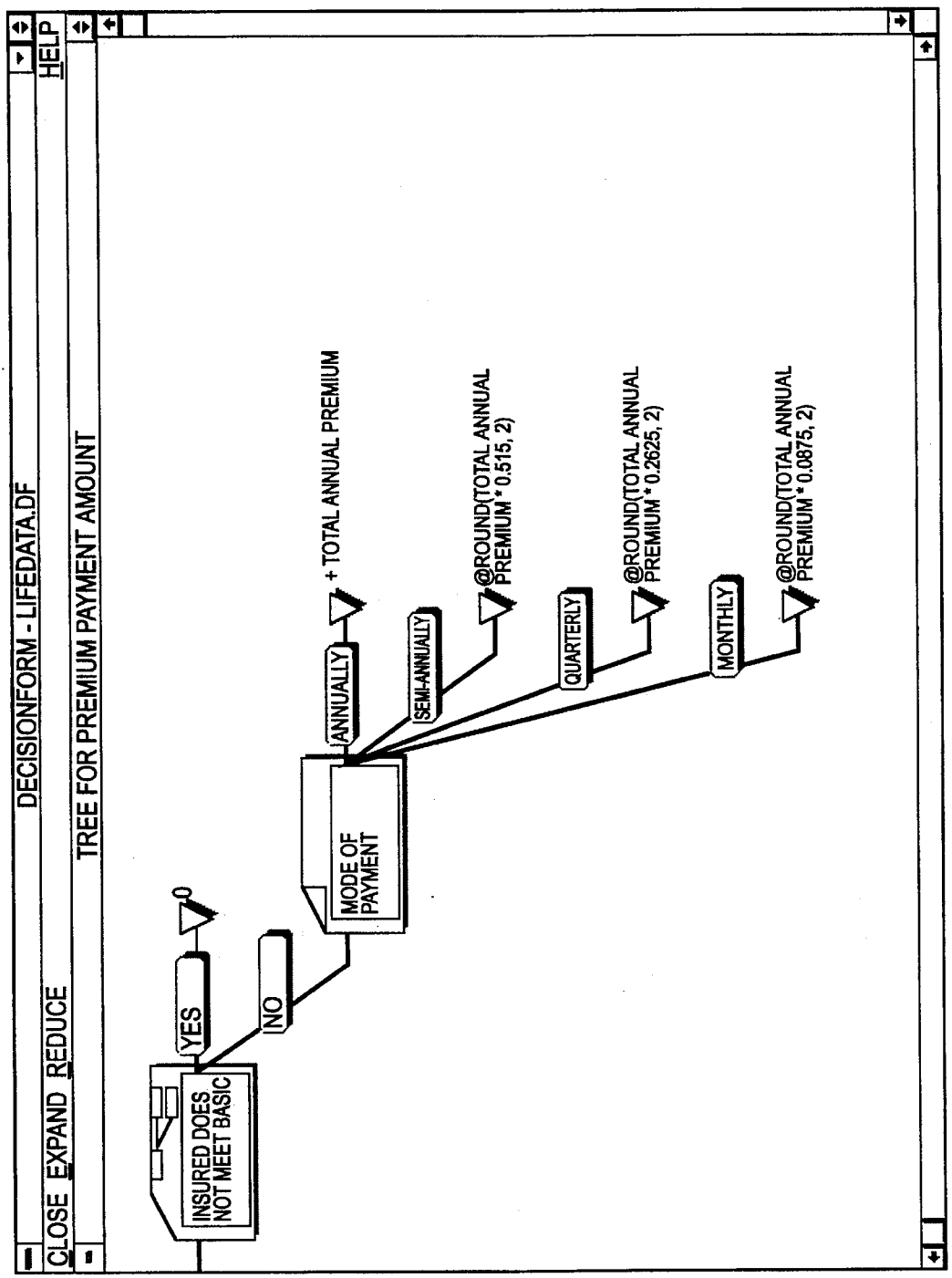
FIG. 15 illustrates the highlighting of the selected path in a tree.

FIG. 15 illustrates the ability of the system of the invention to highlight the selected path in a tree for the user. In this case, the tree for "premium payment amount" is currently determined by the value first for the insured not meeting the basic requirements being "no" and the mode of payment being "monthly" with a thicker line for that selected path and then the calculation corresponding to monthly mode of payment is the expression which is used to calculate the premium payment amount.

Also of note in FIG. 15 is the use of different icons in the decision tree display to distinguish calculated fields. The leftmost branch object includes a decision tree icon above the branch field; in this case "Insured does not meet basic". This decision tree icon indicates that the value of "Insured does not meet basic" is calculated via a decision tree rather than being entered by the operator. The other branch object, for "Mode of payment", does not have this icon. "Mode of payment" is a field which the operator must enter. This display technique highlights the capability of the invention to embed arbitrarily complex computations which result in a value for a field within a single branch object.

Finally, in FIG. 16 is the capability of the invention to indicate that a value for a field has been entered by the user overriding the value that would be brought to that field from the tree. In this example, the field called "Premium Payment Amount" has been entered as $150.00 by the operator and the cross/hatching over that field indicates that this value was entered by the operator rather than by the tree that is available for that correct determination of the premium payment amount.

FORM CREATION

The invention contemplates that the form system will be widely used to create sets of forms for all types of commercial, industrial and other applications of the form system almost without limitation.

Form creation in the invention involves the use of four interrelated tools. The form tool, the stack tool, the tree tool, and the link tool. These will be discussed individually in the following paragraphs.

FORM TOOL

The form tool of the system is a facility for creating and modifying application forms. The form tool provides a high level, graphical method for defining forms. It operates much like a drawing package and displays forms as they are being defined.

I view a form as a physical area which can be divided into a plurality of regions. The physical size of a region can be selectively set; and a region can have a border on any or all sides. The width of a region must be an integral multiple of the pitch of the default font employed in a form; and the height of a region must be an integral multiple of the height of the default font. The borders for adjacent regions are shared.

Form objects fall into two general classes, namely, static and dynamic. Regions which are assigned static form objects are not involved in the goal oriented prompting. The static form objects are: text, graphics, filled rectangles, rounded rectangles and lines. There is a single dynamic form object field. Each Field must have a name for identification and reference in trees, conclusions, and links.

There are three static form object regions in the illustrative insurance application of FIG. 13. The large title region with the text "Apex Life Insurance Company" and the signature region at the bottom of the form of FIG. 13 are both text form objects. The title region illustrates the use of text font type and size which are different from the default text. The region to the right of the region named "Premium payment amount" is a filled rectangle form object.

The remaining regions of the form of FIG. 13 are field form objects which are for ease of reference termed "fields" herein. Fields are employed to display: (a) data entered by a user; (b) data calculated by the form system; or (c) data provided by a link to an external source.

All form objects have assigned "properties" which define: size, appearance, and functions attributable to an object. For example, all form objects may be assigned a border property; and this is the only property which can be assigned to filled rectangle or graphics objects. Font and alignment properties, also, can be assigned to text objects.

In contrast to the limited number of properties available for assignment to the "static" form objects, a wide range of properties can be assigned to "fields". The properties which are available for assignment to fields are enumerated in FIG. 5 under the menu heading "property".

Properties available for objects was introduced above (during discussion of the preferred file format). These properties may be matched to various objects as follows:

| Properties Matched to Item Type | | | | |
|---|---|---|---|---|
| Property | Field | Text | Picture | Pattern |
| NOTITLE | X | . | . | . |
| NOOVERRIDE | x | . | . | . |
| NOTREESHOW | X | . | . | . |
| BORDERMASK | X | X | X | X |
| ALIGNMENT | X | X | . | . |
| FORMAT_GENERAL | X | . | . | . |
| FORMAT_FIXED | X | . | . | . |
| FORMAT_PERCENT | X | . | . | . |
| FORMAT_BUSINESS | X | . | . | . |
| FORMAT_CURRENCY | X | . | . | . |
| FORMAT_DATE | X | . | . | . |
| FORAMT_LISTBOX | X | . | . | . |
| FORMAT_CHECKBOX | X | . | . | . |
| FORMAT_CHECKIF | x | . | . | . |
| FORMAT_BUTTON | X | . | . | . |
| FORMAT_SCROLLING | x | . | . | . |
| FORMAT_PICTURE | X | . | . | . |
| FONT | X | X | . | . |
| EOP | X | X | X | X |

X = Has meaning
. = Has no meaning (and is ignored)

Once a general plan for the forms of an application has been conceived, form creation begins with use of the Form Tool of the system. The operator invokes the Form tool by using the "Form" command on the "Tools" menu shown in FIG. 5.

The form tool provides the following capabilities: (a) creation of a new form; (b) adding new objects to a form; (c) renaming, sizing and scrolling forms; (d) finding forms that contain a specified field; (e) selecting, moving and sizing form objects; (f) editing form objects with the clipboard; (g) changing the field referenced by a field object; (h) changing the names of field and text objects; (i) adding help text to be displayed for a field object; (j) changing the display format of a field object; (k) changing the alignment of text within field objects and text objects; (l) changing the character fonts of text objects and field objects; (m) controlling which, if any, borders are drawn around objects; (n) controlling whether the field name is displayed in a field object; and (o) protecting field objects both from override by the operator or display of the tree associated with the field object.

Figure 17:
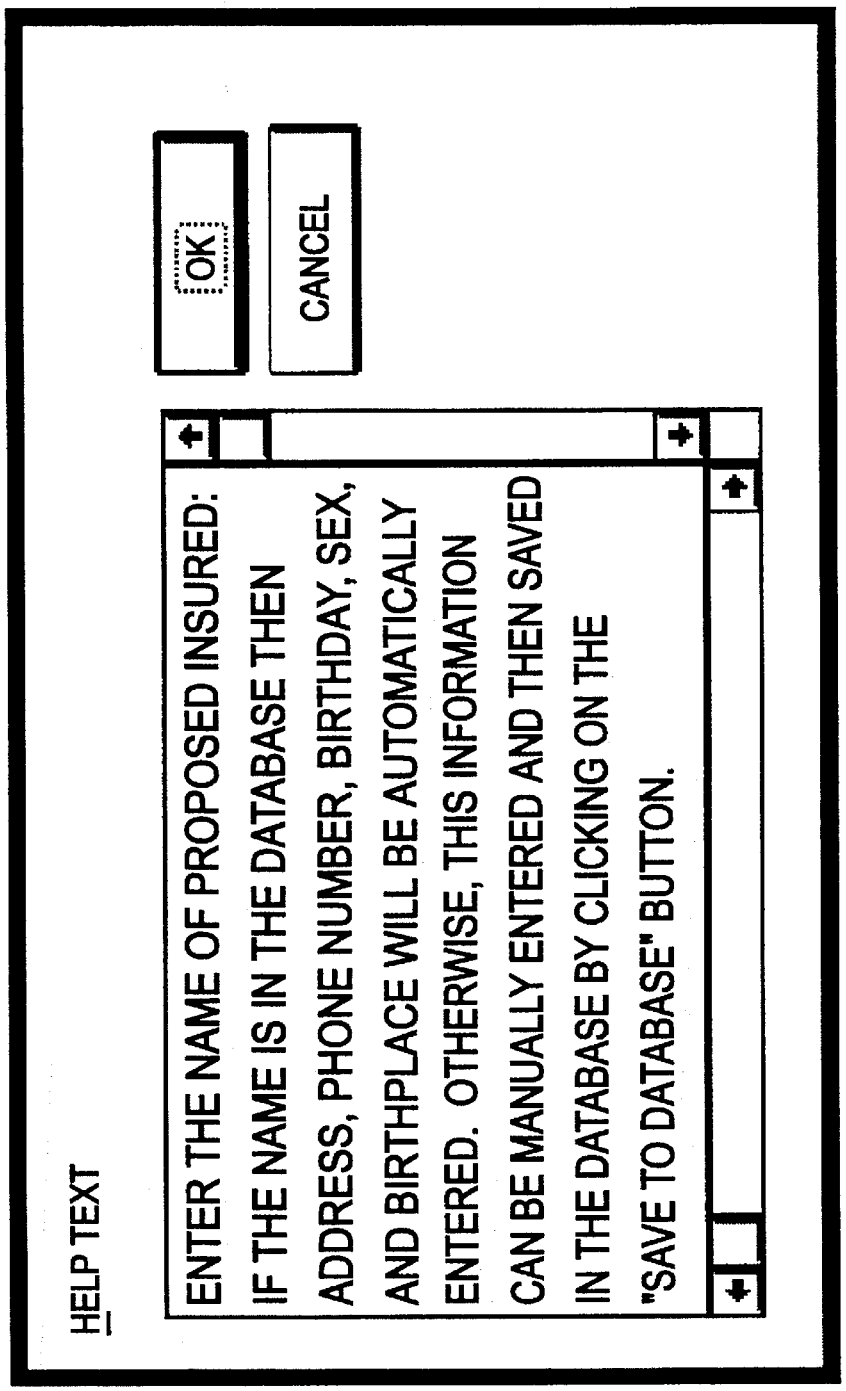
FIG. 17 is the dialog box for attaching context sensitive help to a field.

The Life Insurance Application referenced earlier herein, as an example, illustrates several features which are provided by the form tool. FIG. 17 shows the dialog box for attaching context sensitive help to a field using the "Help" command on the "Properties" menu in FIG. 6. In this example, the help for the field called "Proposed Insured" is an elaboration of some information that may be of value to the operator filling out the form.

FIG. 18 and 19 illustrate an automatic feature provided in the form tool that places check boxes within the space allotted to a field. In FIG. 18 a vertical space is allocated a field called "Mode of Payment" and the check boxes are displayed accordingly. In FIG. 19 a horizontal field is provided for mode of payment and the check boxes are arranged accordingly. FIG. 20 shows the case where insufficient space is allocated for "mode of payment" and although check boxes are indicated, the system automatically provides a selection list since there is insufficient room for the check boxes. There is always room for the selection list since even as the list grows, scroll bars can be added to the display and an arbitrarily long list can be shown.

FIG. 21 shows a dialog box that allows for the automatic generation of the values for fields. This dialog box appears whenever the operator changes the type of a field to either "selection list" or "check box" using the "Field Type" command on the "Properties" menu shown in FIG. 6. The automatic determination of the values looks at values that can be attached from the tree, values that are used in a tree which employs the field for determination of the other tree's value, or finally automatic creation of the values by looking at the values that can be brought from the records of a database. If automatic is not selected, then the new values are manually entered in the edit box under "New Value" and then added to the list in the box called "Values".

Another capability of the invention is to provide protection of fields contained on forms and there are two different protection modes possible. FIG. 22 shows the dialog box that can be used to disallow override values using the "Protection" command on the "Properties" menu shown in FIG. 6. The meaning of no override is that the user is not allowed to override a value which has been assigned to the field from a tree or from a database reference. Field protection can also block the ability for the user of the application to observe the decision tree logic for a particular field. Both of these protections are done on a field-by-field basis.

STACK TOOL

The Stack Tool, which provides for manipulation of the forms of an application, is a high-level, graphical facility for copying, creating, deleting and arranging forms. Within the stack tool there are specific capabilities that allow application creators to create new forms, change the title of an existing form or change the order of the existing forms within an application. For instance, it is often useful to change the order of forms to move a new form to the top of the stack so that it becomes the goal form when the application is initially loaded into memory.

Figure 23:
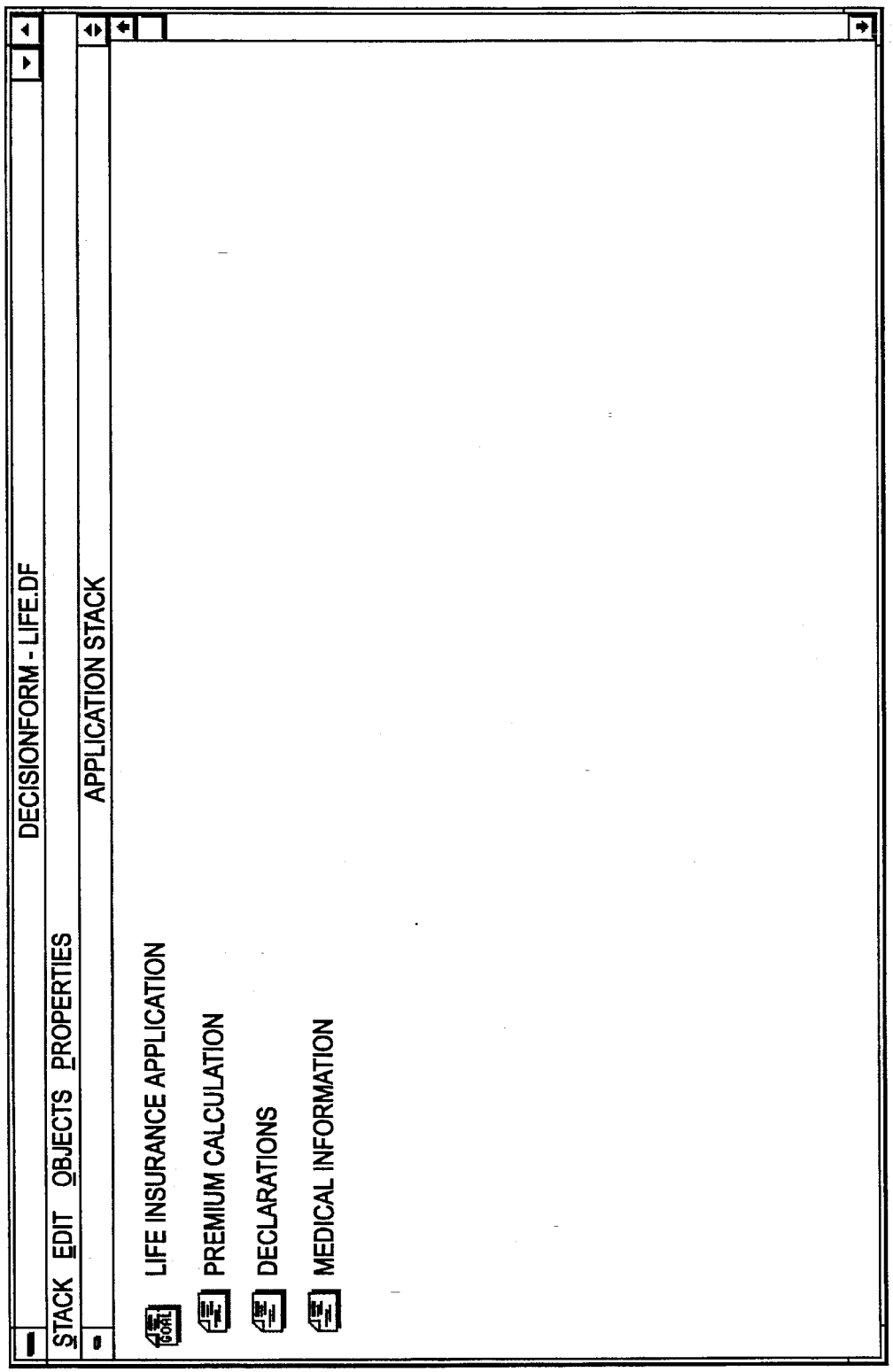
FIG. 23 illustrates a stack tool window with a display of related forms.

The stack for the Life Insurance Application used in the previous description of form completion is depicted in FIG. 23. FIG. 23 depicts a window which is displayed when the stack tool is chosen using the "Stack" command on the "Tools" menu. It shows the four related forms that comprise the "stack" or set of forms for this application. As seen in FIG. 23, the stack for the file Life.DF comprises the goal form and three subsidiary related forms. Of special note in FIG. 23 is the fact that the top form of the stack, in this case the Life Insurance Application form, is depicted as a goal form through the use of a special icon for the top-most form in the stack.

TREE TOOL

In the invention, another specialized tool called the Tree Tool is provided in order to create and modify decision trees. The Tree Tool is invoked by the operator by first selecting the field associated with the tree and then using the "Tree" command on the "Tools" menu as shown in FIG. 5 and FIG. 6.

Figure 24:
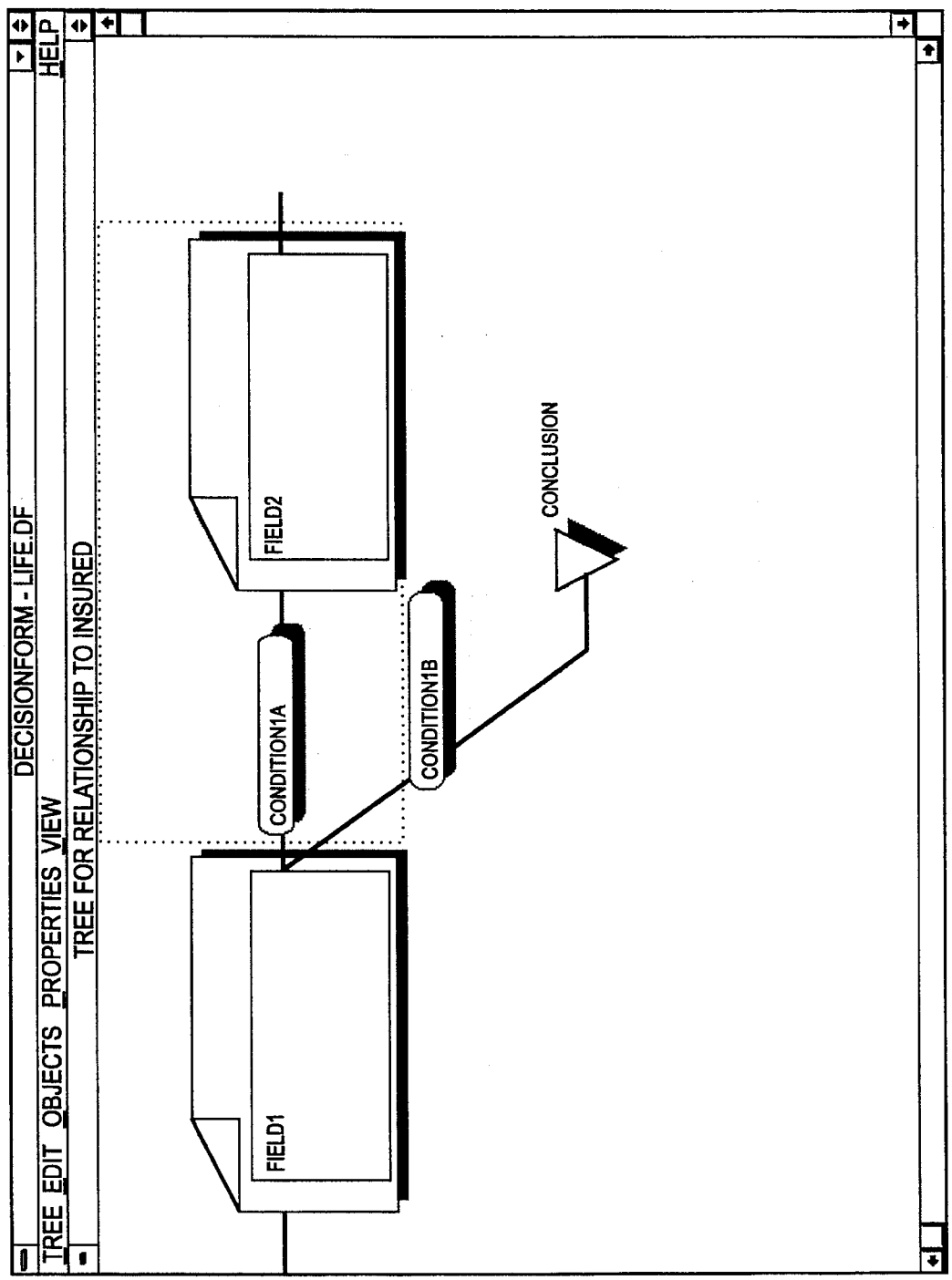
FIG. 24 is a display of a branch object in a tree.

Two basic types of objects can be created using the tree tool. The first object is the branch object which is shown in FIG. 24 highlighted with a broken line. The branch object consists of a condition of the preceding field; in this case, Field 1. The first condition of Field 1, condition 1A, is the condition leading to the highlighted object. The second part of the branch object is the field upon which the new branch will be taken; in this case, Field 2.

Figure 25:
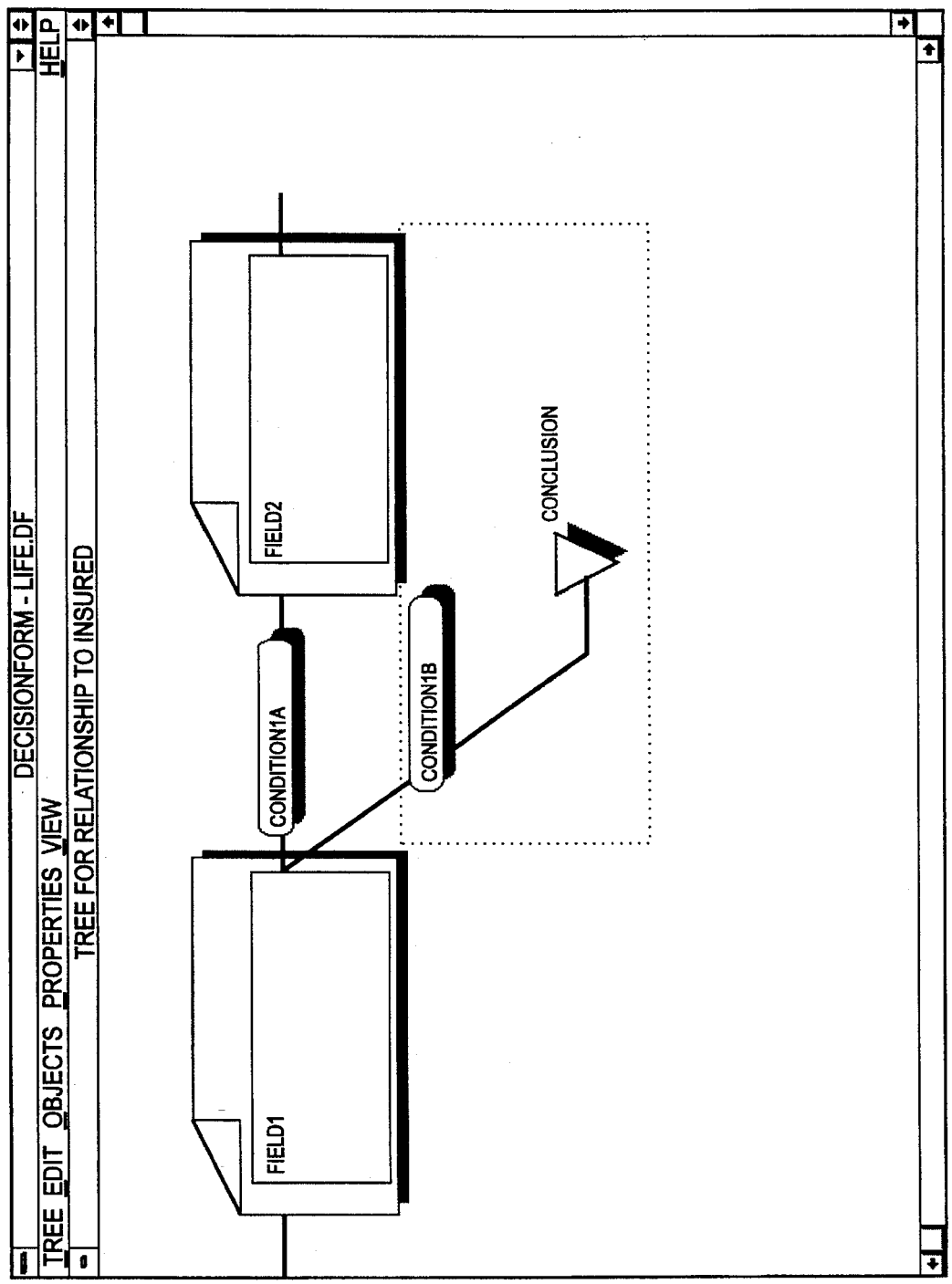
FIG. 25 is a display of a conclusion object in a tree.

FIG. 25 illustrates the conclusion object. The conclusion object is highlighted with a broken line. The conclusion object consists of a condition that the preceding field, again in this case Field 1. The second condition of Field 1, condition 1B, is the condition of this object. The second part of the conclusion object is the conclusion itself; in this case, just indicated with the word "Conclusion". Conclusions can be text, fields, functions, or combinations of the proceeding in expressions connected with operators using spreadsheet syntax.

Figure 26:
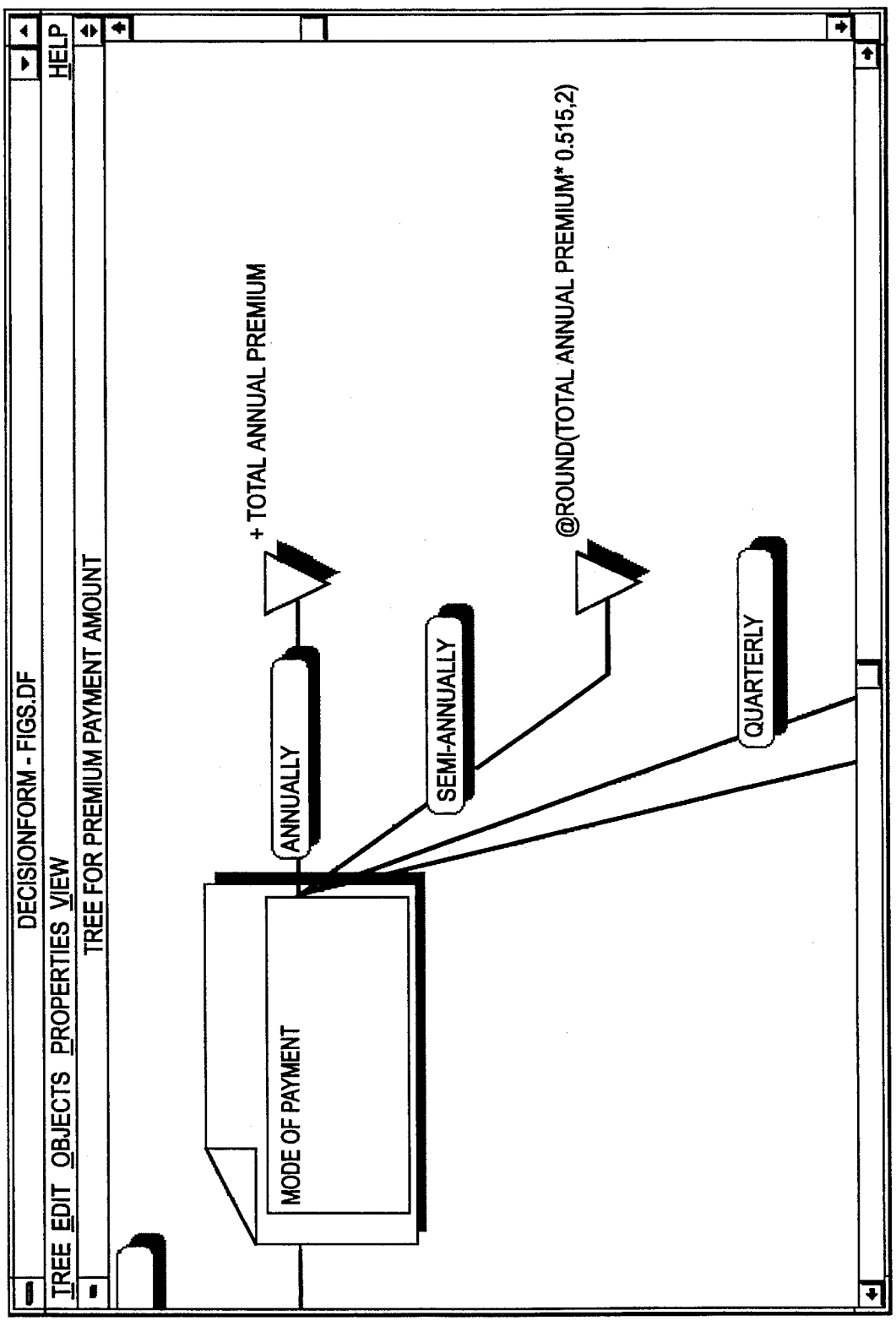
FIG. 26 illustrates multiple branches and expressions for calculating results for each branch.

FIG. 26 shows multiple branches from an example field called "Mode of Payment". If mode of payment is "annual" the value for the premium payment amount is the "total annual premium" as indicated in the conclusion for that branch. If the payments are made "semi-annually", the expression uses the function @ROUND of the total annual premium multiplied times the factor that it adjusts it for the fact that there are two payments made during the year (each equal to about one-half or 0.515 of the annual amount). The @ROUND function also requires specification of the number of decimal places. In this example, the value set at two places gives a dollar and cents amount. The system provides a complete set of built-in functions, such as @ROUND, which can be used within tree conditions and conclusions to calculate values based on field values. These functions are listed in Table 7.

Figure 27:
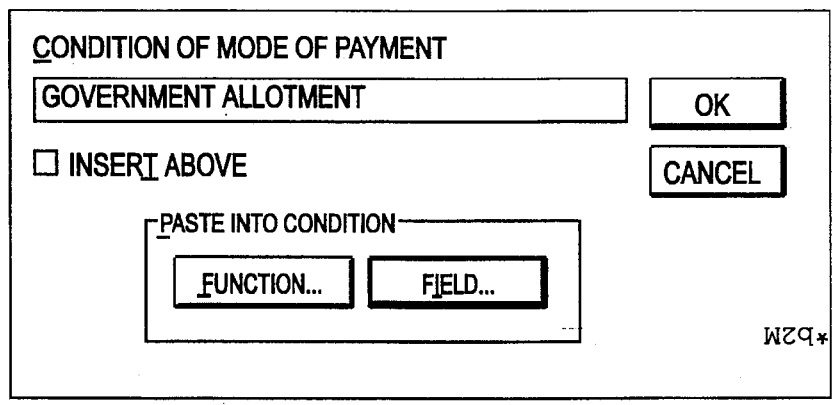
FIG. 27 is a dialog box for specifying conditions and conclusions in a tree.
Figure 28:
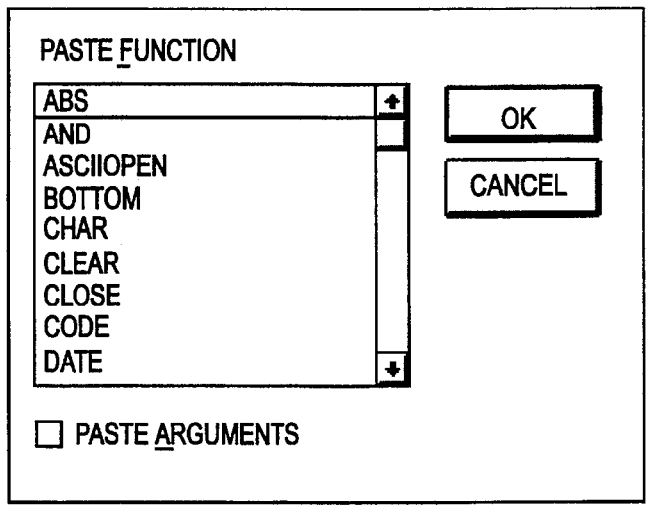
FIG. 28 is a dialog box for pasting functions into an expression.
Figure 29:
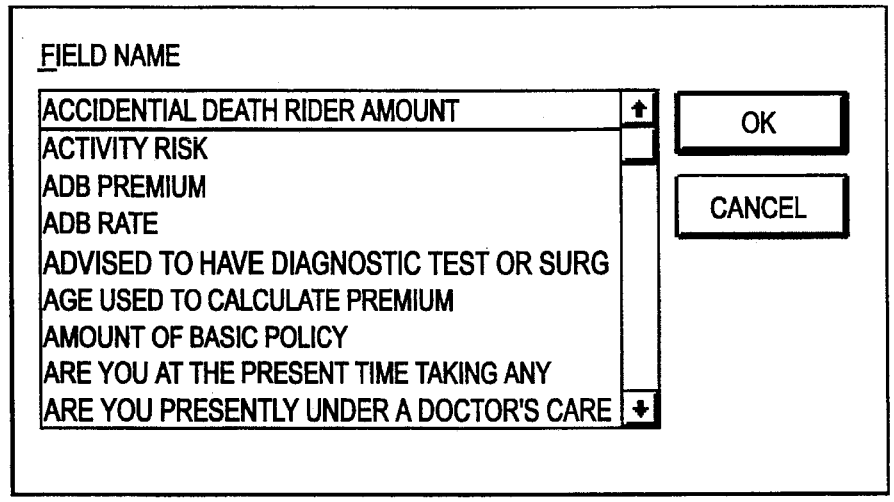
FIG. 29 is a dialog box for pasting field names into an expression.

A dialog box like that shown in FIG. 27 is displayed as a part of the specification of both conditions and conclusions. This dialog box appears when the operator selects either the "Condition" or "Conclusion" command on the "Properties" menu shown in FIG. 7. The condition or conclusion expression is contained within the edit window in the upper part of the box. There are options to assist the entry process by providing pasting of functions and fields into the condition. For the case of pasting functions, FIG. 28 shows a portion of the list of functions available in alphabetical order including an option to paste in descriptive arguments for the functions. FIG. 29 shows the dialog box allowing the pasting of fields. This is simply a listing of all of the fields currently defined in the application thereby saving a number of keystrokes for the choice of a field from the list of all possible fields available.

Figure 30:
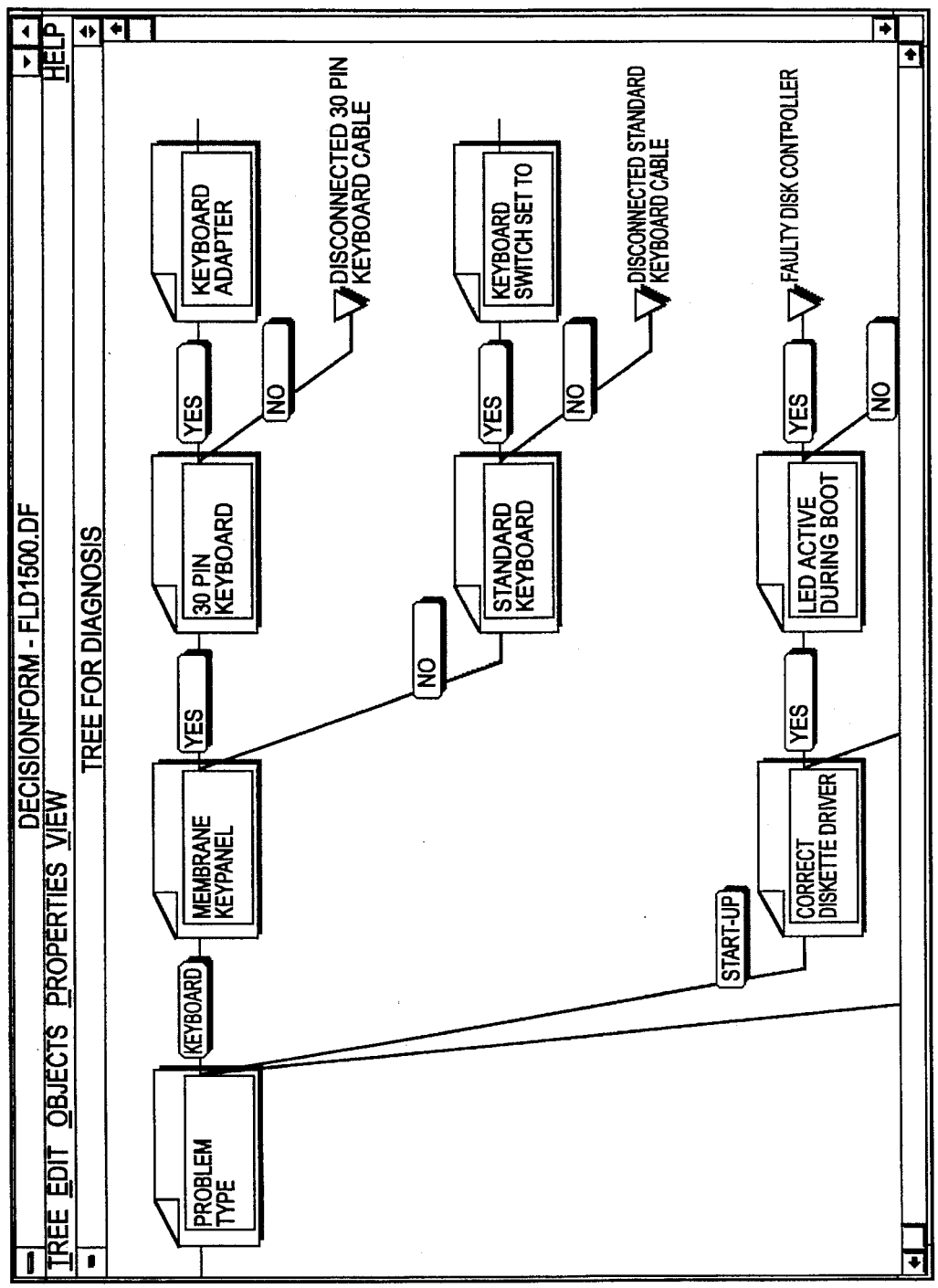
FIG. 30 illustrates a larger perspective view of a tree shown in FIG. 31.
Figure 31:
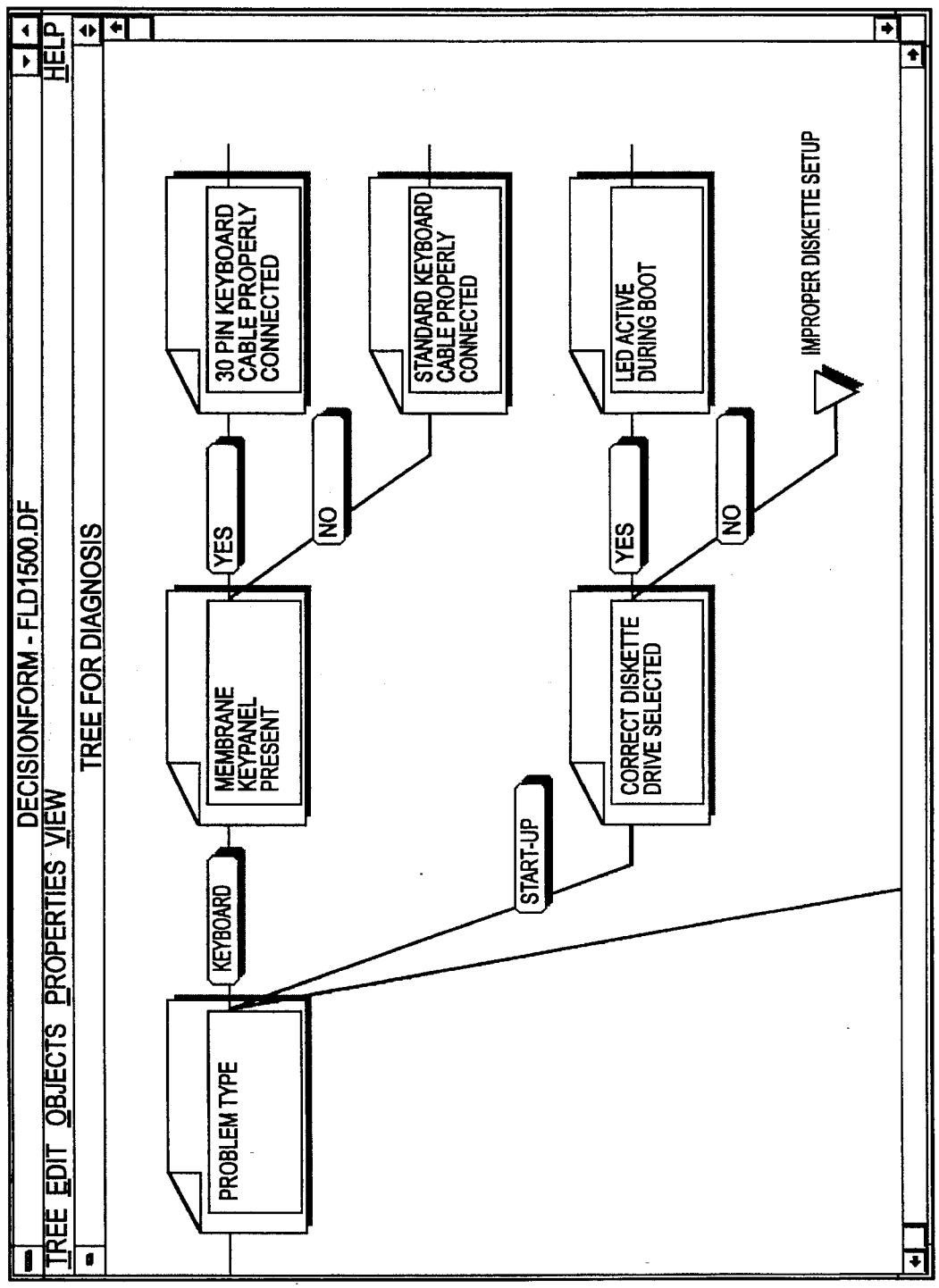
FIG. 31 illustrates a more detailed view of a portion of the tree in FIG. 30.

The invention also provides a very innovative approach to the display of arbitrarily large trees in a fixed-size region, such as on a computer display. FIGS. 30 and 31 both display the same decision tree but at two different levels of magnification. FIG. 30 shows a larger view than that shown in FIG. 31. In FIG. 31 the fields, the branches, the conclusions are arranged with spacing to maximize the amount of information displayed. If a more magnified view is selected, like that of FIG. 31, the branches and conclusions are rearranged with closer spacing in order to fill in some of the blank space that would be available if the prior spatial arrangement of FIG. 30 were maintained.

To maximize the display of tree objects on a fixed size display, the system first determines how many tree objects to display in one horizontal row of the display. The operator can control the number of tree objects displayed in a horizontal row by using the "Expand" command on the "View" menu to decrease the number of tree objects or the "Reduce" command on the "View" menu to increase the number of tree objects.

Once the number of tree objects in a horizontal row is determined, the system next determines the number of tree objects that can be displayed in a vertical column while maintaining the proper aspect ratio of tree objects. The system then displays one horizontal row of tree objects at a time without displaying any objects that are beyond the rightmost edge of the display. Any horizontal rows which contain only tree objects beyond the rightmost edge of the display are not displayed. The result of eliminating these rows is that the display surface is more densely packed with at least one tree object in each horizontal row. This eliminates much of the "white space" that would occur when displaying portions of a large tree near the root of the tree.

Figure 32:
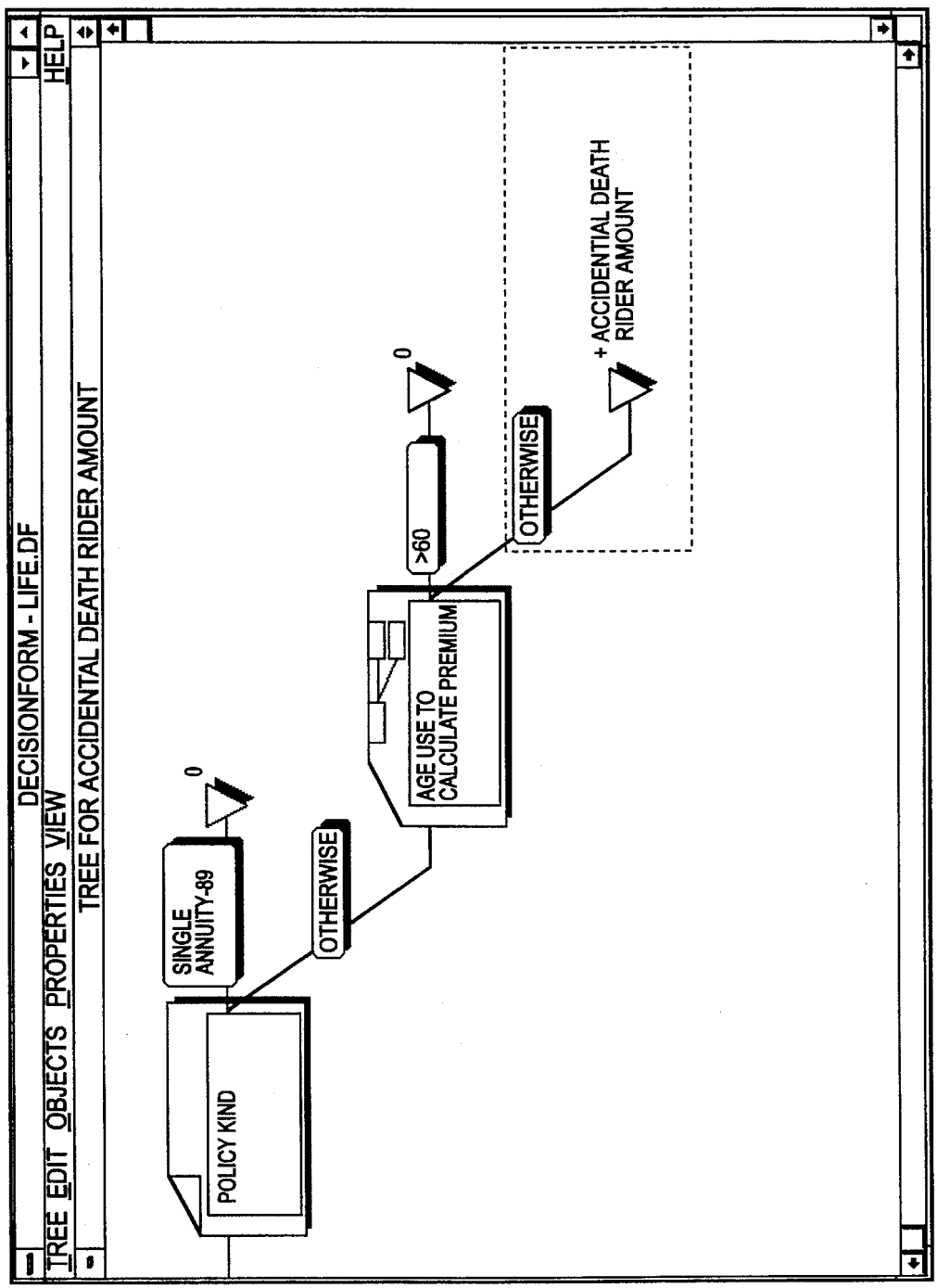
FIG. 32 illustrates a self-referencing tree.

FIG. 32 illustrates the use of a tree that has as one of its possible conclusions the value of the field for which the tree is being determined. The ability of a tree for a particular field to reference itself is useful in providing the user of the system with values determined by the tree if the tree has anticipated the values of interest. But in the case where the values have not been anticipated by the tree, the self-reference allows the field to be prompted so that the operator can enter the information directly.

LINKS TOOL

In the invention, the Links Tool provides an ability to relate the fields on the form system with the fields in related database(s). FIG. 33 shows the dialog box for establishing both read and write links between applications and the databases. The Links Tool dialog can be entered from either form completion mode or from the Form Tool by using the "Links" command on the "Tools" menu.

The Links Tool dialog shown in FIG. 33 allows the operator to associate database fields (listed on the left side of the dialog box) with fields defined within the form system. This association can be made for both the purpose of reading data from the database and writing data into the database. FIG. 33 is from the Life Insurance Application example used earlier and shows how an applicant's address, city, state, etc. can be obtained from a database given the applicant's name.

FIG. 34 shows the ability of the invention to take care of a case where there is not an established database in place corresponding to the values of the fields within the forms system. In the illustration of FIG. 34, a link named "New Link" has been attempted with a database; in this case, a database table named "New File". The system was unable to open that file because that file did not exist and the option provided in the dialog box allows the operator to create a new database table with this name. The system uses the properties of the fields as defined by the operator to create database fields of the appropriate size and type.

VISUAL PROGRAMMING: VALUE TREES AND EVENT TREES

A. Object-oriented Toolbar

Figure 35A:
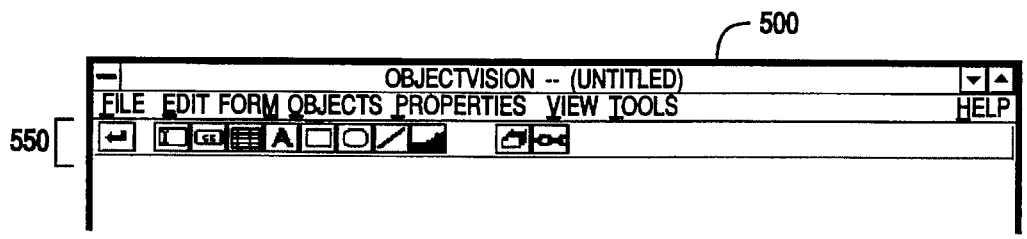
FIGS. 35A–C are screen bitmaps illustrating object-oriented toolbars of the present invention.
Figure 35B:
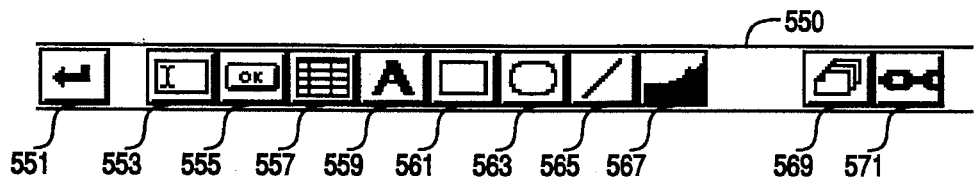
Figure 35C:
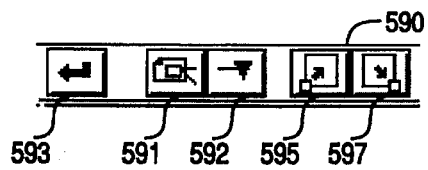

Referring now to FIGS. 35A–E, a preferred form creation/edit interface of the present invention will be described. As shown in FIG. 35A, the system of the present invention provides a main interface or worksurface 500 having an object-oriented toolbar 550. Shown in further detail in FIG. 35B, toolbar 550 includes a plurality of objects (e.g., objects 553–567) which may be employed by the user during form creation. Unlike conventional toolbar menus, however, toolbar 550 instantiates objects on the screen device directly from the object-oriented toolbar.

In a preferred embodiment, the object bar includes a field object 553, a button object 555, a table object 557, a text object 559, a rectangle object 561, a rounded rectangle object 563, a line object 565, and a graphics (bitmap) object 567. The object bar 550 also includes a stack tool 569 for assigning event trees (described below) to a stack, and a link tool 571 for linking or connecting objects to external databases. Finally, the object bar 550 includes a close tool 551 for exiting from the form edit mode.

When creating tree members, the object bar changes to tree toolbar 590. In particular, toolbar 590 includes a branch object 591 and a conclusion object 592. Each is described in detail below.

Figure 35D:
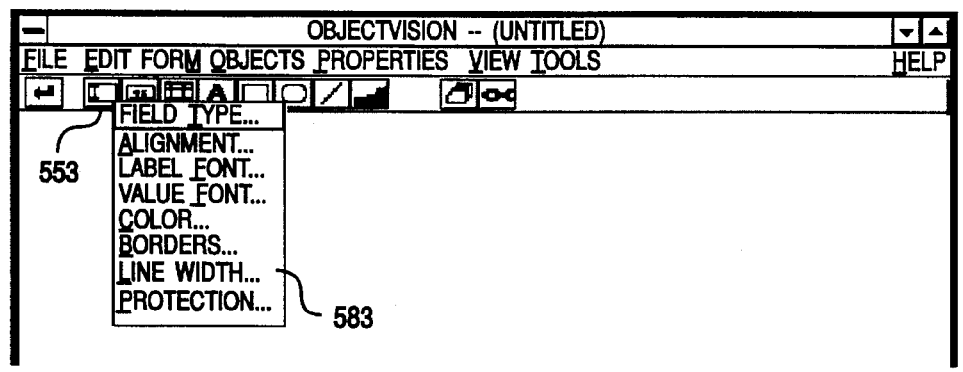
FIGS. 35D–E illustrate a method of the present invention for inspecting individual objects on the toolbars of FIGS. 35A–C.
Figure 35E:
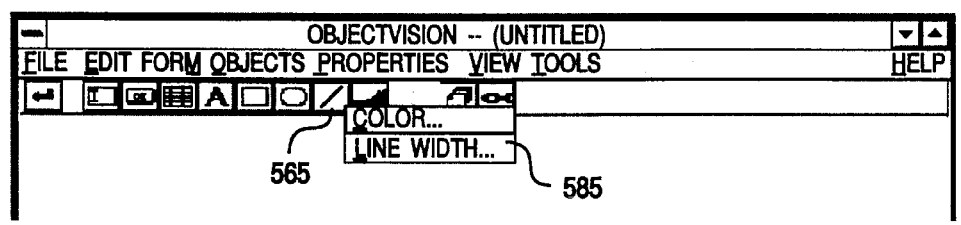

As shown in FIGS. 35D–E, each object of the object bar 550, since it is an object, has specific attributes or properties. According to the present invention, the toolbar 550 itself may then be inspected for determining and setting default values for these specific objects. For instance, the user may inspect the field object 553 (e.g., by a "mouse click", such as right mouse button down) thereby triggering the properties dialog 583. Dialog 583, in turn, lists all of the available properties for this object. By selecting "alignment" from the dialog 583, the user may set a default alignment (e.g., left justified) for field objects.

An additional example is shown in FIG. 35D. Here, the line object 565 has two properties, namely, color and width. By inspecting the line object 565 (e.g., in response to a keyboard and/or mouse event), the user may trigger the properties dialog 585 for the object. Again, the user may select and change properties as desired. In this manner, the present invention provides an object-oriented toolbar, whereby objects are instantiated directly from the toolbar. Moreover, default properties of the objects themselves are easily inspected and set by inspecting the toolbar itself.

B. Tree Basics

The behavior of any application created by the system of the present invention can be defined in terms of its objects, properties, and links. When the Form Tool is open (in form edit mode), a user can create, delete, move, and resize objects, but he or she preferably cannot fill in any values. For instance, using the mouse to select an object, such as a "New Order" button, the user can drag objects to new locations. Thus, the properties of objects may be visually manipulated. Properties are also conveniently inspected. Properties of a field can be inspected, for instance, by clicking on it with the right mouse button.

Besides screen attributes (i.e., size, position, color, font, and the like), the present invention provides additional types of properties—trees. Trees are a set of instructions attached to an object such as a field, a form, or a stack. There are two types of trees: value trees and event trees. Each will be examined in turn. Value trees calculate a value for the object they are attached to. Event trees, on the other hand, perform an action after an event occurs to their object.

Both trees are made of nodes. There are branch nodes (restricted and unrestricted) and conclusion nodes. A restricted branch is simply a branch that is associated with a field; an unrestricted branch is not limited to values in a field. An empty node serves as a placeholder, indicating the absence of a tree or the lack of a conclusion after a branch. Every node has a condition except the root branch (the first branch). In a preferred embodiment, a decision is made by reading trees from top to bottom and left to right. Thus, trees are read in much the same way one would read a flow chart: Is Quantity (branch) greater than 25 (condition)? If the answer is yes, then Shipping Method is Commercial carrier. If the answer is no, then evaluate the next condition.

Figure 36A:
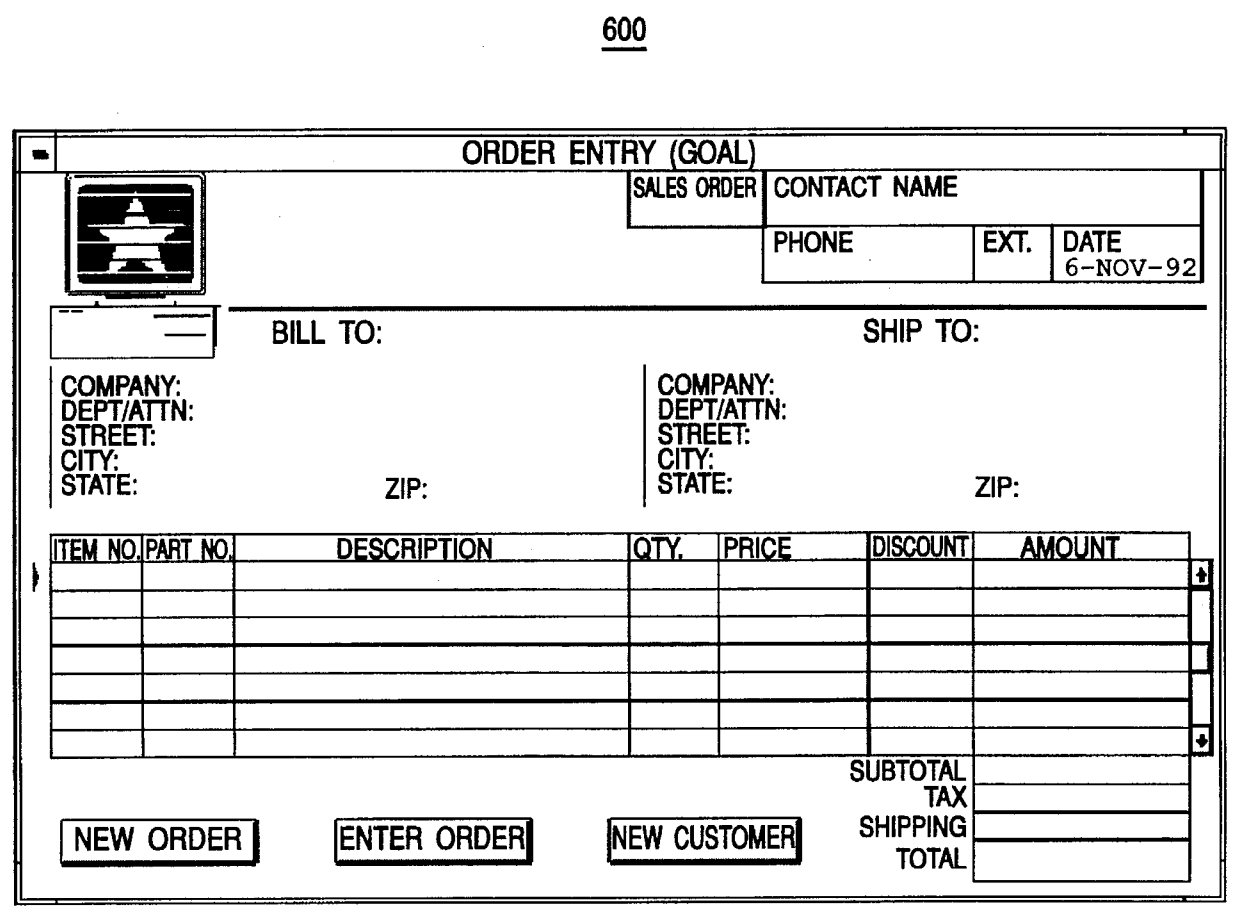
Figure 36B:
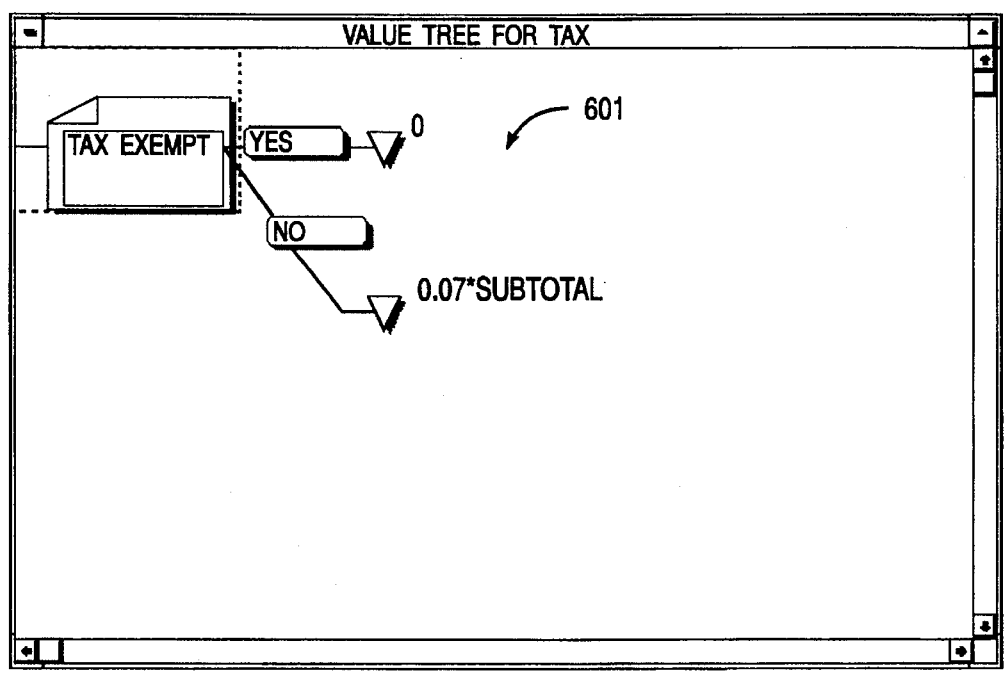
FIG. 36B is a screen bitmap illustrating a simple value tree of the present invention.
Figure 36C:
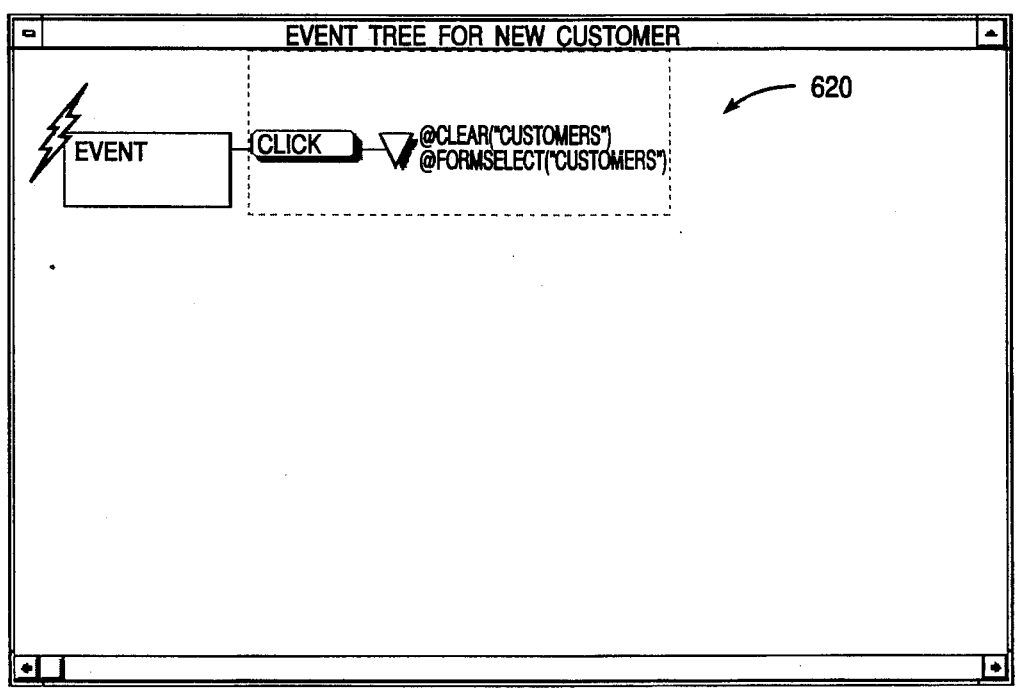
FIG. 36C is a screen bitmap illustrating a simple event tree of the present invention.

Value trees show how the application will calculate a value, that is, they shows the logic used to make a calculation. As shown in FIG. 36A–C for an Order Form 600, for example, the user can easily inspect the value tree 601 for an object (e.g., tax exempt field): double-clicking the field to the right of the word Tax for displays the value tree 601. The value tree shows how the application calculates the value for the Tax field; if the value in the Tax Exempt field is Yes, it returns the value 0. If the value in the Tax Exempt field is No, it returns the value 0.07 multiplied by the value in the Subtotal field.

Event tree properties, on the other hand, show how the application responds to specific user actions (called events). Again, these are easily inspected in the system of the present invention. If a user double-clicks on the New Customer button of the form, for example, an event tree 620 appears as shown in FIG. 36B. The event tree shows what action occurs when a user action triggers it. In this case, if the user clicks the New Customer button, the application removes the BILL TO and SHIP TO area values and then selects the Customers form.

The system of the present invention provides @functions, actions to occur in response to particular event may be specified. For example, @CLEAR is an event function that clears a form of all values in a named link. @FORMSELECT, on the other hand, is an event function that is equivalent to choosing Form¦Select then choosing a form name. Additional events are described hereinbelow.

C. Creating Value Trees

A value tree is a special type of field property. It defines the logic used to calculate a field value. The following description will focus on when to use value trees in an application and demonstrates how to create value trees for the Order application.

Fields can receive their values from three sources: user input, a calculation based on other values, or an external link. Value trees calculate values based on other values. In the Order application, for example, a value tree assigned to the Total field calculates its value based on the values in the Subtotal, Shipping, and Tax fields. In the Order application, shown in FIG. 36A, the fields in Table fieldvaltree get their values from value trees.

| Field | Based on |
|---|---|
| Date | @TODAY |
| SHIP TO area | Shipping Information Same as Billing Information? |
| Discount | Amount |
| | Qty. |
| | Price |
| | Customer Type |
| Amount | Qty. |
| | Price |
| | Discount |
| Subtotal | Amount |
| Tax | Tax Exempt |
| | Subtotal |
| Tax Exempt No. | Tax Exempt |
| Shipping | Ship State |
| | Subtotal |
| | Quantity |
| Total | Subtotal+Tax+Shipping |

The values for the Item No., Part No., Description, and Price columns come from links to external database files.

Value trees are made of branches, conditions, and conclusions. One can think of a branch as a field, a condition as an "if" statement, and a conclusion as a "then" statement. For example, suppose the Order application determined the value for the Discount field based solely on the quantity shipped. The if-then statement would read:

"If the quantity is under 10, then do not give a discount. If the value is equal to or greater than 10, then give a 20% discount."

The following table shows how this is calculated:

| Branch | Condition | Conclusion |
|---|---|---|
| Quantity | <10 | 0% |
| | >=10 | 20% |

If there were another condition (for example, >20), the value 21 would meet two conditions: >20 and >=10. In a preferred embodiment, value trees select a conclusion based on the first condition that is satisfied (although this preference may be modified to suit the needs a particular embodiment). For simplicity to the user, however, the conditions are typically positioned in the order that they should be evaluated. In the preceding example, for instance, the condition >20 should be the first condition in the value tree.

Some value trees do not require the application to evaluate a field for its value because the same calculation is performed every time. For example, the Total field simply sums the values in the Subtotal, Tax, and Shipping fields:

| Branch | Condition | Conclusion |
|---|---|---|
| None | None | Subtotal+Tax+Shipping |

Figure 37A:
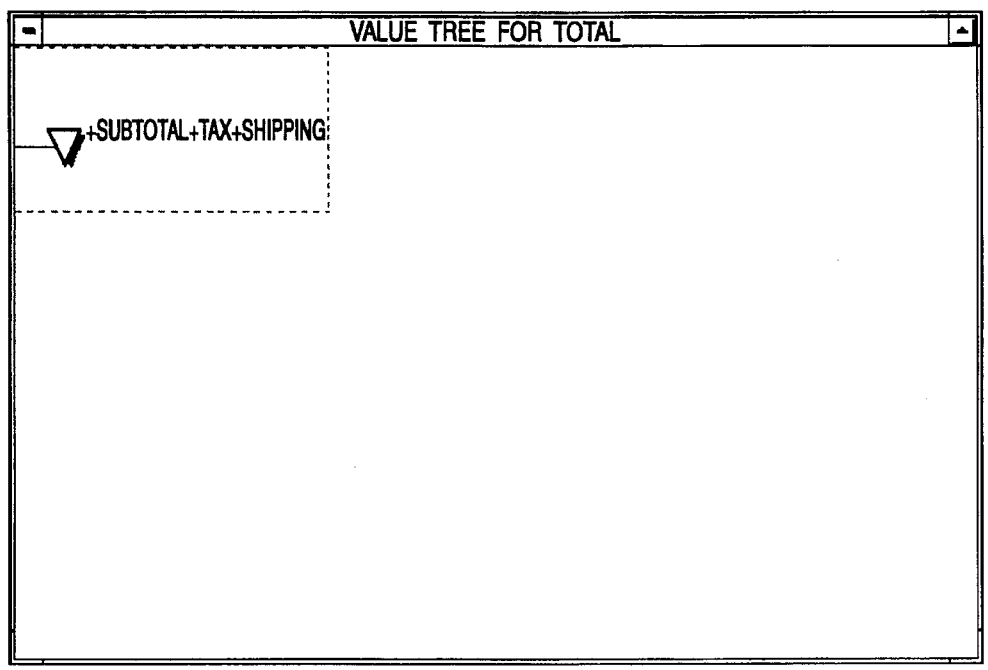
FIGS. 37A–H are screen bitmaps illustrating a method of the present invention for creating value trees.
Figure 37B:
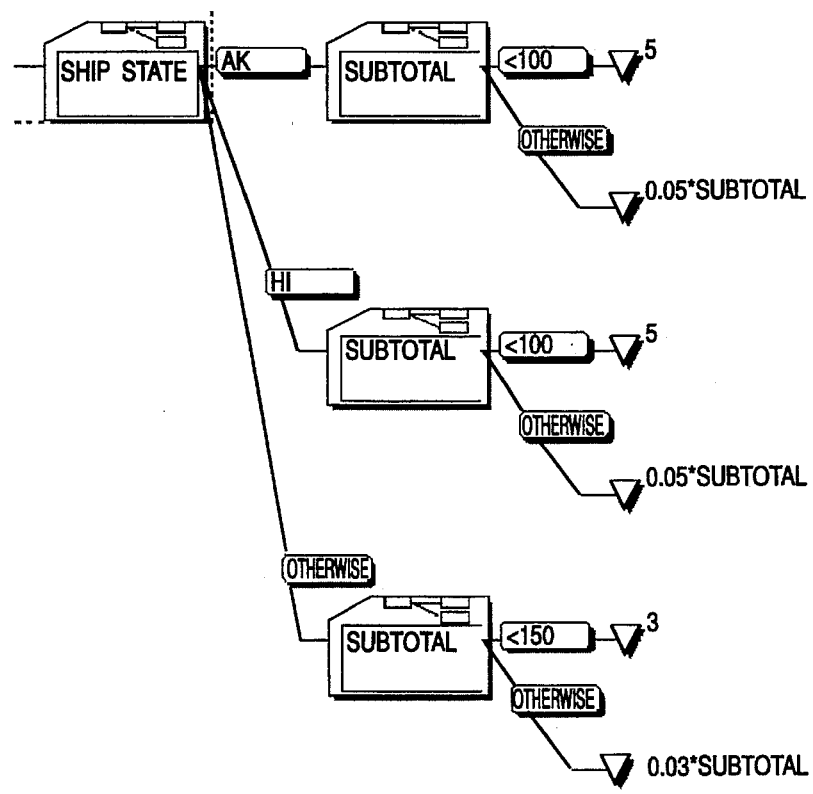

FIGS. 37A–B illustrate how the decision logic would appear as value trees; one is simple, the other more complex.

1. Simple Value Tree

A simple value tree is created for the Tax field by the following if-then statements:

"If the value for Tax Exempt is Yes (True), then return the value 0. If the value for Tax Exempt is No (False), then calculate the value as follows: 0.07*Subtotal."

In this case, the tax rate is assumed to be 7%. The following table shows how this is calculated.

| Branch | Condition | Conclusion |
|---|---|---|
| Tax Exempt | Yes (True) | 0 |
| | No (False) | .07 * Subtotal |

The conclusion 0.07*Subtotal is an expression. Expressions can include combinations of constant values (such as 0.07), operators (such as *, for multiplication), field names (such as Subtotal), and @functions.

Figure 37C:
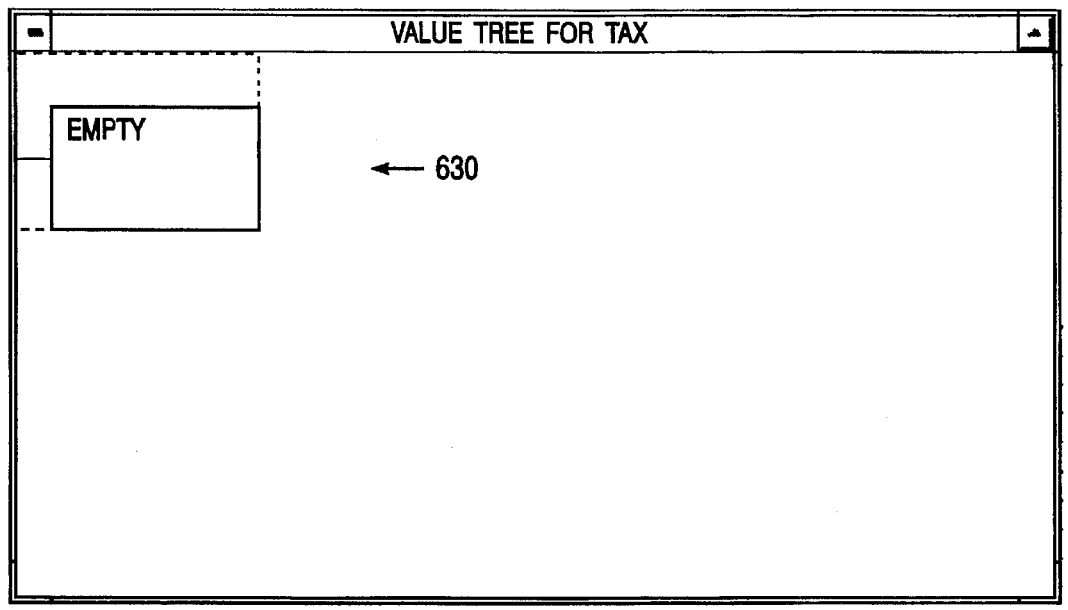

A value tree for the Tax field is added as follows. The user opens the Form Tool if it is not already open (e.g., choose Tools, Form). Next, the Tax field is selected with the right mouse button to inspect its properties. The property of Value Tree is chosen. A Value tree 630 for Tax dialog box appears as shown in FIG. 37C. The value tree is currently empty. The value tree is actually created as follows. A branch is first added by clicking the Branch object 591 on the object bar 590. The Tax Exempt field is entered, by selecting from a pick list containing all Field Names in the application.

Figure 37D:
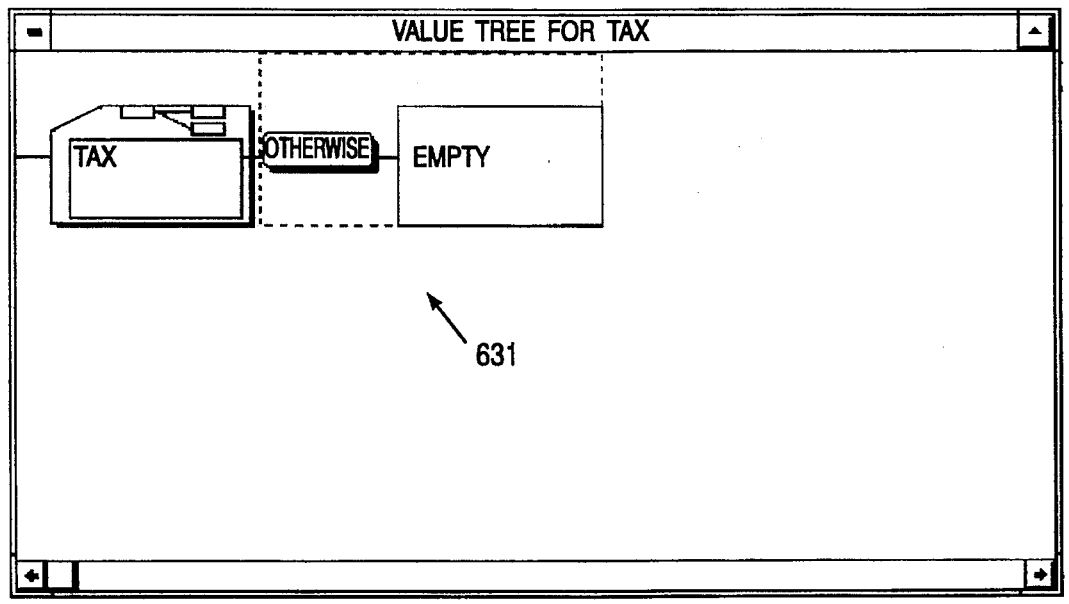
Figure 37E:
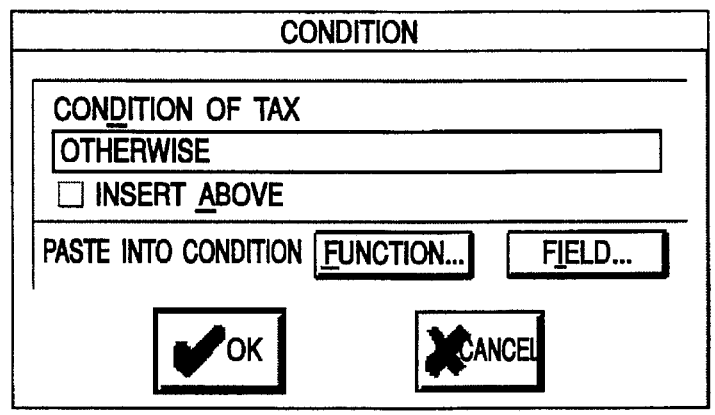
Figure 37F:
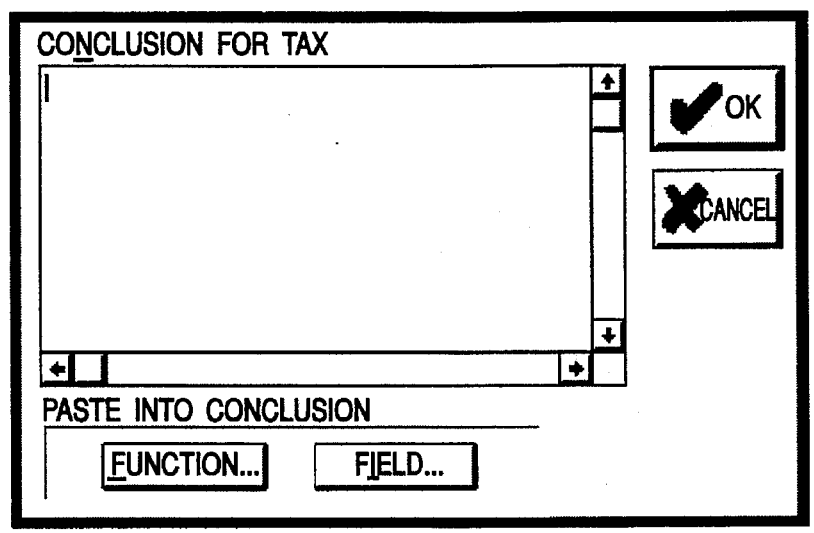
Figure 37G:
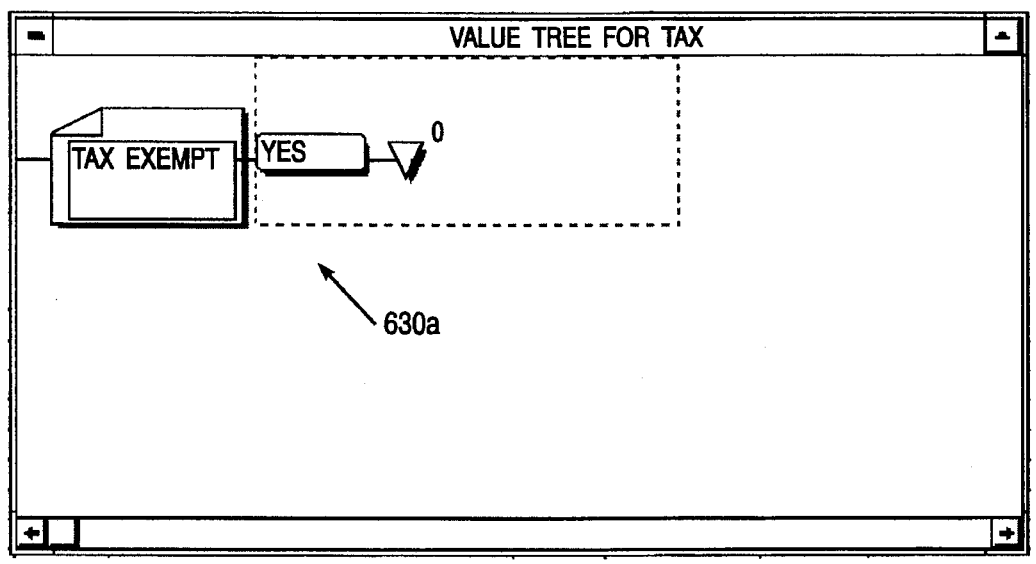
Figure 37H:
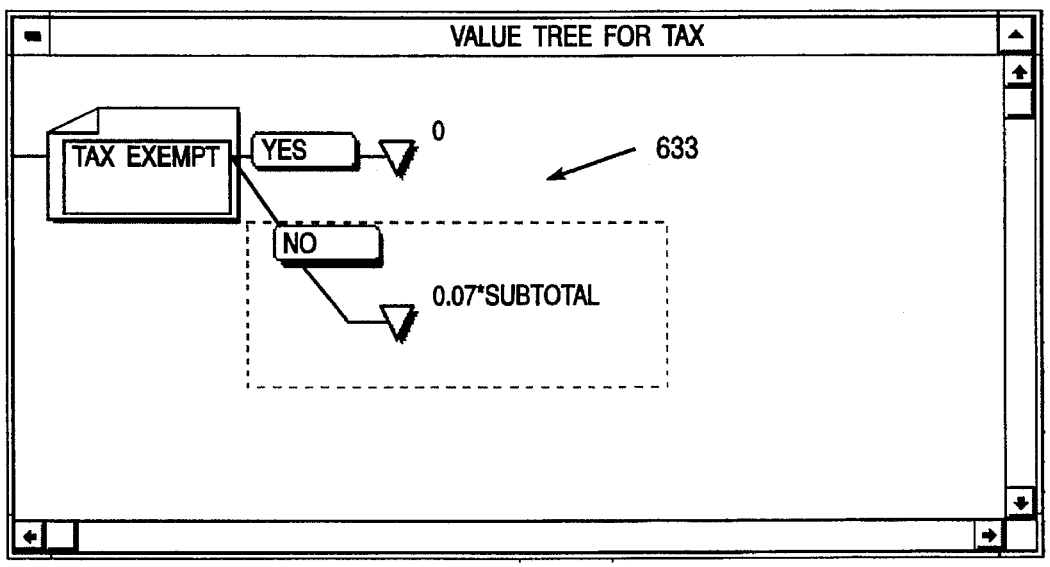

As shown in FIG. 37D, the value tree now shows a branch 631, but no condition or conclusion. A dotted rectangle surrounds the conclusion node, showing that it is selected. The default condition "Otherwise" and default conclusion "Empty" exist simply as placeholders. Now the Conclusion object 592 on the object bar 590 is selected. Note that first a "Condition" dialog box 640 of FIG. 37E appears so the user can define the logic that will lead to this conclusion; here, the user enters the condition of the Tax Exempt value. Next, a Conclusion dialog box 650 of FIG. 37F appears. Into this, the user enters the conclusion 0 and presses Enter. The value tree 630a, as it now appears, is shown in FIG. 37G. Using object bar icons 595 and 597, the tree display may be enlarged or reduced, respectively, as desired. Finally, the value tree is completed (closed) by selecting the close icon 593.

Additional value trees may be added to the Order application: Amount field, Subtotal field, Total field, and Tax Exempt No. field. After creation, each value tree may be edited (e.g., to change a conclusion) as desired.

2. Complex Value Tree

The Tax value tree above evaluated only one field to calculate a value. The user can create more complex value trees that add powerful features to applications. Advanced features include:

1) Creating lists of value options: When designing the form, the user may specify the values for the Customer Type check boxes.
2) Evaluating two or more values to supply a value for another field: For instance, a Discount value tree may evaluates two fields, such as Customer Type and Quantity.
3) Including @functions in expressions: Value functions instruct the system to calculate a value by performing mathematical, logical, financial, or string operations.
4) Writing complex logical conditions to evaluate two or more values before making a conclusion: In some applications, this technique lets the user create smaller, simpler value trees. Each of these features will now be described.

Referring now to FIG. 38A, the Customer Type field on the completed Customers form 700 is defined as Check Boxes field type with the values Distributor, Dealer, Educator, and End User. The user can add a list of value options to a field in three ways: (1) the user types the list of value options in a dialog box when he or she assigns one of the selection methods to the field; (2) the system reads the value options from the field of a linked data file associated with the field; or (3) by default, the system automatically assembles the list from values the user defines in one or more value trees.

Figure 38B:
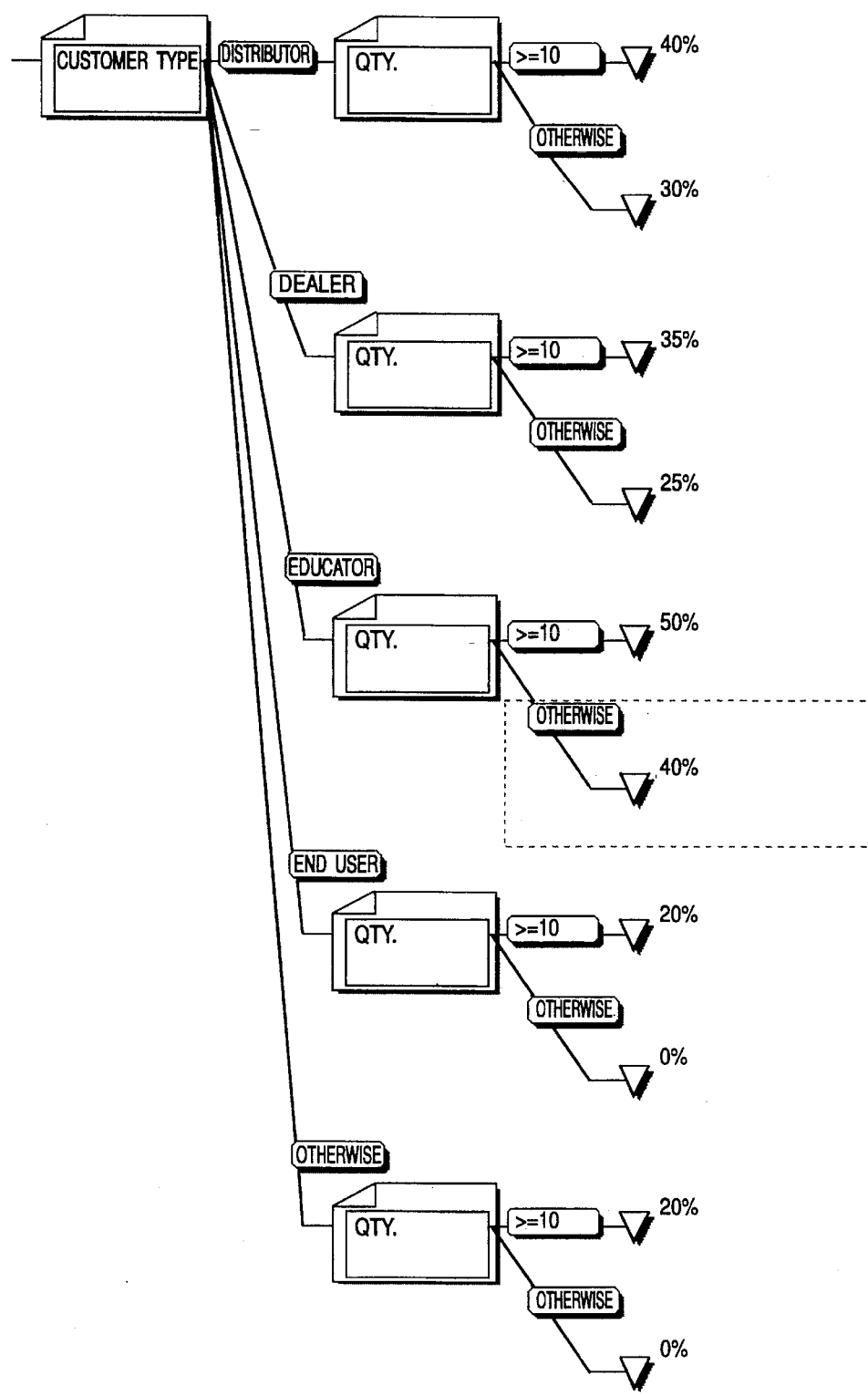

In the Order application, the Discount field gets its value from the values in the Customer Type and Quantity fields and, thus, is required to evaluate two or more values. This may be summarized by three of the if-then statements from the value tree:

If the Customer Type is distributor, then look at the Quantity. If the Quantity is equal to or greater than 10, then conclude 40%. If the Quantity is less than 10, then conclude 30%. Notice that the first statement tells the application to evaluate another field while the other statements return a conclusion. To add conditions in evaluating a field's value, the user clicks Branch on the object bar. To add conditions that return a conclusion value, Conclusion on the object bar is selected. FIG. 38B shows the completed Discount value tree.

To create the Discount value tree, the user performs the following steps. First, the Form Tool is opened (if not already, for example, by choosing Tools, Form. Second, the pointer is positioned on the column label, Discount, and the right mouse button is clicked to inspect its properties. Third, Value Tree is chosen. Fourth, the first branch is created by selecting the Branch object 591 on the object bar 590; Customer Type is then selected from the list of field names. Fifth, another branch is created by clicking on the Branch object again; the Condition of Customer Type dialog box appears, into which the user enters Distributor. Seventh, the Field Name dialog box appears; the user enters Qty. from the list.

The user proceeds to create the first conclusion. The Conclusion object is selected on the object bar. The Condition of Qty. dialog box appears. The user enters >=10. The Conclusion for Discount dialog box then appears; into this, the user enters 40%.

Although additional branches could be created by repeating the fourth through seventh steps above, an easier UI technique is available. In particular, the system of the present invention allows the user to copy, paste, and edit branches. Any branch can be copied by selecting its first node and then choosing Edit¦Copy or pressing Ctrl+Ins (or other desired command option). Choosing Edit¦Paste or pressing Shift+Ins, for example, pastes the branch at the location of the selected node. In the present example, one may select the Distributor node, then press Ctrl+Ins to copy the entire branch. Pressing Shift+Ins pastes the branch at the same level as the Distributor branch. Next, the Condition of Customer Type dialog box appears. Into this, the user enters the new condition for the branch he or she is about to paste. In the present example, the user enters Dealer. The Dealer branch then appears below the Distributor branch.

Next, the conclusion is edited. The user invokes an edit mode for Dealer by double-clicking the first conclusion, 40%. The Conclusion for Discount dialog box appears again. At this point, the user may replace 40% with 35%. By double-clicking the second conclusion, 30% for Dealer, the Conclusion of Discount dialog box appears again. Here, the user can replace 30% with 25%. To complete the value tree, the user selects the Dealer branch node, and paste another copy of the branch. Enter Educator is entered for the condition. Finally, two more branches (one for End User and one for Otherwise) are pasted, with the conclusions of each branch edited.

3. @functions

To perform an operation on a field value, one includes @functions in value trees. @Functions return values based on calculations that cannot be expressed by mathematical operators such as +, −, *, and /. For example, the TODAY function inserts the current date in a field, using the format specified in the Field Type dialog box. The BLANK function removes a value from a field. Most @functions require at least one argument, that is, specific values required by an function. Some functions, for instance the @AND function, has one or more arguments enclosed in parentheses and separated by commas. In this example, @AND returns the value Yes if all arguments are True; otherwise, it returns the value No. The @SUM function also has one or more arguments separated by commas. The function adds all the values in the list.

Figure 39A:
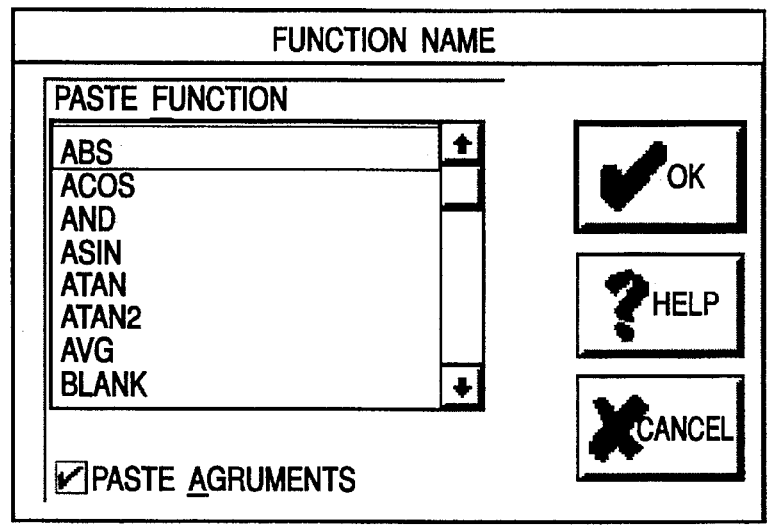
FIGS. 39A–B are screen bitmaps illustrating a method of the present invention for associating functions with individual fields having value trees.
Figure 39B:
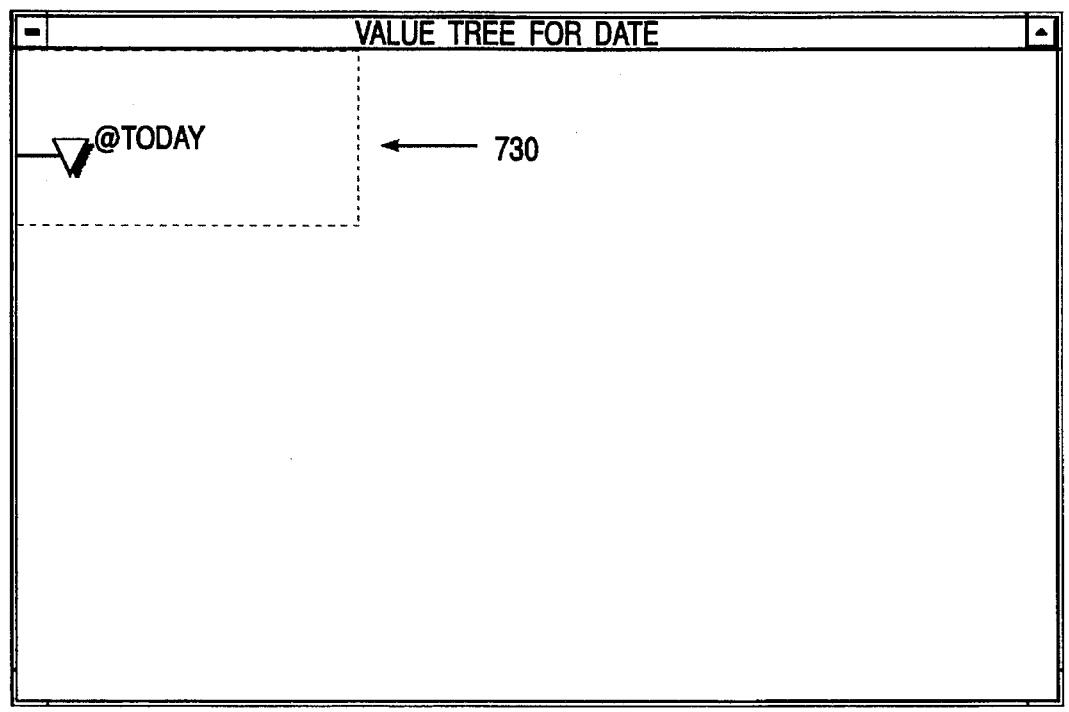

Referring now to FIG. 39A–B, a method for adding functions to fields will be described. For example, a TODAY function is added to the Date field by first positioning the pointer on the Date field and clicking the right mouse button to inspect its properties. Next, the Value Tree option is chosen. The user then selects Conclusion on the object bar. The Conclusion dialog box appears. The user can either type @function names or select them from the Function Name list. Selecting the name from a list eliminates typing errors. By selecting a Paste Function button, the user can display a Function Name list 720 as shown in FIG. 39A. When Paste Arguments is checked, the argument list for a function is pasted into the dialog box in addition to the function name. This feature is helpful as the user becomes familiar with @functions. In this example, the user selects TODAY and clicks OK, then click OK to close the Conclusion for Date dialog box. The value tree may now be closed by clicking Close Tool on the object bar, whereupon a value for today is now displayed in the Date field.

The system of the present invention also provides for unrestricted branch type—a special type of branch that can evaluate expressions as well as any number of different field's values. One can have an unrestricted branch in either value or event trees. An unrestricted branch condition can be any valid expression that returns the value Yes or No. An unrestricted branch conclusion for a value tree can be any valid value tree conclusion. For example, an unrestricted branch condition can be any of the following:

@LENGTH (FieldName)>10
@ISBLANK (FieldName)
@AND (FieldName1, FieldName2)=Yes
(FieldName1)+(FieldName2)>100
@SELECTEDFORM="FormName"

D. Creating Event Trees

Like a value tree, an event tree is a special type of property. It defines the action the system performs in response to an event such as a click, a field or form selection, or a custom Ctrl+key combination. Event trees instruct the application to perform an action when an event occurs.

Unlike value trees, event trees usually do not return values. Event trees, however, can cause fields to get new values. For example, the @ASSIGN function can assign a value to any field. Link functions, such as @NEXT, deliver values to any connected fields. Thus, event trees are built whenever the user wants the application to respond to one of the following events:

1) Clicks: Buttons are usually assigned an event tree that makes them respond to a click.

2) Selecting a particular value from a list of options: The event tree can display another form when a particular value is selected in a Selection List, Check Box, Radio Button, or ComboBox field.

3) Change: An event tree can display a new form if a user enters a new value or overrides a default value.

4) Form events (such as Change): An event tree can automatically close a form that has just been completely filled in, and make another form appear.

5) Stack events (such as Close, Open): An event tree can display the message "Remember to sign out!" when the user closes an application.

6) Stack events (such as Custom shortcut keys). An event tree can instruct the application to clear the active form when the user types a key combination, such as Ctrl+C.

In this manner, event trees issue instructions to the application using event functions. The event functions used in the Order application include:

@CLEAR(LinkName): Clears the linked fields associated with the link named LinkName in preparation for writing a new record.

@CLEARALL: Clears all the values in a form except DDE link values and those values defined as constants in value trees, such as the Date field on the Order Entry form. This is equivalent to choosing Edit!Clear All.

@DELETE: Deletes the record at the current location in the external data file, using the LinkName link.

@FORMSELECT(FormName): Selects the form named FormName. It works identically to choosing Form!Select and choosing an existing form name.

@NEXT(LinkName): Displays the next record in the external data file based on the LinkName.

@PREVIOUS(LinkName): Displays the previous record in the external data file based on the LinkName.

@RESUME: Returns to guided completion.

@STORE(LinkName): Updates or creates a record in the external data file with the current values.

@TOP(LinkName): Displays the first record in the external data file based on the LinkName.

As shown, many of these event functions affect links.

Figure 40D:
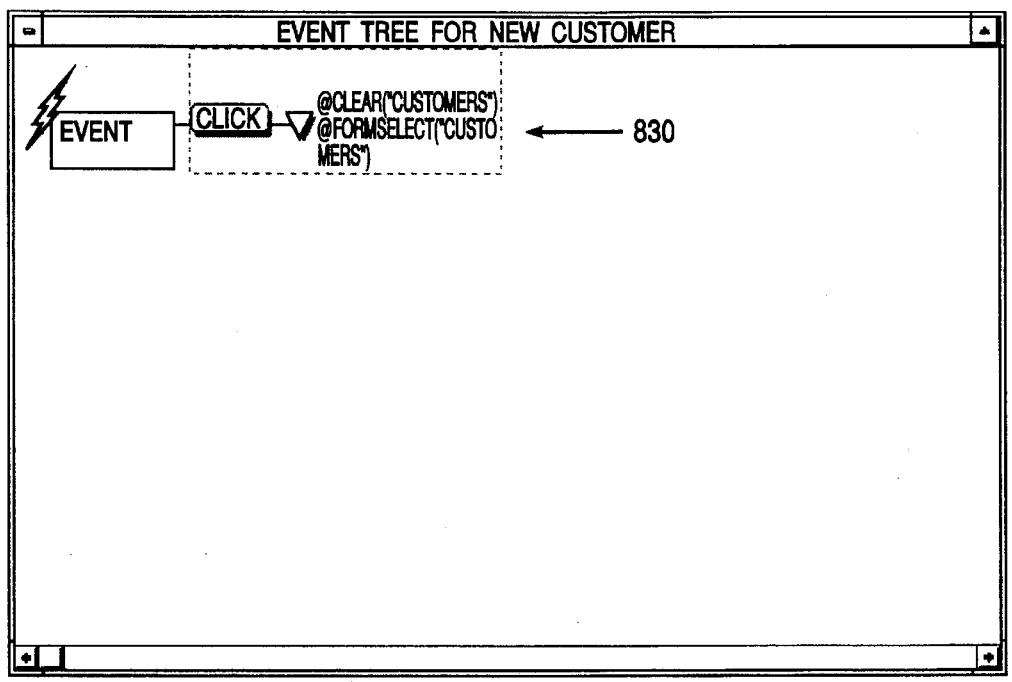

Next, the user selects Conclusion object 592 (FIG. 35C) on the object bar. The Event Name dialog box 810 appears as shown in FIG. 40B. The event determines which action will be initiated, just as in a value tree the condition determines which conclusion will be calculated. Next the user enters click (or selects from the Event Name combo box 813). Click is a reserved keyword for an event in the system. After the action is confirmed (e.g., clicking the OK button), the Action for New Customer dialog box 820 appears as shown in FIG. 40C. Upon selecting Paste Function 821, the Function Name dialog box 720 appears. The user may then scroll down the Paste Function list and select @CLEAR. The Paste Arguments button is selected, then confirmed (e.g., click OK). By using the Paste Function button instead of typing functions, the system provides the user with a list of arguments that a function requires.

Figure 40E:
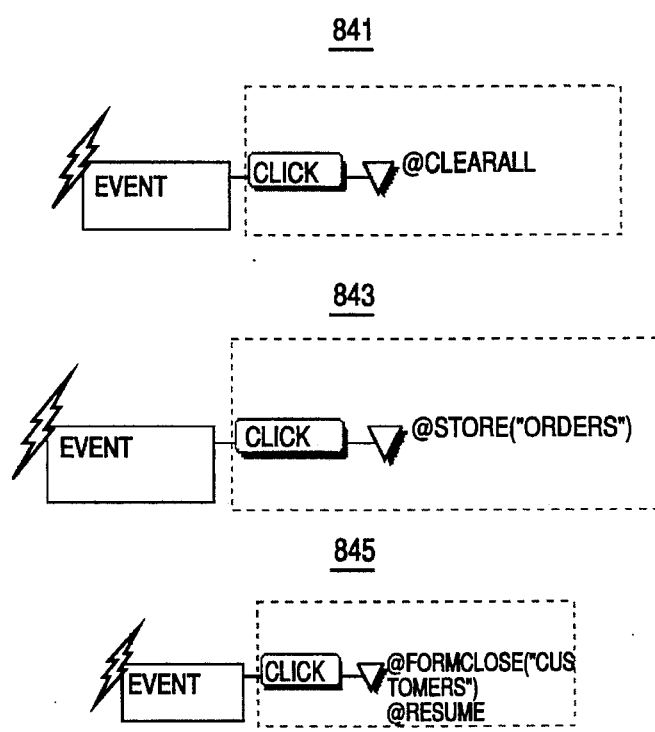

Continuing with the example, the argument LinkName is replaced with "Customers". The user next presses End to move the pointer to the right of the expression, then presses Ctrl+Enter to add another line. Next, Paste Function is selected again, with the user scrolling down the Paste Function list and select @FORMSELECT (e.g., clicking OK). When the Action for New Customer dialog box 820 reappears, FormName is replaced with "Customers". The event tree 830 for New Customer now looks like FIG. 40D. As shown in FIG. 40E, events 841, 843 and 845 may be associated with other buttons. At the conclusion, events have been assigned to all the buttons except the link buttons (Enter, Next, Previous, Delete, Clear, Top, and Bottom) in the Order application.

2. Objects and Events Appropriate for Them

Event tree properties can be assigned to Button, Field, Column, Text, Graphic, Form, and Stack objects. The following table shows different objects and the different events that are appropriate for them.

| Object | Click | Open | Close | Select | Unselect | Change | @EVENT |
|---|---|---|---|---|---|---|---|
| Field. |  |  |  | X | X | X | X |
| Column |  |  |  | X | X | X | X |
| Button | X |  |  | X | X | X | X |
| Graphic | X |  |  |  |  |  |  |
| Text | X |  |  |  |  |  |  |
| Form |  | X | X | X | X | X | X |
| Stack |  | X | X |  |  |  | X |

1. Assigning Actions to Objects

Users can assign an event tree property to fields, columns, buttons, text objects, graphics, forms, and a stack. In the Order application, for instance, clicking the New Customer button instructs the application to display the Customers form. An event tree is added to the New Customer button, as follows.

First, the user opens the Form Tool (if not already open) and opens the event tree for New Customer. This can be done by opening the event tree for button objects by double-clicking. (For objects other than buttons, text objects, and graphics, the user positions the pointer on the field and click the right mouse button to inspect the properties, then choose Event Tree.) The Event tree 800 for New Customer dialog box appears as shown in FIG. 40A. As with Value trees, Event trees can be cut, copied, or pasted; however, the root event node is preferably not copied but specified before the tree can be pasted.

(Recall that a stack is the entire set of forms in an application. An event tree for a stack is the only place where custom Ctrl key combinations and custom menu events can be defined).

For fields or columns, a "click" event should preferably not be used (because a user might want to select a field or a column by clicking it). For open and close events, when an application is opened in using File!Open the stack receives an open event. Similarly, when another application is opened, an application that is already open receives the close event before it is replaced by the new application. When a form is selected, its window title bar is highlighted. A form is unselected when a user action changes the focus so the form title bar is unhighlighted. For example, a dialog box appears after choosing Form!New. The dialog box is the frontmost element on the screen and has the focus—the form is unselected.

For Change events, Change recognizes when a value has been entered in a field or column, or when a form has been completed. After a user selects another field or column by pressing Enter, by pressing Tab, or by clicking, the system recognizes the new value in the previous field. Change also recognizes when a calculated or linked value appears in a field or column. For @EVENT functions, the user can use the @EVENT function in an event tree to send an event to a button or other object that has a name (lines and rectangles are unnamed objects). For example, @EVENT can send a click event to a button on a form.

3. Event Trees for Forms or Stacks

The sample application, Order, does not have an example of a form or stack event. Form events let you assign actions that affect a form, such as clearing a form when it is closed. Stack events let one assign actions that affect the entire application, such as Ctrl+letter shortcut keys or custom menus.

An event tree for a form can initiate actions when a form is opened or closed. For example, a form event tree could have Close as a condition, and @PRINTFORM(FormName) as the conclusion. Every time a user closes that form, it would be printed. A form event tree could have Open as a condition, and @FIELDFIND(FieldName) as a conclusion. In this instance, every time a user opens that form, the specified field would be selected.

Using the Form Tool of the present invention, there are three ways to assign an event tree property to a form:
1) Selecting the form title bar with the right mouse button, then choose Event Tree.
2) Clicking the right mouse button on any part of the form that does not have an object on it, then chose Event Tree.
3) Choosing Properties|Form|Event Tree from the main menu.
Then the user may proceed to build the form event tree in the same way as an event tree for an object. Custom shortcut keys (Ctrl+letter) can only be used in a stack event tree.

Defining a shortcut key in a stack event tree lets one create custom shortcuts for an application. Menus can be completely customized to limit commands the user can choose, or to add new menus and commands. For example, a stack event tree could have Ctrl+C as a condition, and @FORMCLOSE(@SELECTEDFORM) as the conclusion. Every time a user presses Ctrl+C in that application, the selected form will be closed.

In the system of the present invention, there are three ways to assign an event tree property to a stack. First, the user opens the Form Tool (e.g., by choosing Tools|Form). In the Form Tool, the user selects Properties|Stack|Event Tree To use the other methods for assigning an event tree to a stack, one may select Stack Tool 569 on the object bar 590 and proceed as follows. In the Stack Tool, the user selects the title bar with the right mouse button, and then selects Event Tree. In the Stack Tool, next the right mouse button is clicked with the screen cursor on any part of the application window that does not have a form on it; Event Tree is chosen. Then, the user may build the stack event tree in the same way as an event tree for an object.

4. Registering DLL Functions

The present invention includes facilities for the user to create his or her own functions and register them with an application. Dynamic Link Libraries (DLL) functions can be new program code or code borrowed from any other existing Windows DLL files, such as USER.DLL.

A DLL is registered for use in an application by creating an event tree, using the keyword @REGISTER. For example, the stack event could be Open, and the action would use the @REGISTER function. When @REGISTER successfully registers a DLL function, its name appears in the Paste Function dialog box and is available for any event tree in the application. Typically, @REGISTER is used in the stack event tree, but it can be placed in any event tree conclusion.

Unrestricted branches for event trees are identical to unrestricted branches for value trees as described hereinabove. Basically, unrestricted branches can evaluate expressions as well as any number of different field's values. An unrestricted branch condition can be any valid expressions that return the value Yes or No. An unrestricted branch conclusion can be any event conclusion.

LINKS

A. Introduction

Links are dynamic relationships between application fields and external data files or other Windows applications. Links can vary from very simple links to very complex links. The following description will focus on the creation of one of the more complex multiple links to a table object, using the Order application as an example.

At the outset, it is helpful if the reader is familiar with the basic concepts of database tables, database indexes, and records. A database table is a file containing one or more sets of related values. Each set of values is called a record. For example, the Order application uses a database table called PARTS. Each record in the PARTS file contains two values: a part number and description. An index on a table is like an index to a book—it lets a database program or system locate records quickly. For example, when the user types a value into the Sales Order field in the completed Order application, the system searches the indexed field in the ORDERS database table to display all information about that order number. A database table should not be confused with a table object of the present invention, however. Database tables are external data files; table objects, on the other hand, are screen objects used to enter and display values.

Links from applications to external data files can read values from or write values to that external file. This means that users can view data and add new data from within the system. When the user creates a DDE link between an application and a Windows application, he or she can read values from and write values to that application. One can also send commands to that application.

Single or multiple links can also be created between an application and a data source. One can also create links to multiple data sources. Once a link to a database table is created, any field or column in the system, can be connected to any database field within a link. The technique for connecting fields and columns varies only slightly.

Links perform several functions. For instance, they let the application get information ("read") from external data files. In the Order application, the user can view the names and addresses of all companies that have placed orders. Links let one transfer the values ("write") from an application to external data files. For example, in the Order application, new customer information entered on the Customers form is written to CUSTOMRS.DB, preferably a Paradox® table.

Also, new order information entered on the Order Entry form is written to ORDERS.DB, another Paradox table.

Links also simplify the process of viewing and updating records in external data files by letting users click buttons to perform these functions. For example, in the Order application, users can browse through existing orders by clicking the Next and Previous buttons. They add new order information to ORDERS.DB by clicking the Enter Order button. Links also simplify the process of adding and updating records in external data files by automatically writing changes to the file. For example, in the Order application, users can enter new item information or edit existing records. Each time they are moved to a new row in the table object, the entered values are automatically written to the ITEMS.DB table.

When a value is entered in a field linked to a database index field, the system locates the record containing that value and delivers the other values in the record to the corresponding fields. For example, if one selects the value Borland from the BILL TO area Company field, the system delivers the associated values from the CUSTOMRS.DB table. Similarly, if the user types any number from 1 to 6 in the Sales Order field, the system delivers the associated values from the Paradox ORDERS.DB table. In this manner, the value that triggers the link can be supplied in three ways: it can be entered by the user, calculated, or delivered by another link. In a preferred embodiment, links are provided for the following external data sources: Paradox tables, dBASE-compatible tables, Btrieve, ASCII, and DDE.

B. Link Fields

The operation of links will now be illustrated for the Order application and four Paradox® tables. One creates links when the user wishes to link his or her application to existing database tables. If one plans to create new tables, principles of good database design (normalization) should be followed, including avoiding duplicate data in tables (each field should appear in one table only; tables should contain related data (e.g., a table containing customer contact information should not also contain parts information); an index should be selected that defines the relationships (generally, only unique values—such as Social Security numbers or telephone numbers—are used for indexes).

For the Order application 600 as shown in FIG. 36A, the following links are contemplated.
1) The "customers" and "orders" links are connected to fields: When a Company name is selected on the Order Entry form, the application should deliver the associated values in the BILL TO and SHIP TO areas. Thus, one creates the "customers" link for this purpose.
2) When the Sales Order number for an existing order is entered, the application should deliver the Date, Contact Name, Phone, Extension, and Bill Co. values: One creates the "orders" link for this purpose. (Once the Bill Co. value is delivered, the "customers" link fills in the associated values from the CUSTOMRS.DB table.)
3) When the Sales Order number is supplied, the application delivers the Part No., Qty, and Extended Price values: The user creates the "items" link for this purpose. (Once the Part No. value is delivered, the "parts" link fills in the associated values from the PARTS.DB table).
4) When the Part No. is supplied, the application should deliver the Description and Price values: One creates the "parts" link for this purpose.
5) When the user clicks the New Order button, the application should remove all values from both forms: This prepares the forms for receiving information about a new order.

The following Table lists the links in the Order application, and the fields that hold the link values.

| Customers | Orders | Items | Parts |
| --- | --- | --- | --- |
| Bill Co* | Order Number* | Order Number* | Part No* |
| Bill Dept | Date | No* | Description |
| Bill Street | Bill Co | Part No | Price |
| Bill City | Contact Name | Qty | |
| Bill State | Phone | Amount | |
| Bill Zip | Ext | | |
| Bill Zip Ext | | | |
| Ship Co | | | |
| Ship Dept | | | |
| Ship Street | | | |
| Ship City | | | |
| Ship State | | | |
| Ship Zip | | | |
| Ship Zip Ext | | | |
| Customer Type | | | |
| Tax Exempt | | | |

*Represents an index field -- the field that the link uses to locate a record.

C. Link Creation

Figure 41A:
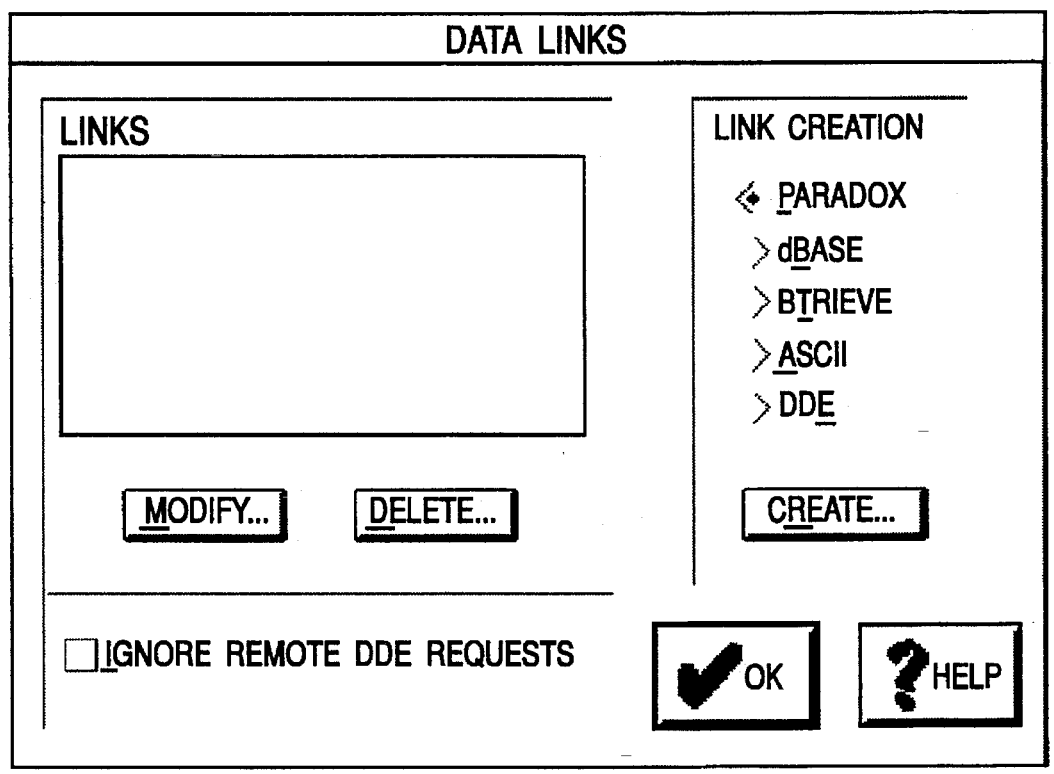
Figure 41B:
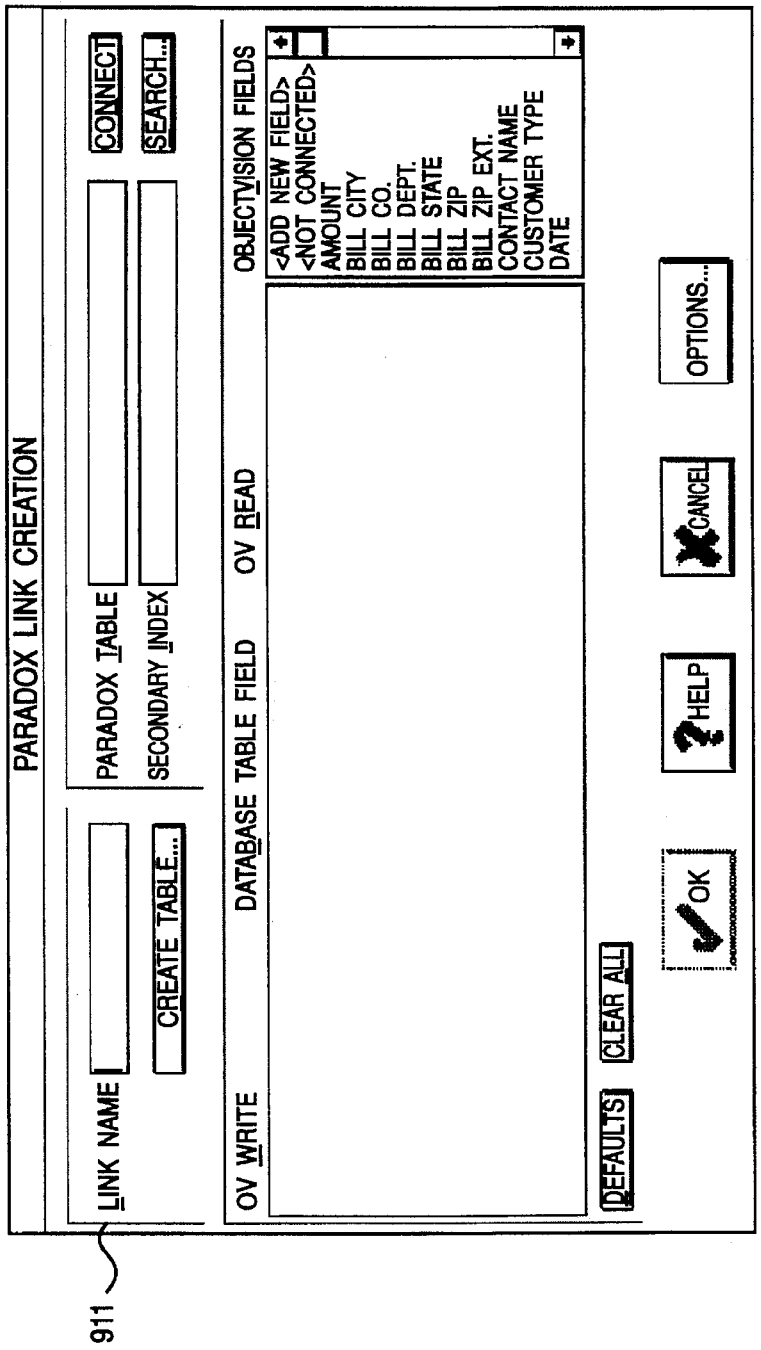

The "customers" link is a simple link connected to fields. To connect application fields to CUSTOMRS.DB (a Paradox table), the user performs the following steps. The Customers form 700 of FIG. 38A is made the active form (if not already). The link buttons (Enter, Next, Previous, Delete, Clear, Top, and Bottom) are automatically placed on the active form after the link is created. Next, the user selects Link tool 571 from the object bar. The Data Links dialog box 900 appears as shown in FIG. 41A. After the external target (in this example, Paradox) is specified (e.g., in the Link Creation list), then invokes the Create command. A Link Creation dialog box 910 specific for the target (Paradox) appears as shown in FIG. 41B. The user enters customers in the Link Name text box 911. Any link name that has not already been used may be entered; however, it is helpful to choose a name that helps one remember the purpose of the link (e.g., "cust" for customer).

Figure 41C:
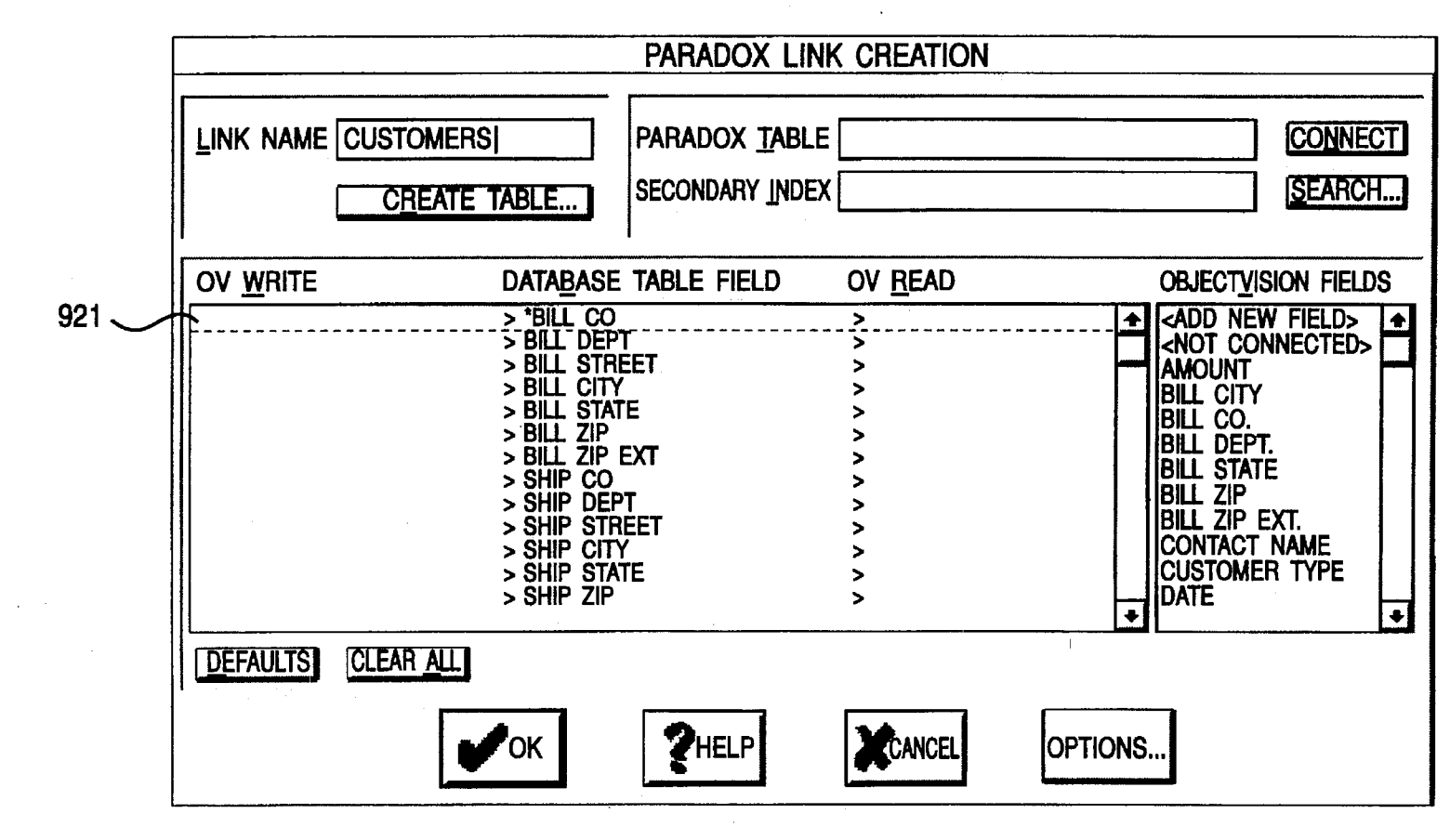

At this point, the user leaves the Secondary Index text box empty. This box is used to enter the name of the field which is a secondary index for a Paradox table. Similar text boxes are used for an index file for dBASE or a supplemental index number for a Btrieve table. The user proceeds to select the Connect command. The application links to the Paradox table name which was entered, listing its fields in the Database Table Field column as shown in FIG. 41C. As shown, the Bill Co field is marked with an asterisk (*), denoting it as an index field. The index field contains the unique value with which the other values in the record are associated.

Figure 41D:
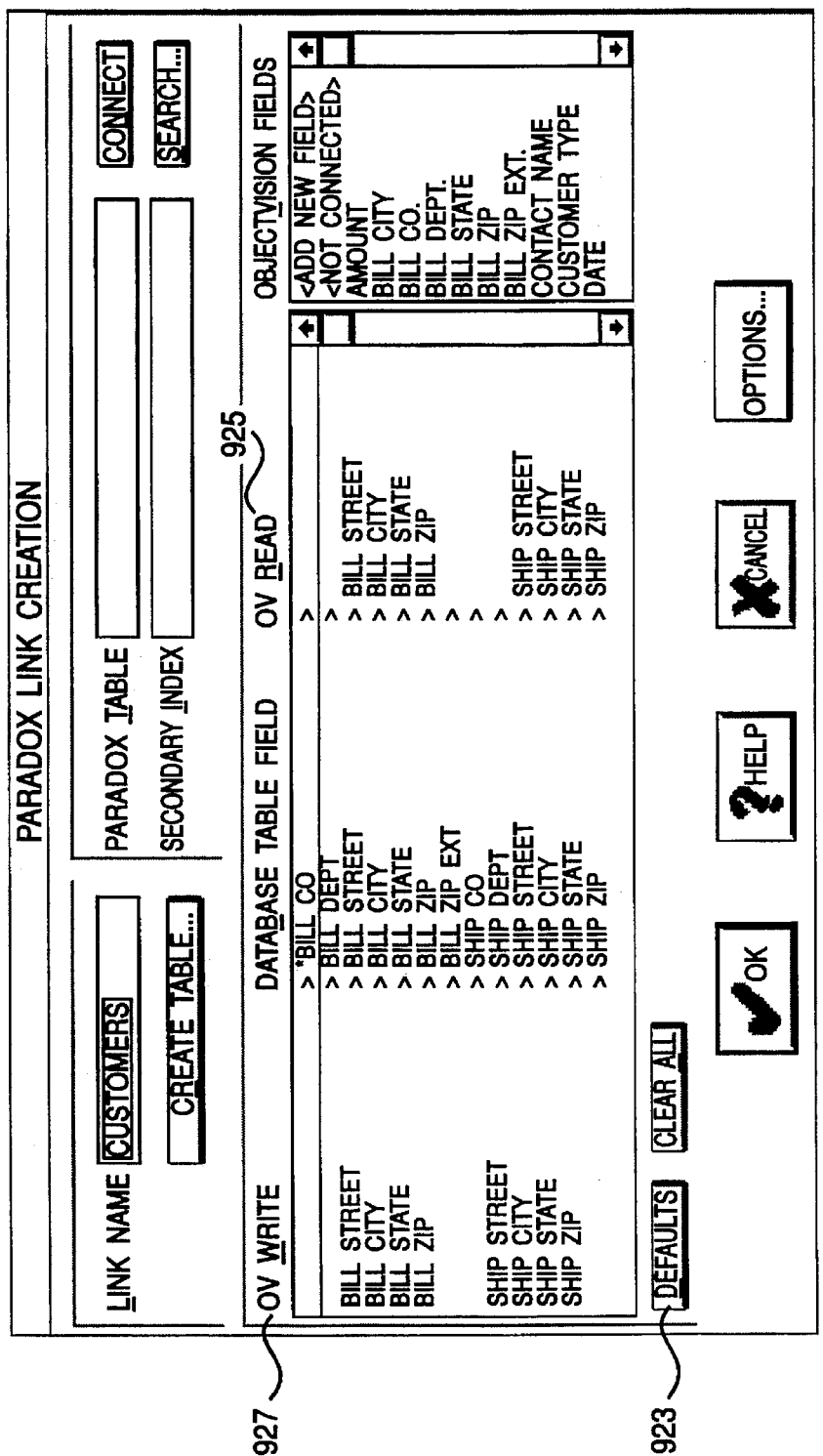
Figure 41E:
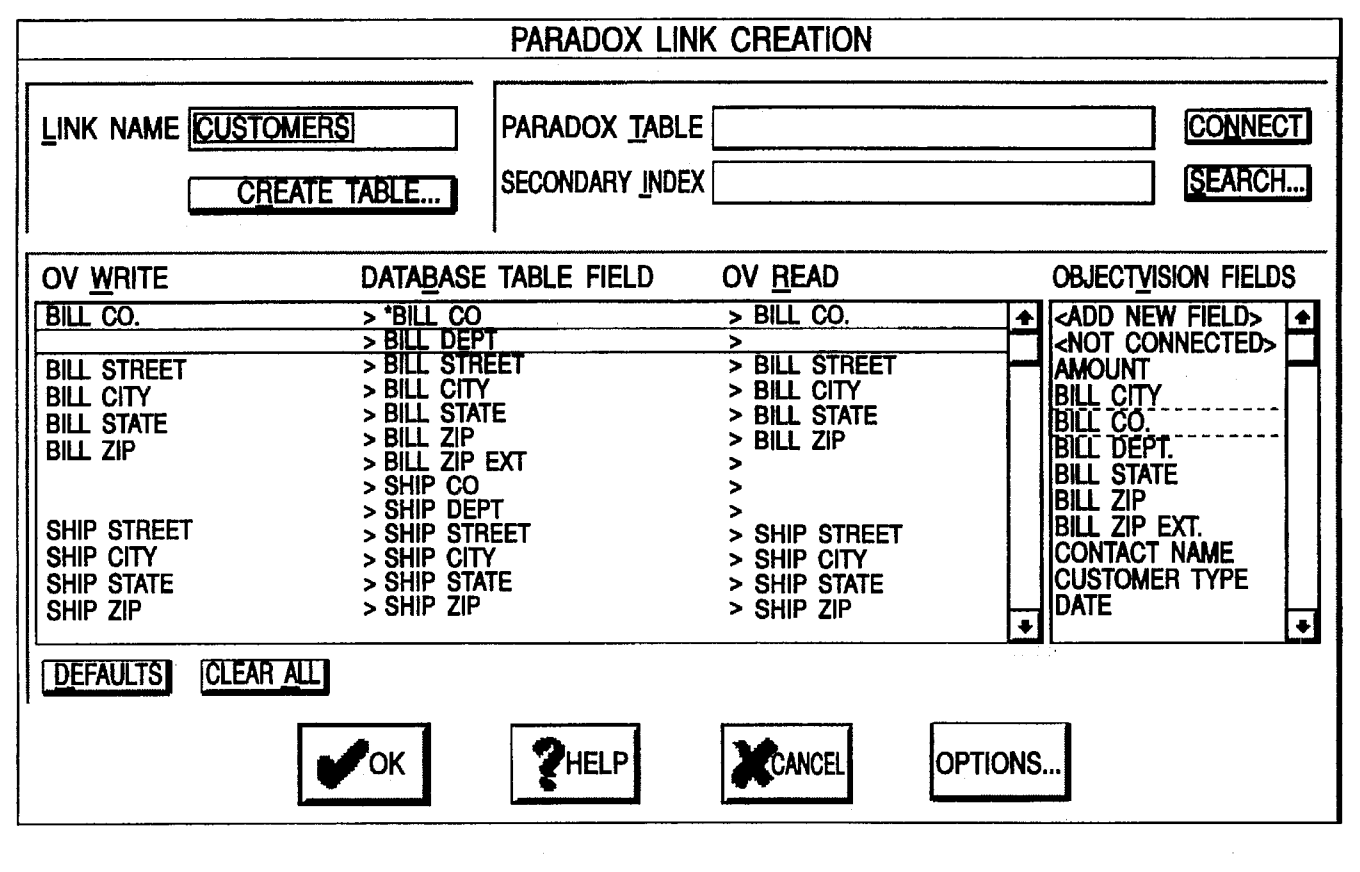

Connections between the listed Database Table Fields and the fields in the application are created as follows. As shown in FIG. 41D, to quickly create connections to the fields with the same names as the Paradox table fields, the user simply selects Defaults 923. The Read 925 and Write 927 columns now contain those fields from the application that are spelled identically (including capitalization and special characters such as periods). To create connections for those database fields that are not spelled the same as their corresponding fields, the user selects a database table field, selects a field from the list at the right, scrolling if necessary, then double-clicks. For example, to connect the Paradox Table field Bill Co with the field Bill Co. of the form, the user selects the Database Table Field Bill Co, then selects (e.g., double-clicks) Bill Co. in the Fields list; or, the user selects Bill Co. Fields list, and then selects the Database Table Field column. Bill Co. now appears in the Read and Write columns, and the next row is selected, as shown in FIG. 41E; the Bill Co. field is now connected to the database.

The user may proceed to connect the other Database Table Fields that are not yet connected to Read and Write fields. To create an application with a read-only connection, one may select the field name in the fields list, then double-click the Read column to the right of the Database Table Fields column. The field name will appear in the Read column only. In a similar manner, one could create an application with a write-only connection, with the field appearing in the Write column only.

To remove a connection, the user selects <Not connected> from the Field list, then double-click the Read or Write of the Database Table Fields he or she wants to erase. To remove a connection from both the Read and Write columns, the user first selects the row, then double-click <Not connected>; or selects <Not connected> first, then double-click the field name in the Database Table Field column.

D. Setting Link Options

Figure 41F:
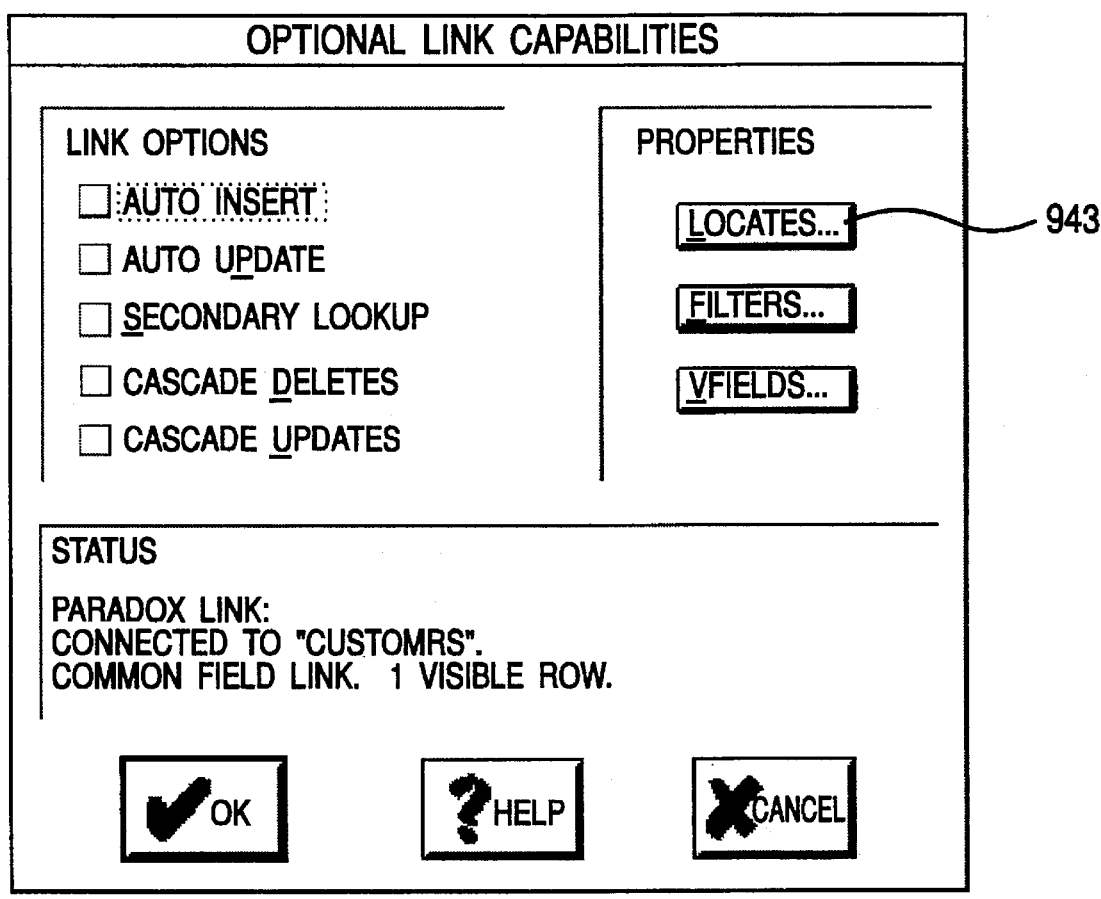

To specify the circumstances when the link will update the data file, the user selects the Options button of the target (e.g., Paradox) Link Creation dialog box. The Optional Link Capabilities dialog box 940 appears as shown in FIG. 41F. Auto Update and Auto Insert define when changes are written to the database.

To update the data file whenever a user modifies an existing value in a linked field and moves to another record, check Auto Update. This feature eliminates the need for special buttons that update records in the database—modifications are made automatically (the user need not check Auto Update for the "customers" link). To insert a new record in the linked data file whenever the user creates a new record by entering new values in the linked table object, one checks Auto Insert. Auto Insert eliminates the need for special buttons that insert records in the database —insertions are made automatically. For example, the Order application has a button, Enter, on the Customers form that needs to be clicked to save the information to the CUST table. Here, the user would not check Auto Insert for the "customers" link, nor check Cascade Deletes or Cascade Updates.

The present invention provides a Status box showing information about a current link. It shows what type of table is linked, the table name, and what type of object is connected. A link can be connected to fields or columns. This link is connected to fields, as indicated by the Common Field Link text. Fields preferably display one value at a time, with a Status box message indicating this.

E. Defining Locate Fields

Perhaps the most important link property are locate fields. The Locate field is the field that triggers a link. When a new value is entered in a Locate field, the other values in the link are delivered from the database table to their respective fields. For example, the Sales Order field triggers the link to deliver the order information. Similarly, the Bill Co. field triggers a link to deliver the customer information, and the Part No. field triggers a link to deliver the parts information.

The Locate field for the "customers" link is Bill Co. To specify the Locate field, the user proceeds as follows. First, the user selects Locates (e.g., by clicking the Locates button 943 in the Optional Link Capabilities dialog box 940, as shown in FIG. 41F). In turn, Locate Indexes box 950 is displayed, as shown in FIG. 41G. The Paradox table index field, Bill Co, appears in the left column, beneath the heading Table Index Field. The field, Bill Co., appears in the right column beneath the heading Locate Field. The user now specifies Locate field options. Locate options determine two major options for delivering values:

1) Whether values are located automatically when a new value is entered in the Locate field. Auto Locate is checked by default. Thus, whenever a new value is entered in the Locate field, the link automatically fills in the associated values, if they exist.

2) How precisely the delivered records must match a value. If Inexact is checked, the application locates records based on an incomplete value. For example, if the user types B, the link returns the values for Borland. If Restricted Range is checked, the application delivers only those records that exactly match the value entered in the Locate field. For example, if the user types Borland, the application delivers all associated values for this customer. Additionally, one cannot move to any other record in the linked database that does not exactly match the locate value, because checking Restricted Range limits the delivered values to those that are exact matches.

Continuing with the link of the present example, the user checks Restricted Range, and leaves Auto Locate checked. The Locate Indexes dialog box, the Optional Link Capabilities dialog box, and the Paradox Link Creation dialog box are closed. A Link Automatic Buttons dialog box 960 appears, as shown in FIG. 41H. By selecting the buttons that the user wants and then clicking OK, the system creates link navigation buttons complete with their event trees. Each choice in the list has a corresponding @function. For instance, Top, Bottom, Previous, Next, Clear, Delete, and Store buttons are useful for browsing and entering data.

F. Exemplary Creation of Links

Figure 41I:
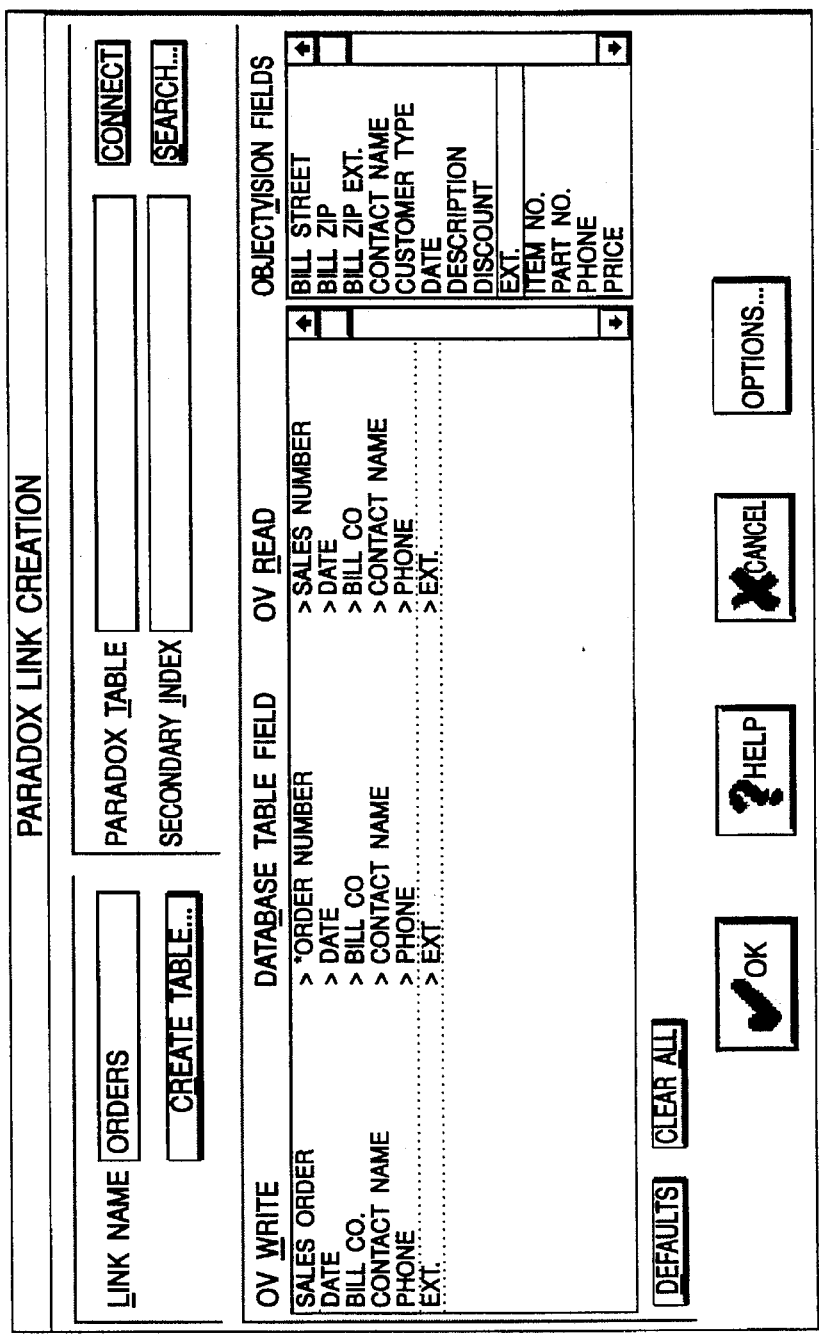

To link application fields to the existing Paradox table, ORDERS.DB, one would proceed as follows. The Order Entry form is opened (e.g., by choosing Form|Select and selecting the Order Entry). The user opens the Links Tool (e.g., by selecting Tools|Links), with the external link type (e.g., Paradox checked as the Link Creation type), the user selects Create. Orders is entered into the Link Name text box as well as entering it in the Table text box; then the Connect command is selected. The user may select default settings by clicking the Defaults button. He or she then proceeds to connect Sales Order as the Read and Write field to Order Number, the Database Table Field, by selecting Sales Order in the Fields list (e.g., scrolling to it and then double-clicking it). Upon connecting all the fields, the Link Creation dialog box appears as shown in FIG. 41I. The user confirms that results (e.g., by clicking OK).

G. Linking Columns

A column is similar to a field, but it can display values from several records instead of just one. However, only one record at a time is the current record, which can be modified. The row pointer, a right-pointing triangle next to the left margin of the table object, indicates the current or active row. The order of link creation is significant for table objects. The technique for connecting table object columns to external data files is the same as that for linking fields; however, the order that one creates the links to the table object has importance.

If there are multiple links to a single table object, the first link created (the Primary link) must be the one that delivers the multiple records to the table's rows. All other links (Secondary Lookup links) to the table object can be created in any order—they simply fill in information about the values delivered by the Primary link. In the Order application, for example, "items" is the Primary link because the ITEMS.DB table delivers the ordered items, which are the most important information about each order. The Secondary Lookup links simply fill in every item's description and price.

Figure 42A:
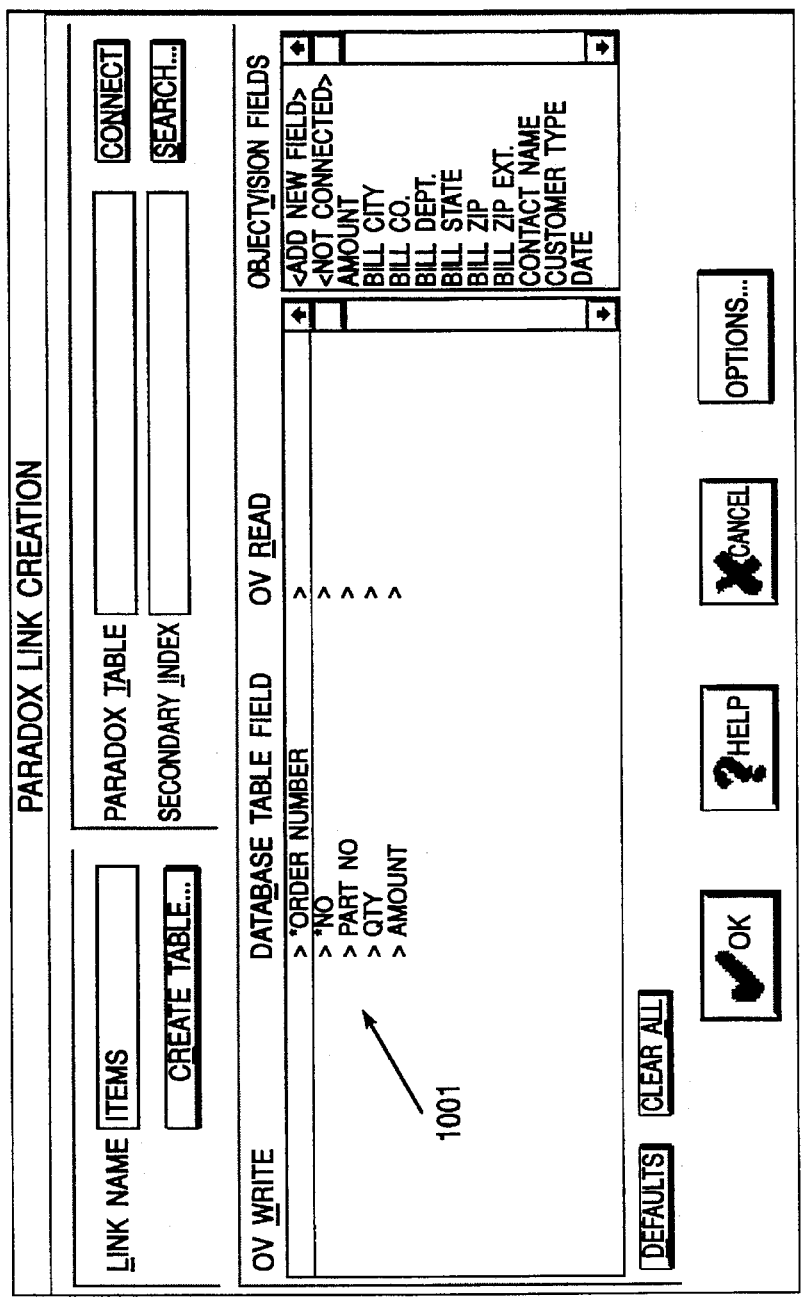

The Primary link is specified by creating it first. Since, the "items" link is the Primary link for the table object, it is created first. This is accomplished by selecting Links 571 on the object bar. The Data Links dialog box 900 appears. After confirming the target (e.g., Paradox table) as the Link Creation type, the user selects Create. The Link Creation dialog box appears. Next, the user enters items in the Paradox Table text box, as well as in the Database File Name text box; Connect is then selected. The field names 1001 from the ITEMS table appear in the middle column, as shown in FIG. 42A. ITEMS has two index fields, Order Number and No, indicated by an asterisk before the field name. When a Paradox database table contains a multi-field index, the records are sorted more than once. For example, the index on Order Number sorts the records according to the order number. Within each order, item numbers are sorted by the index on the No field. In the Order application, the Sales Order number is associated with multiple Item Numbers which are kept in ascending order by the index on the No field.

Figure 42B:
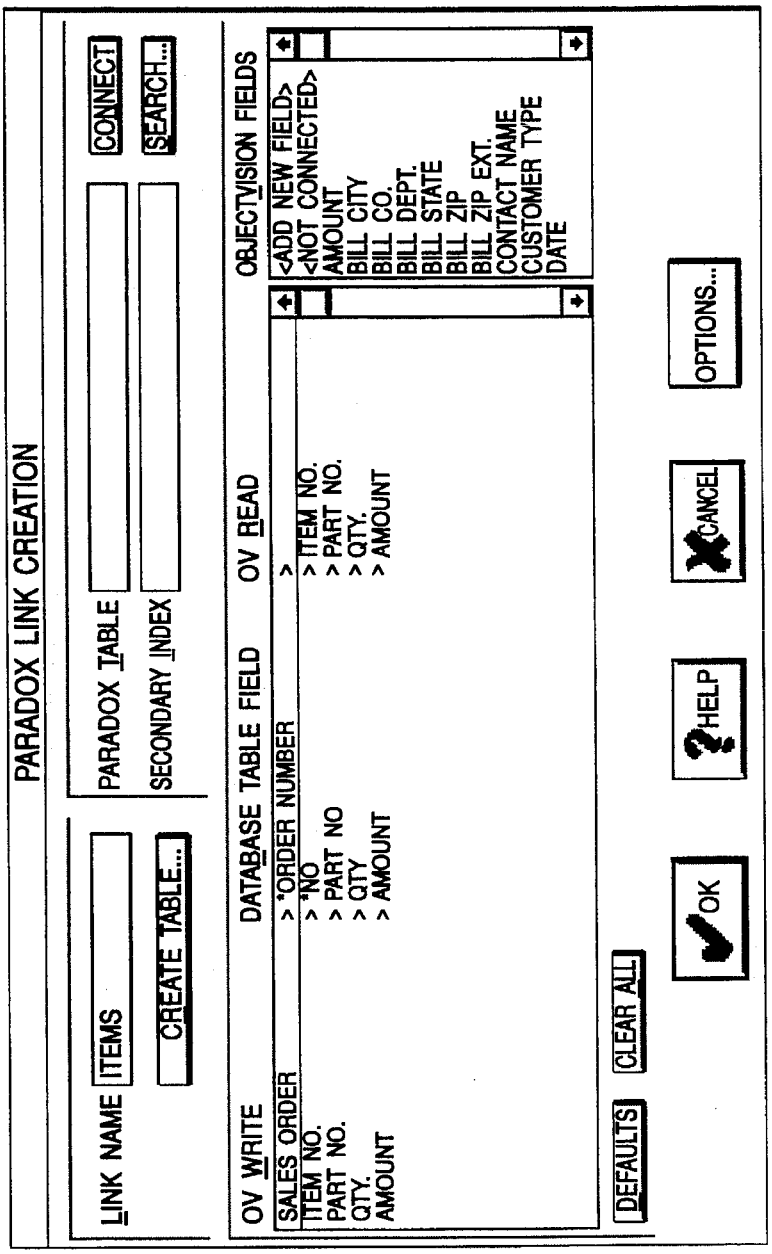

The user defines the field Sales Order as an Write field only and then selects Sales Order from the Fields list box, then double-click in the Write column beside Order Number. The sales order number is not read back to the application field by the "items" link, the Read field is left blank. (The Sales Order number is read into the field by the "orders" link.) The user defines the field Item No. as a Read field and a Write field connected to No (in the Database Table Field column), and then defines the field Part No. as a Read field and a Write field connected to Part No (in the Database Table Field column). Next, the user defines the field Qty. as a Read field and a Write field connected to Qty (in the Database Table Field column). Finally, the user defines the field Amount as a Read field and a Write field connected to Amount (in the Database Table Field column). The Paradox Link Creation dialog box 1010 appears as shown in FIG. 42B.

Figure 42C:
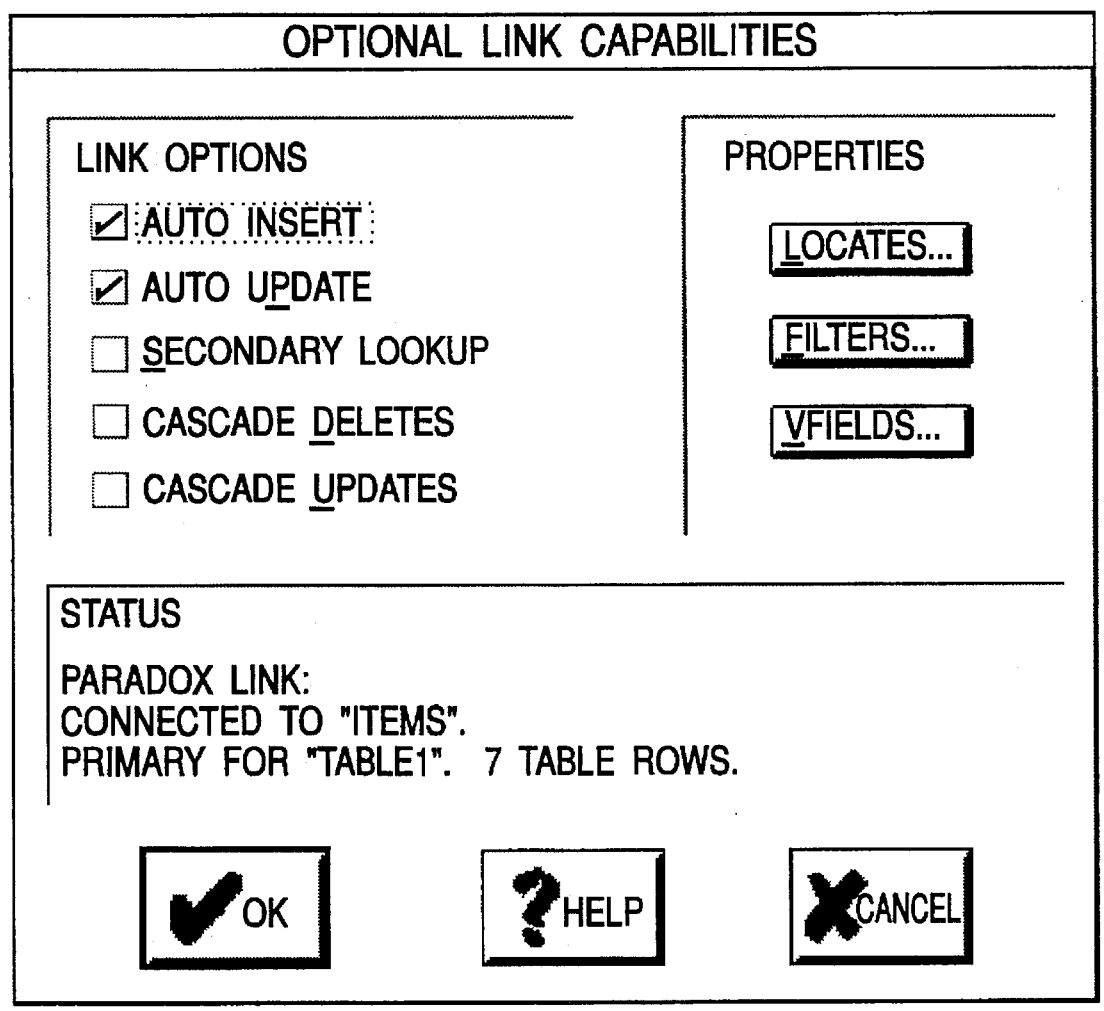

Now link options for the "items" link may be defined. From the screen dialog, the user selects Options and checks Auto Insert and Auto Update. Each time the user moves to another row in the table object, the items information will be automatically written to the ITEMS.DB table. The Optional Link Capabilities dialog box 1020 appears as shown in FIG. 42C. The Status box shows information about the "items" link. The text Primary for "Items" lets the user know this link is connected to columns and it is the first link to the table object. The text 7 *Table Rows* indicates the number of rows in the table object.

The Locate fields for the "items" link can now be defined as follows. The user selects the Locates button. The Locate Indexes dialog box appears with Order Number and No in the Table Index Field column. The Sales Order field name in the Fields list is then selected (e.g., scroll to and double-click it). Sales Order appears in the Locate Field column next to Order Number. In this instance, the Locate Field is not defined for No, the Table Index Field, because this link will locate items for an order based only on the sales order number (not the item number). The Order application will now monitor the Sales Order field. When the user types an existing order number in the Sales Order field, the link will deliver all the records in the ITEMS database table associated with that order number.

The user now selects Restricted Range so that the link delivers records only for the precise Sales Order value. If one selected Inexact, the link would deliver the closest record when the user tried to enter a new order. Inexact would not let the user enter a new order number. After leaving Auto Locate checked, the completed Locate Indexes dialog box 1030 now appears as shown in FIG. 42D. The operation is concluded by closing the Locate Indexes dialog box and the Optional Link Capability dialog box, thus completing the present link definition.

To complete the final link in Order, the user adds the "parts" link. The link is created and its options defined as shown in the FIGS. 42E–F: the completed Paradox Link Creation dialog box 1050 appears as shown in FIG. 42E, and the completed Locate Indexes dialog box 1060 appears as shown in FIG. 42F. As shown, the Secondary Lookup is automatically checked for this link in the Optional Link Capabilities dialog box because "parts" is a Secondary Lookup link. When a part number appears in the Part No. column, "parts" automatically fills in the part description and price. After the user finishes creating the "parts" link, he or she closes the dialog boxes.

Figure 43:
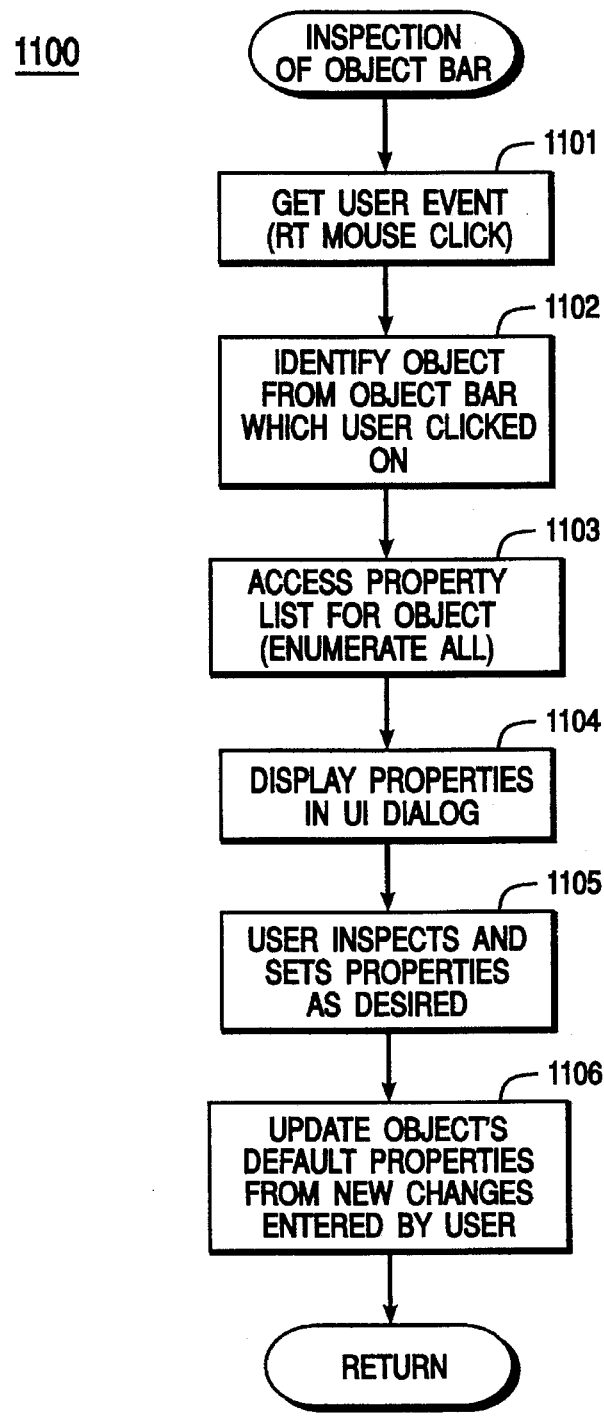
FIG. 43 is a flowchart illustrating a method of the present invention for inspecting and setting default attributes on the object-oriented toolbar of FIG. 35.

Referring now to FIG. 43, a method of the present invention for inspecting and setting the attributes of objects on the object bar 550 (of FIG. 35B) is illustrated by a flowchart 1100. In step 1101, the system receives a user event indicating that the user wants to inspect one of the objects (e.g., by mouse clicking on the screen icon indicating that object); in a preferred embodiment, the user event is a right mouse button down event. In step 1102, the system translates the user event into a request to inspect a particular object; the selection of a screen object using a pointing device is known in the art.

At step 1103, the properties available for the object identified in step 1102 are enumerated. For a field object (e.g., field object 553 of FIG. 35D) exemplary properties include field type, alignment, label font, value font, color, borders, line width, and protection. Properties or attributes for a line object, on the other hand, may include color and line width. At step 1104, the properties which are enumerated for the object are displayed to the user (e.g., pick list or dialog box). The user, in turn, may select from this list at step 1105, for inspecting and setting specific properties as desired. For a line object, for example, the property of color may be set to the value "blue". For field objects, on the other hand, the property of field type may be set to numeric, alphanumeric, boolean, and the like. Step 1105 concludes with the user confirming (e.g., selecting "Ok") or cancelling (e.g., selecting "Cancel") the newly set properties. Finally, at step 1106, the object's default properties are updated with the newly entered values (of step 1105). The method concludes by returning.

Figure 44:
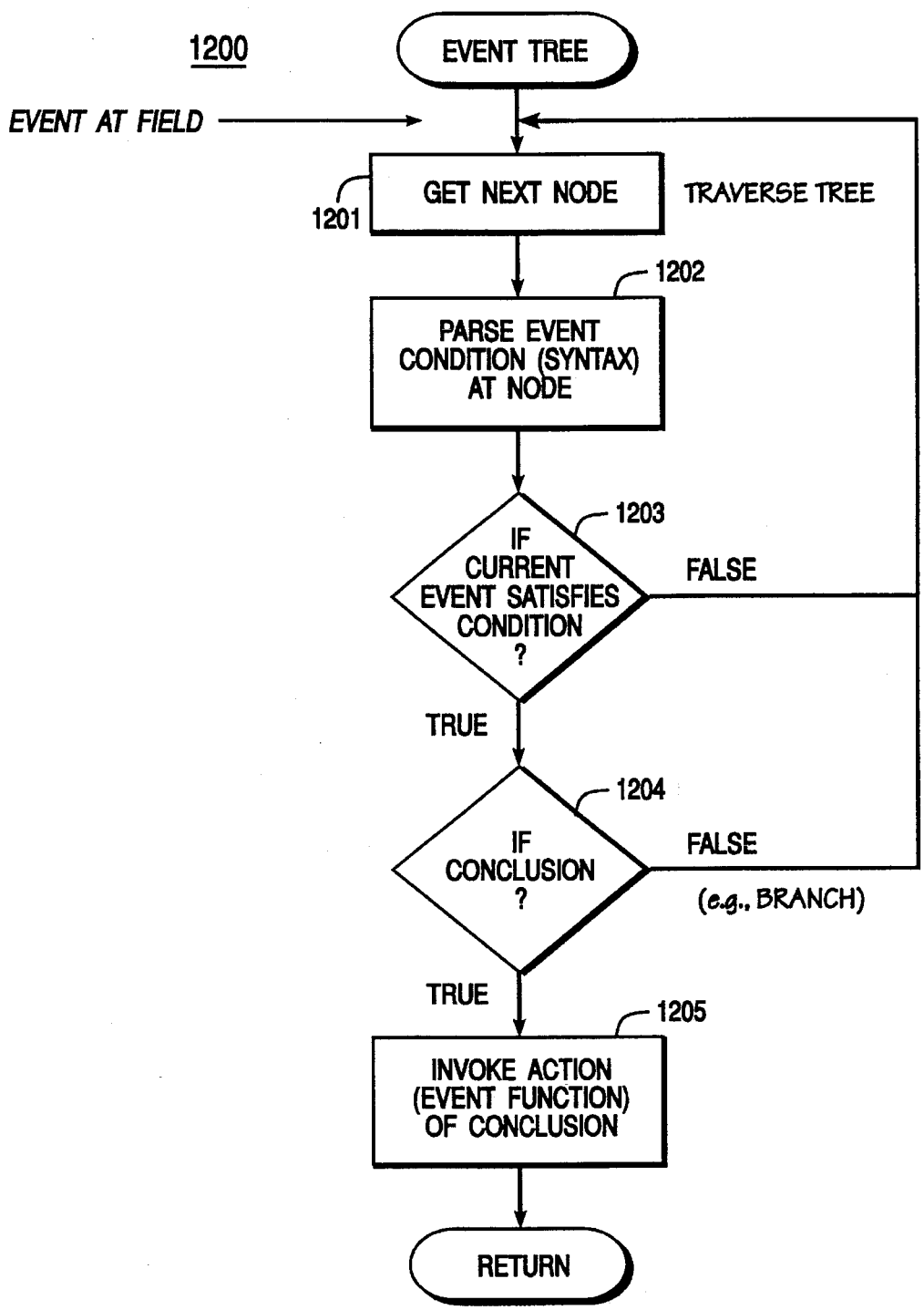
FIG. 44 is a flowchart illustrating a method of the present invention for processing an event tree for an object which has received an event.

Referring now to FIG. 44, a method of the present invention for processing an event tree is illustrated with a flowchart 1200. Recall that an event tree is associated with a particular object, such as a field. The method is triggered in response to an event occurring at the object. Beginning at step 1201, the system traverses the event tree in an effort to match the event with a user specified condition. Thus, at step 1201, the next node is processed. Specifically, at step 1202, the event condition specified by the user (e.g., "click") is examined at the node.

At step 1203, if the current event does not satisfy the user specified condition, then the method loops to step 1201 to process the next node. Otherwise (no at step 1203), the method continues for determining if a conclusion has been reached at step 1204. If a conclusion has not been reached (e.g., the method is at a branch node), then the method loops to step 1201 to process the next node. If, on the other hand, a conclusion (terminal node) has been reached, then the user-specified action for the event (or series of events) is invoked at step 1205. In a preferred embodiment, event functions (described above) are provided for performing desired tasks, in response to selected events. After assertion of the conclusion and performance of the desired action(s), the method returns.

Figure 45:
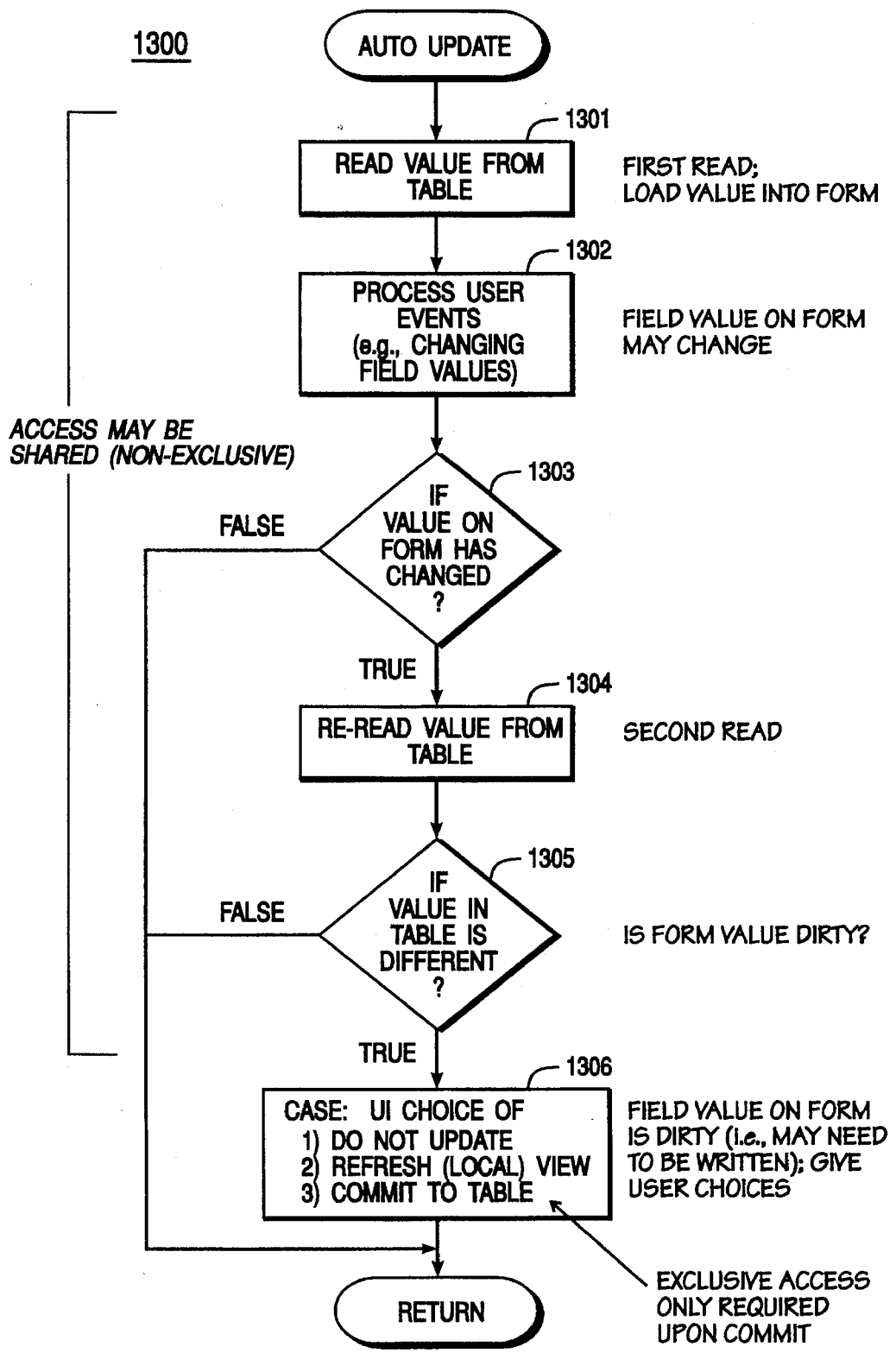
FIG. 45 is a flowchart illustrating an autoupdate method of the present invention.
Figure 46:
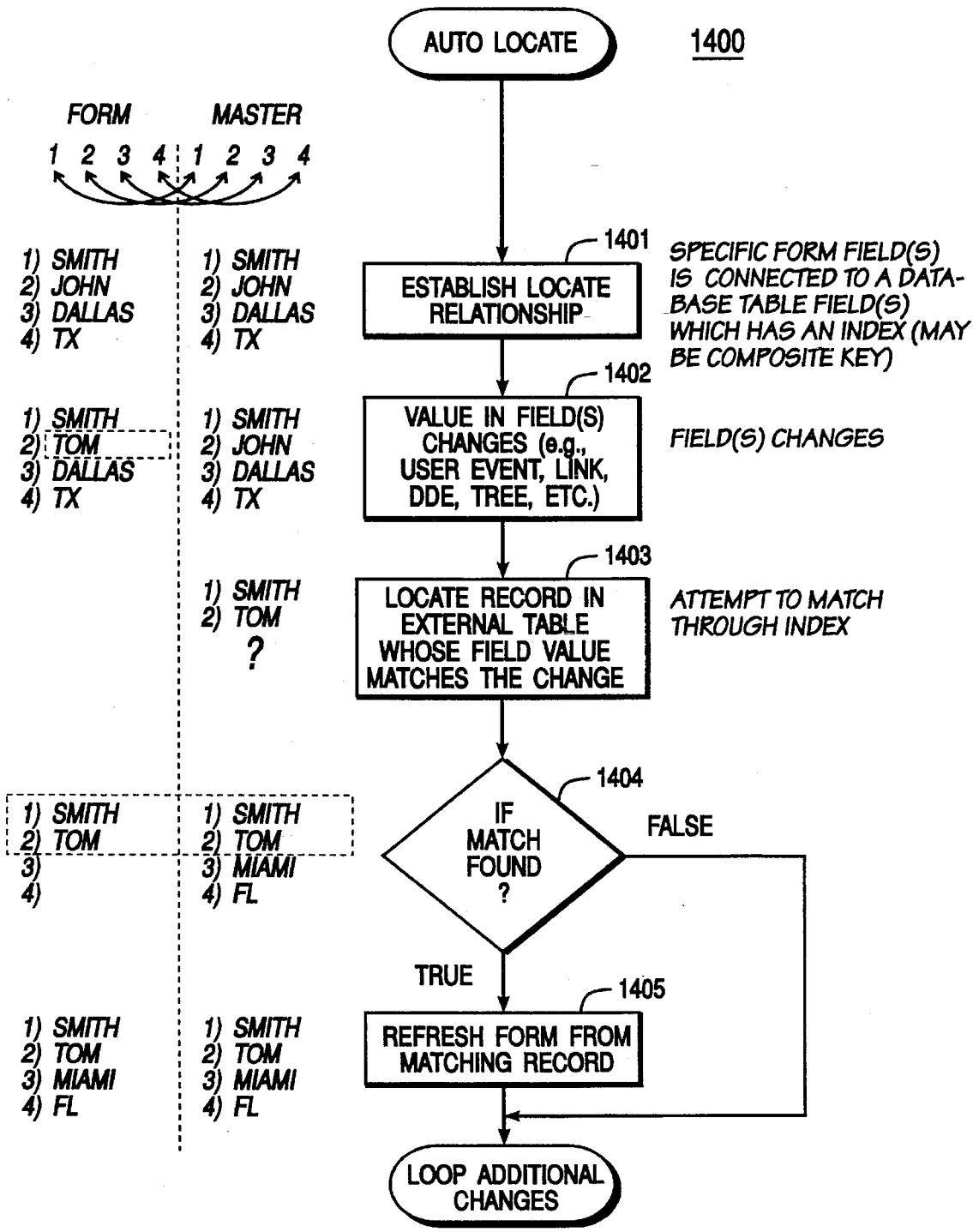
FIG. 46 is a flowchart illustrating an autolocate method of the present invention.

Referring now to FIGS. 45–46, the internal operation of linking methods of the present invention will now be illustrated. Shown with a flowchart in FIG. 45, an auto update method 1300 of the present invention provides an improved method for maintaining data integrity, without the need for continuously exclusively locking a record which may be subjected to an edit. For simplicity, the following description will focus on a single field of a record; those skilled in the art, however, will appreciate that the principle of the present invention is equally applicable to multifield records.

In step 1301, a field value is read from the database (master) table; this value is loaded into the form field which is displayed to the user. At step 1302, the field value on the form may be changed, such as the user entering a new value; changes may also result from link or tree events. If the value of the field on the form has changed at step 1303, then the corresponding field from the master table is re-read from the master table, for the purpose of determining whether the value of the field on the form is dirty (i.e., may need to be written to disk). If the value on the form has not changed (no at step 1303), then the method skips step 1304 and remaining steps.

After step 1304, the method determines if the value in the table differs from that on the form. If the two differ (i.e., the value for the form field is "dirty") at step 1305, then the method proceeds to step 1306 for determining how to process the dirty value. In a preferred embodiment, the user is given three choices as follows. The user may discard the dirty value (i.e., do not update the master table); the user may choose to refresh his or her (local) view (i.e., the value is only used locally); or the user may proceed to update the master table with the new value (commit operation). If the value in the table upon re-read is determined not to be different (no at step 1305), however, then the method simply returns. After completion of step 1306, the method concludes by returning.

Shown by a flowchart in FIG. 46, an auto locate method 1400 of the present invention will be described. In general, the method "refreshes" fields of a form from a master table when one or more fields of a form are changed. In parallel with the method steps, FIG. 46 also shows changes in respective fields of a form and its corresponding master table. The method proceeds as follows. In step 1401, a "locate" relationship is established between one or more fields of the form and corresponding fields of the master table. In a preferred embodiment, fields of the form are associated with an index of the master table (which comprises key values derived from corresponding fields of the master table); indexes may be built on-the-fly if desired. In step 1402, a value in one or more fields of the form change (e.g., in response to user, linking, DDE, and/or tree events or the like). At step 1403, using the index, the method locates a record in the master (external) database table whose field value(s) matches the change. If a match is found at step 1404, then the method proceeds to refresh the fields of the form with the matching record from the master table at step 1405. If, on the other hand, a match is not found (no at step 1404), then no refresh is performed (step 1405 is skipped). Next, the method loops for any additional changes made to the form, or returns if the user has completed the operation.

While the invention is described in some detail with specific reference to a single preferred embodiment and certain alternatives, there is no intent to limit the invention to that particular embodiment or those specific alternatives. For example, the foregoing description has focused on a preferred embodiment operative within the Microsoft Windows environment; those skilled in the art will appreciate, however, that the individual classes may be adapted for other platforms, including, for example, OS/2, NeXTStep, X-Windows, and the like. Thus, the true scope of the present invention is not limited to any one of the foregoing exemplary embodiments but is instead defined by the following claims.

What is claimed is:

1. In a computer system, a computer-implemented method for maintaining data integrity of information stored as a data record in a database table with information displayed on a screen device without continuous, exclusive locking of a shared data record, the method comprising:

(a) reading at least one field value from said data record of said database table, said reading being performed by the system with shared access to said data record;

(b) displaying a form on the screen device said form displaying at least one field value read from the database;

(c) modifying said at least one field value as it is displayed on the screen device;

(d) in response to step (c), re-reading said at least one field value from said database table;

(e) determining whether said information stored in the database table differs from said information displayed on said screen device by comparing said at least one field value being displayed with said re-read at least one field value; and (f) if said system determines at step (e) that said information stored in the database table differs from said information displayed on said screen device, performing, in response to user input, a selected one of:

(i) refreshing said information displayed on said screen device with said at least one field value re-read at step (d), and (ii) updating said information stored in said database table with said information displayed on said screen device.

2. The method of claim 1, wherein step (f)(i) comprises:

if said displayed at least one field value differs from said re-read at least one field value at step (e), refreshing said at least one field value read from the database which is displayed on the screen device.

3. The method of claim 1, wherein step (f)(ii) comprises:

if said displayed at least one field value differs from said re-read at least one field value at step (e), updating the database table with said displayed at least one field value.

4. The method of claim 1, wherein steps (a)–(e) are performed without exclusive access to said data record.

5. The method of claim 3, where step (f) is performed with exclusive access to said data record.

6. The method of claim 1, wherein said without exclusive access comprises shared access which allows at least one other computer system to access said data record during steps (a)–(e).

7. The method of claim 1, wherein step (c) includes:

modifying said at least one field value in response to receiving a user-initiated event.

8. The method of claim 7, wherein said user-initiated event includes user-supplied input from a keyboard device.

9. The method of claim 1, wherein step (c) includes:

associating an event tree with said at least one field, so that said value is modified in response to occurrence of a particular event of interest;

monitoring for said particular event of interest; and upon detecting occurrence of said particular event of interest, modifying said at least one field value.

10. The method of claim 9, wherein said particular event of interest includes a user-initiated event.

11. The method of claim 1, wherein step (f)(ii) includes:

obtaining exclusive access to said data record; and updating said information stored in said database table with said information displayed on said screen device.

12. In a computer system, a method for automatic location of information stored in a database table having at least first, second, and third table fields, said information being stored in said database table as a plurality of database records, the method comprising:

indexing said database table by a composite key comprising key values derived from values stored by said first table field and said second table field of said plurality of table fields;

displaying on a screen display a database form having first, second, and third form fields, said first, second, and third form field displaying respective values from said first, second, and third table fields for a first database record;

changing the value of said second form field to a new value;

in response to said modifying step, locating a second database record storing a value at its second table field which matches said new value; and upon locating said second database record, displaying at said first and third form fields, respective values from said first and third table fields for said second database record.

13. A data processing system with autolocate capability, the system comprising:

a computer having a processor and a memory;

storage means for storing a database table and a database form, said database table comprising a plurality of database records having a plurality of table fields, said database table having an index comprising key values derived from at least some of said table fields, said database form comprising a plurality of form fields, each form field corresponding to a particular one of said table fields;

display means for displaying at said form fields values from said table fields of a particular database record of said database table;

edit means for changing the displayed value of one of the form fields to a new value;

search means, responsive to said edit means, for automatically locating a different database record of said database table, said different database record having a corresponding table field whose value matches said new value; and refresh means, responsive to said search means, for changing values displayed by said form fields other than said form field whose value has changed to values of their corresponding table fields.

14. The system of claim 13, wherein said edit means includes an input device for receiving user-supplied input.

15. The system of claim 13, wherein said edit means includes means for changing one of the fields to a new value upon occurrence of a particular event.

16. The system of claim 15, wherein said particular event comprises a user input event.

17. The system of claim 15, wherein said particular event comprises an event occurring in the system.

18. The system of claim 13, wherein said index comprises a composite index derived from at least two of said table fields.

19. The system of claim 13, wherein said search means includes:

means for locating, using said index, a different database record of said database table, said different database record having a corresponding table field whose value matches said new value.

20. The system of claim 13, wherein said refresh means includes:

means for reading field values from said table fields for corresponding form fields other than said form field whose value has changed; and means for displaying said field values at their respective form fields.

* * * * *